Figure 1:
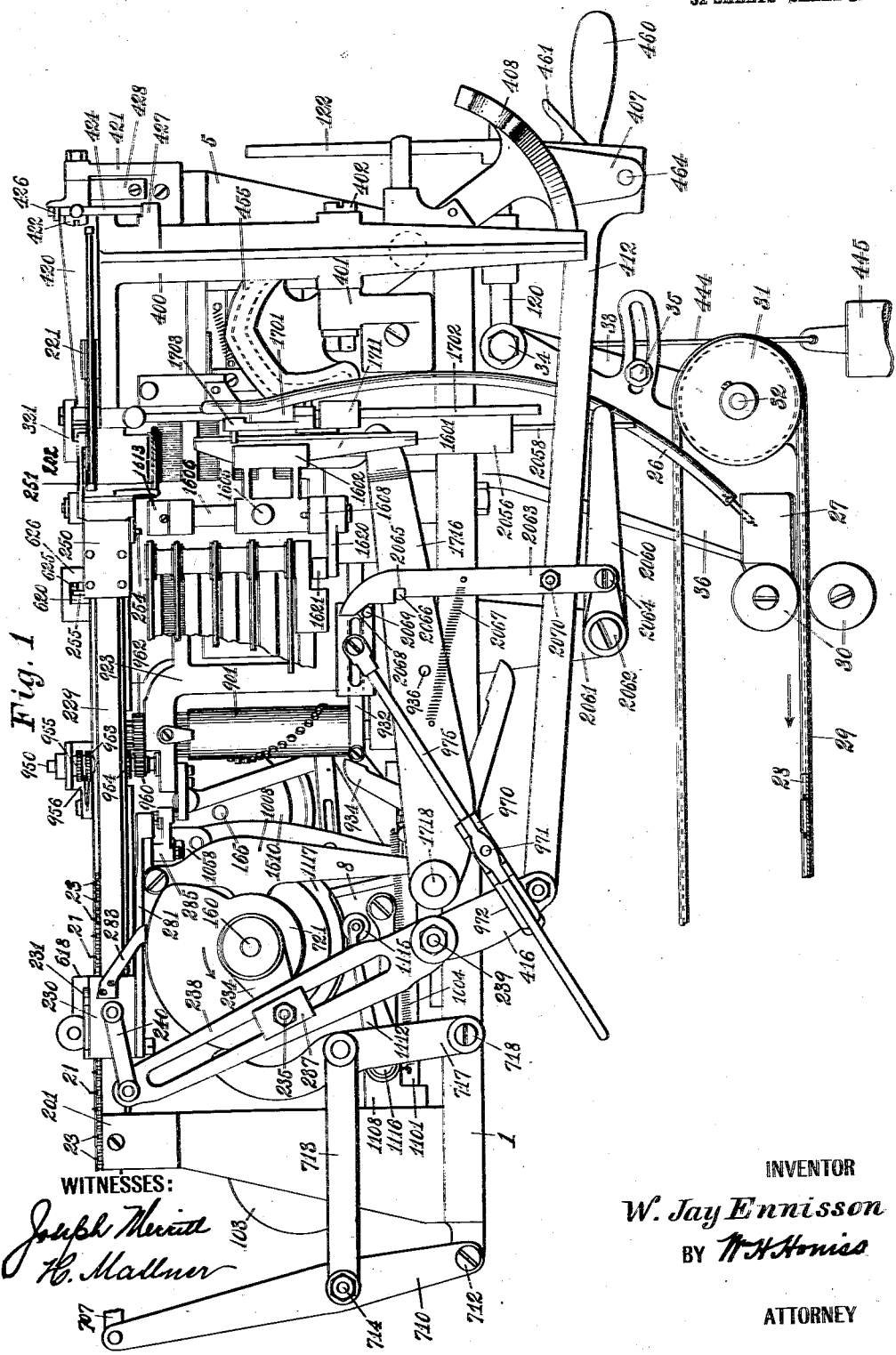

No. 844,568. PATENTED FEB. 19, 1907.
W. J. ENNISSON.
TYPE JUSTIFYING MACHINE.
APPLICATION FILED MAY 5, 1902.

32 SHEETS—SHEET 1.

WITNESSES:
Joseph Merritt
H. Mallner

INVENTOR
W. Jay Ennisson
BY W. H. Honiss
ATTORNEY

No. 844,568. PATENTED FEB. 19, 1907.
W. J. ENNISSON.
TYPE JUSTIFYING MACHINE.
APPLICATION FILED MAY 5, 1902.

32 SHEETS—SHEET 3.

WITNESSES

INVENTOR
W. Jay Ennisson
BY
ATTORNEY

No. 844,568.  
PATENTED FEB. 19, 1907.  
W. J. ENNISSON.  
TYPE JUSTIFYING MACHINE.  
APPLICATION FILED MAY 5, 1902.

32 SHEETS—SHEET 4.

WITNESSES:

INVENTOR  
W. Jay Ennisson  
BY  
ATTORNEY

No. 844,568.
PATENTED FEB. 19, 1907.
W. J. ENNISSON.
TYPE JUSTIFYING MACHINE.
APPLICATION FILED MAY 5, 1902.
32 SHEETS—SHEET 5.
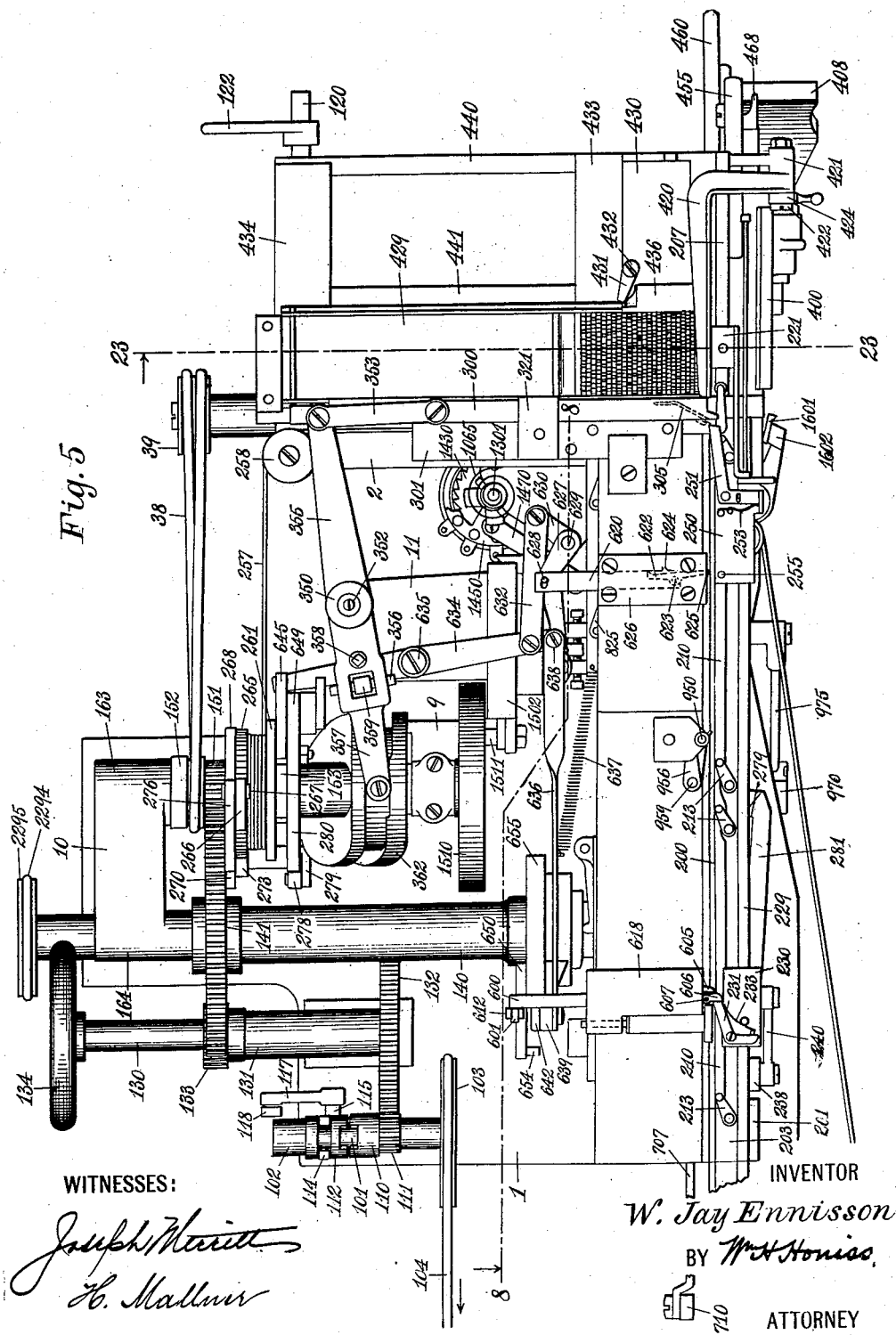
Fig. 5
WITNESSES:
Joseph Merritt
H. Mallner
INVENTOR
W. Jay Ennisson
BY W. H. Honiss
ATTORNEY No. 844,568. PATENTED FEB. 19, 1907.
W. J. ENNISSON.
TYPE JUSTIFYING MACHINE.
APPLICATION FILED MAY 5, 1902.
32 SHEETS—SHEET 6.

WITNESSES:

INVENTOR
W. Jay Ennisson
BY
ATTORNEY

No. 844,568. PATENTED FEB. 19, 1907.
W. J. ENNISSON.
TYPE JUSTIFYING MACHINE.
APPLICATION FILED MAY 5, 1902.

32 SHEETS—SHEET 7.

WITNESSES:
Joseph Merritt.
H. Mallum

INVENTOR
W. Jay Ennisson
BY
ATTORNEY

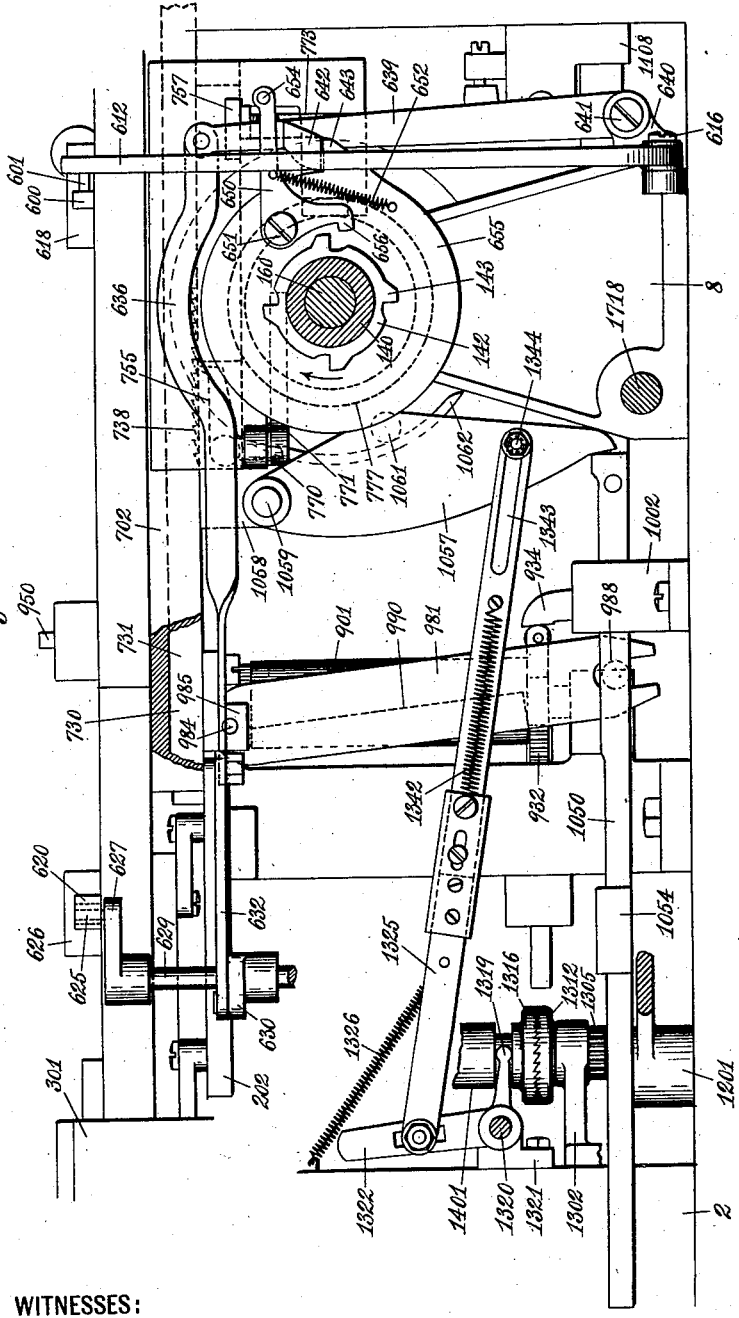

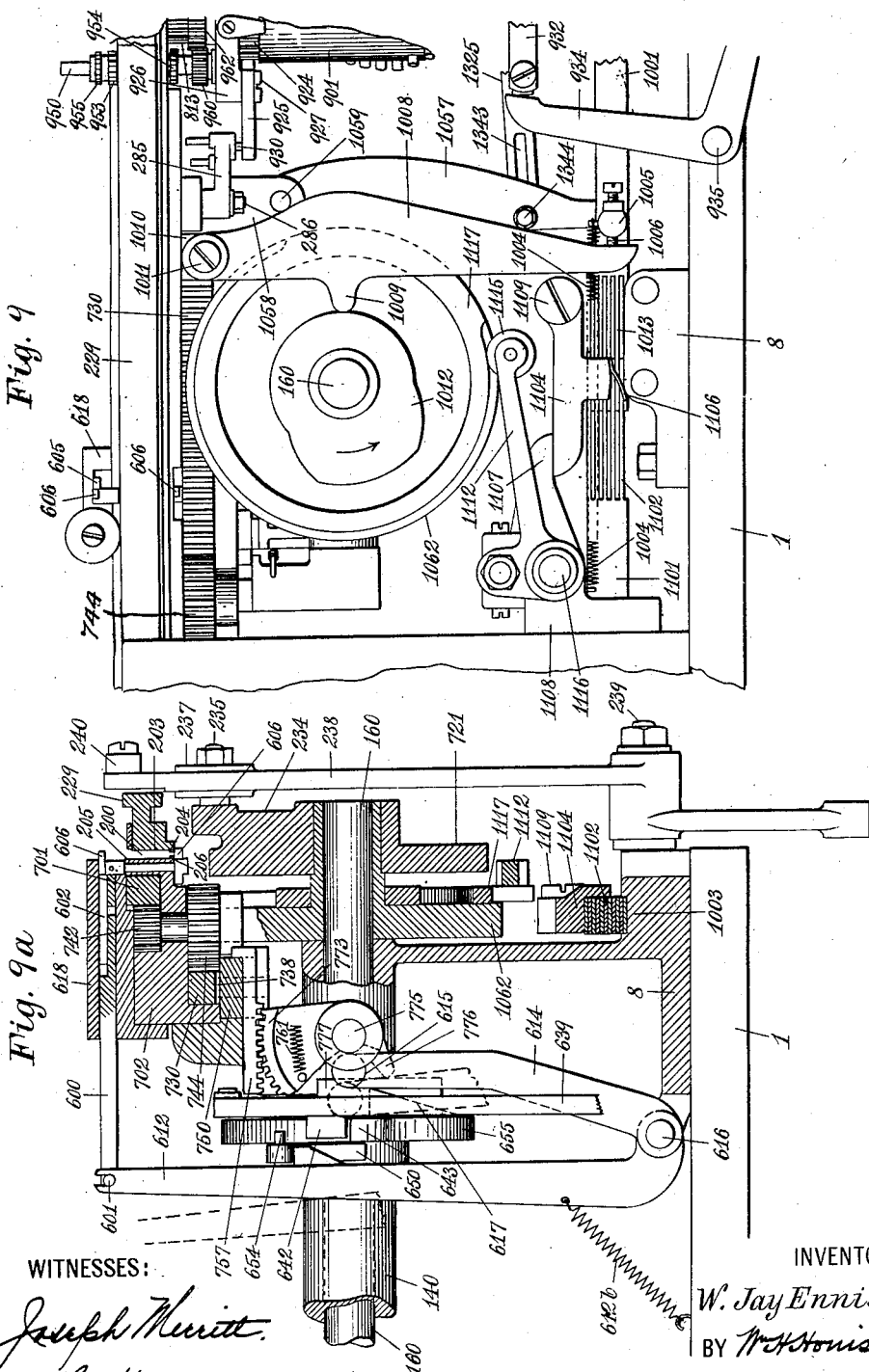

No. 844,568. PATENTED FEB. 19, 1907.
W. J. ENNISSON.
TYPE JUSTIFYING MACHINE.
APPLICATION FILED MAY 5, 1902.

32 SHEETS—SHEET 10.

WITNESSES:
Joseph Merritt
H. Mallner

INVENTOR
W. Jay Ennisson
BY W. H. Honiss
ATTORNEY

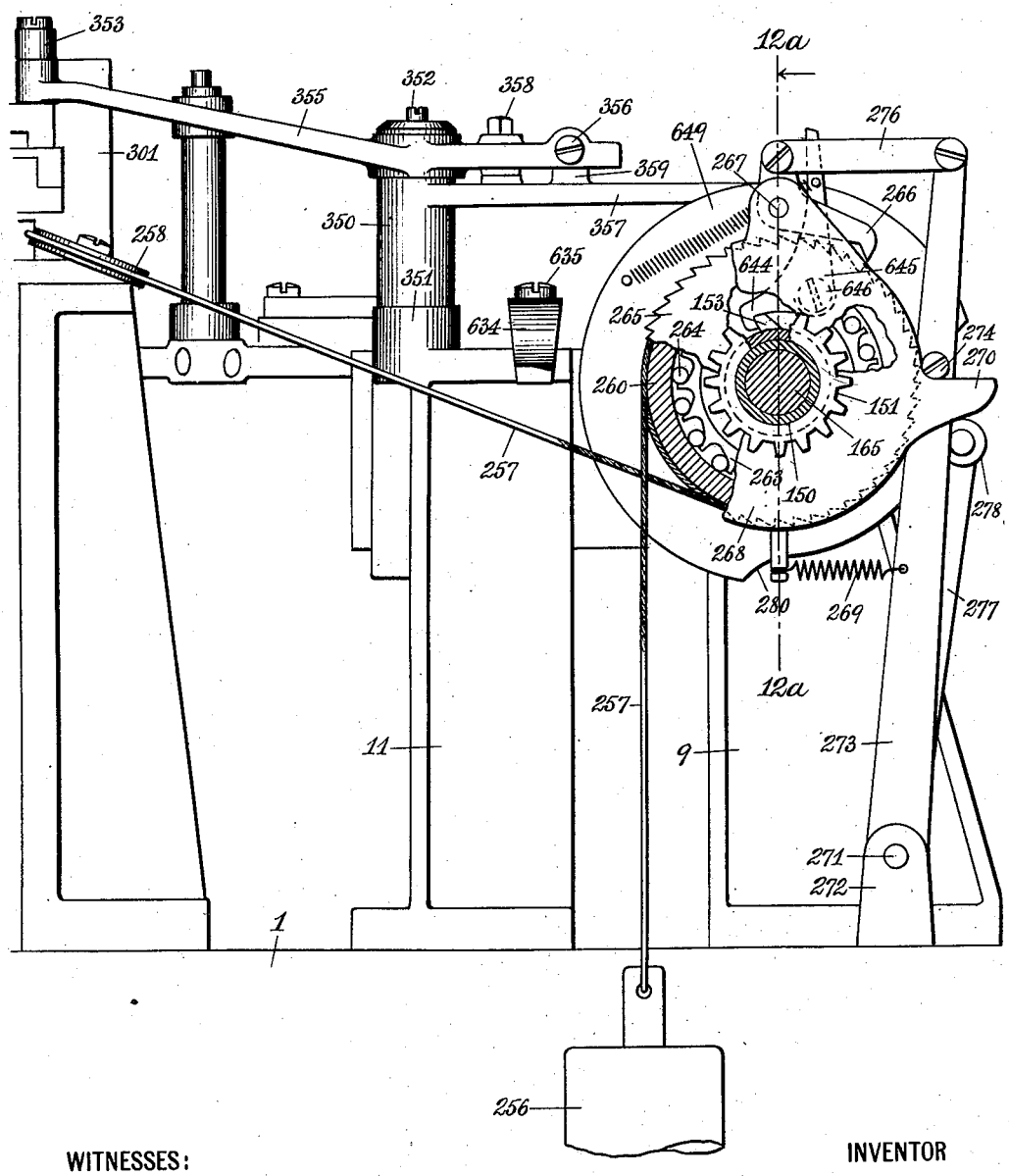

No. 844,568. PATENTED FEB. 19, 1907.
W. J. ENNISSON.
TYPE JUSTIFYING MACHINE.
APPLICATION FILED MAY 5, 1902.
32 SHEETS—SHEET 12.
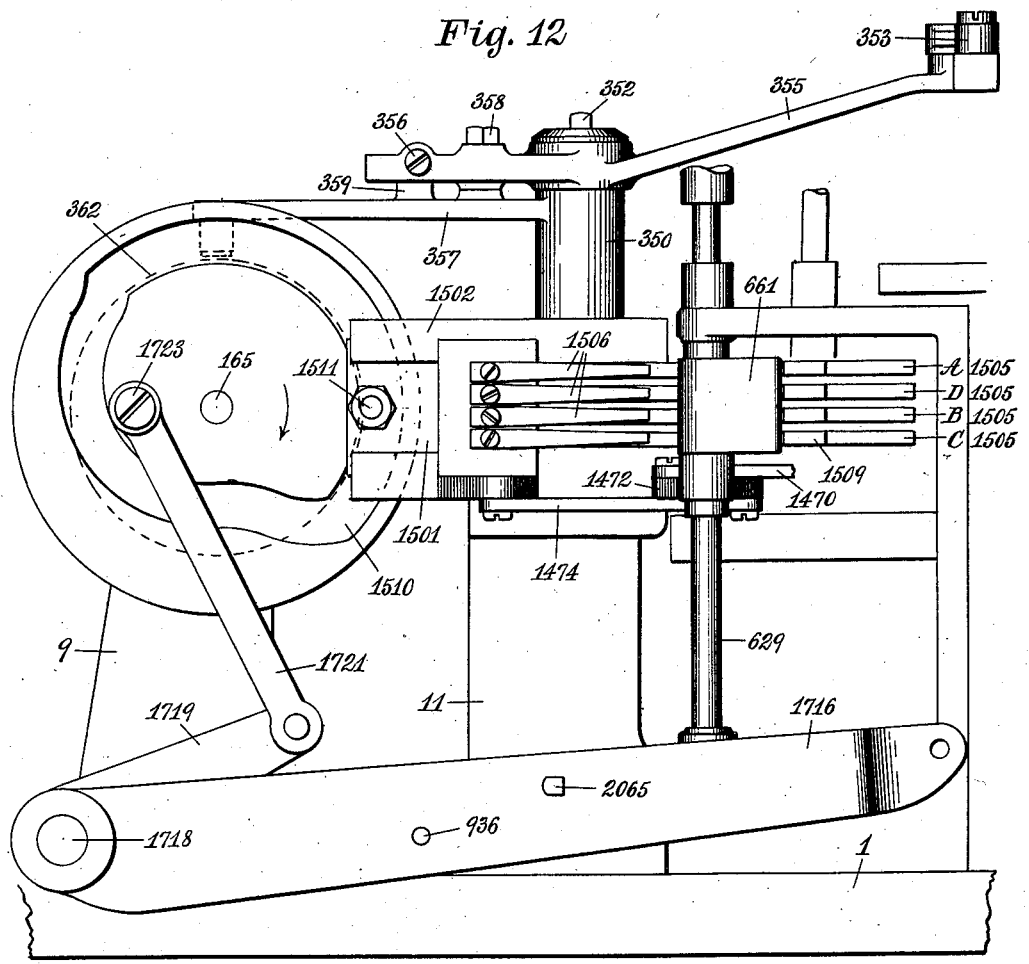
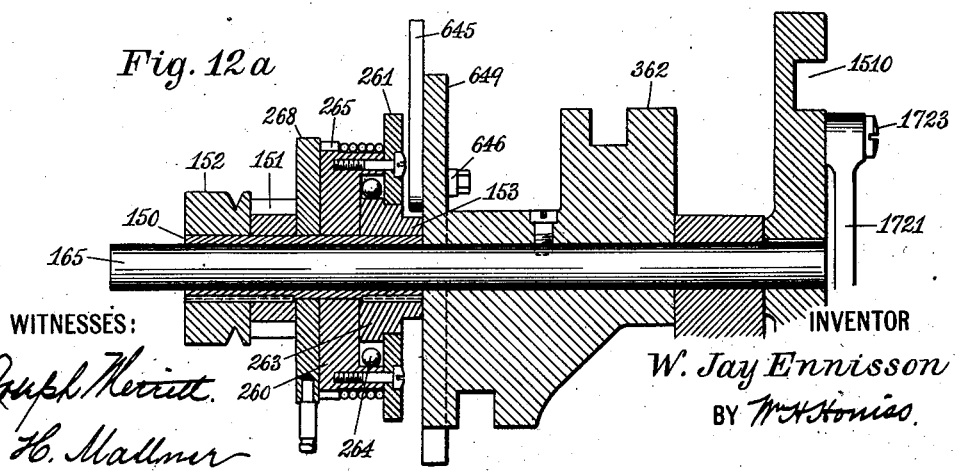

No. 844,568. PATENTED FEB. 19, 1907.
W. J. ENNISSON.
TYPE JUSTIFYING MACHINE.
APPLICATION FILED MAY 5, 1902.

32 SHEETS—SHEET 13.

WITNESSES:
Joseph Merritt
H. Mallmer

INVENTOR
W. Jay Ennisson
BY W. H. Howiss.
ATTORNEY

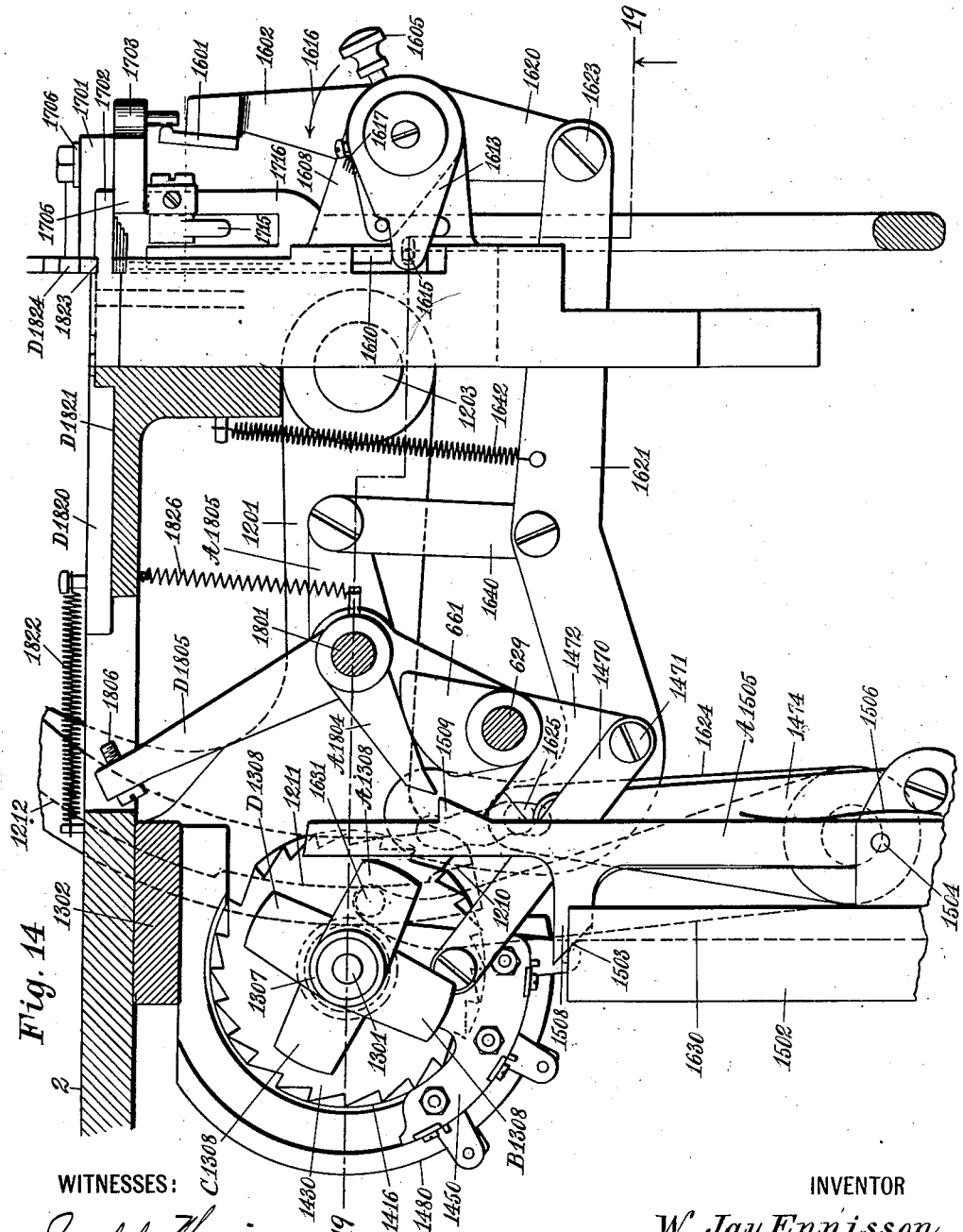

No. 844,568. PATENTED FEB. 19, 1907.
W. J. ENNISSON.
TYPE JUSTIFYING MACHINE.
APPLICATION FILED MAY 5, 1902.

32 SHEETS—SHEET 15.

WITNESSES:

INVENTOR
W. Jay Ennisson
BY
ATTORNEY

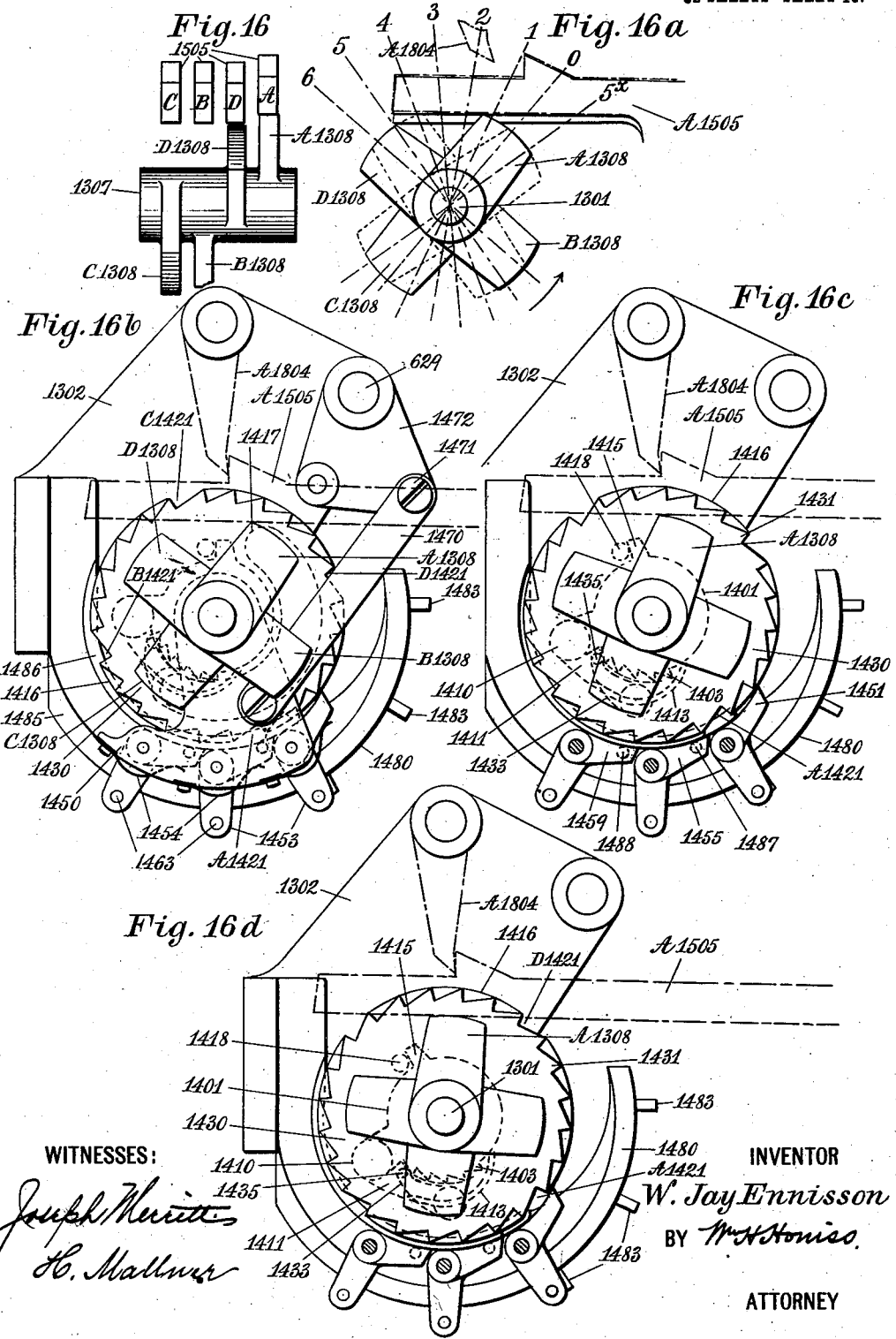

No. 844,568. PATENTED FEB. 19, 1907.
W. J. ENNISSON.
TYPE JUSTIFYING MACHINE.
APPLICATION FILED MAY 5, 1902.
32 SHEETS—SHEET 17.
Fig. 17 Fig. 17a
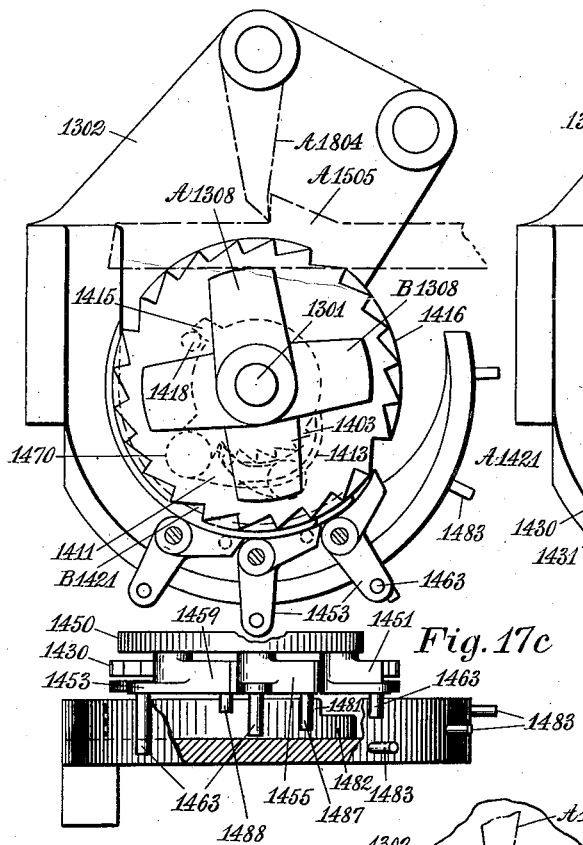
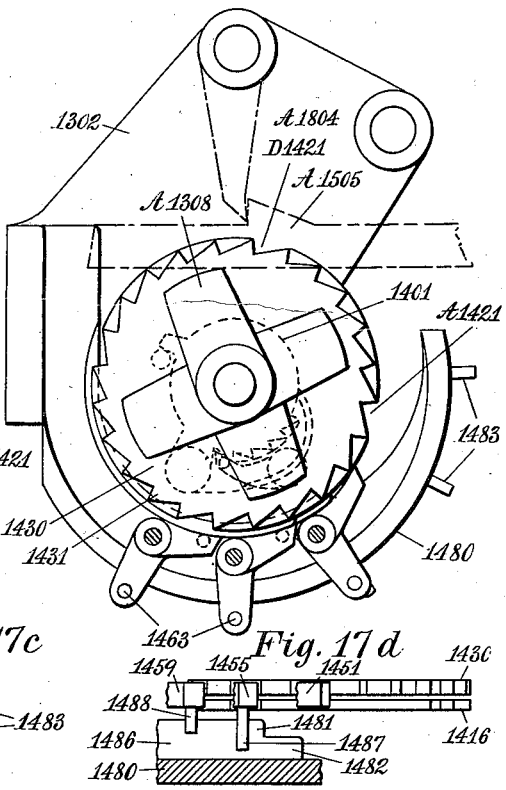
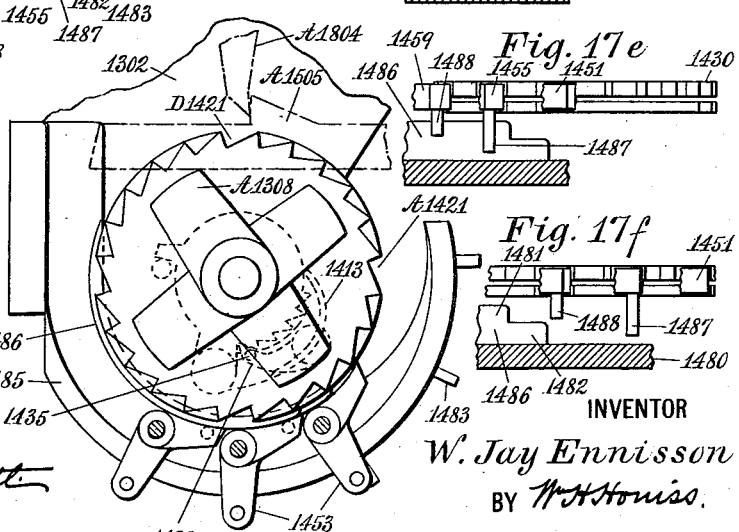
WITNESSES:
Joseph Merritt
H. Mallner
INVENTOR
W. Jay Ennisson
BY W. H. Houiss
ATTORNEY

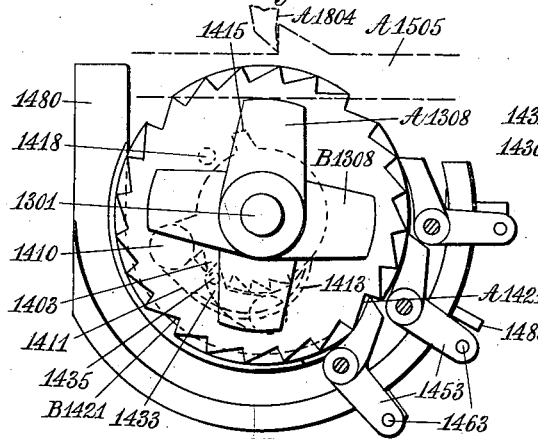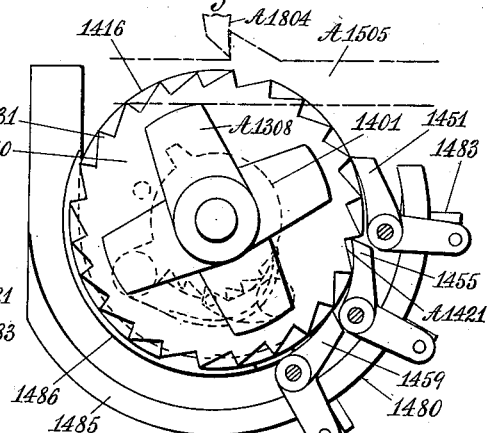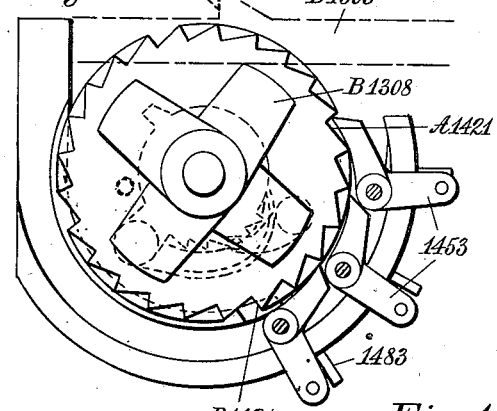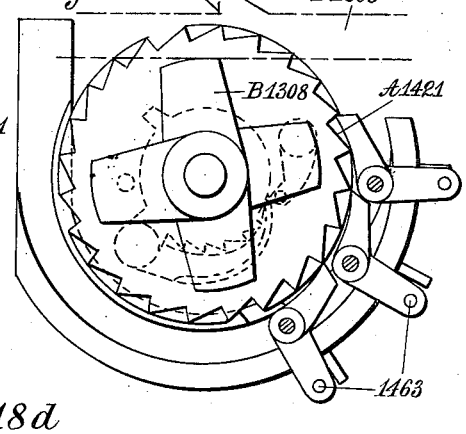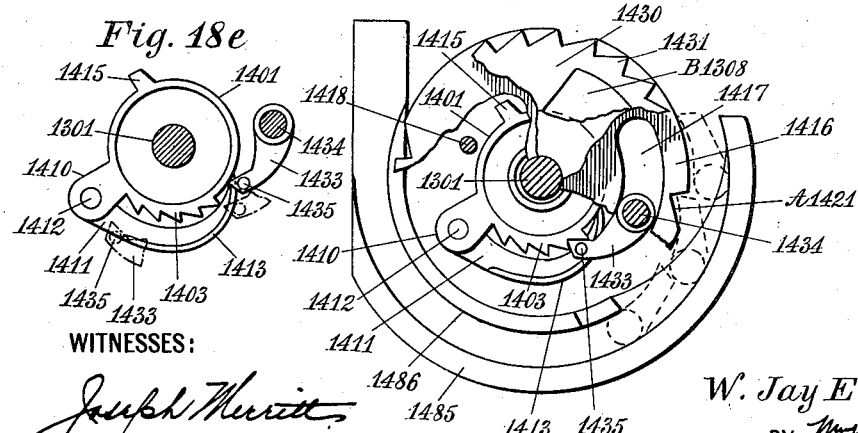

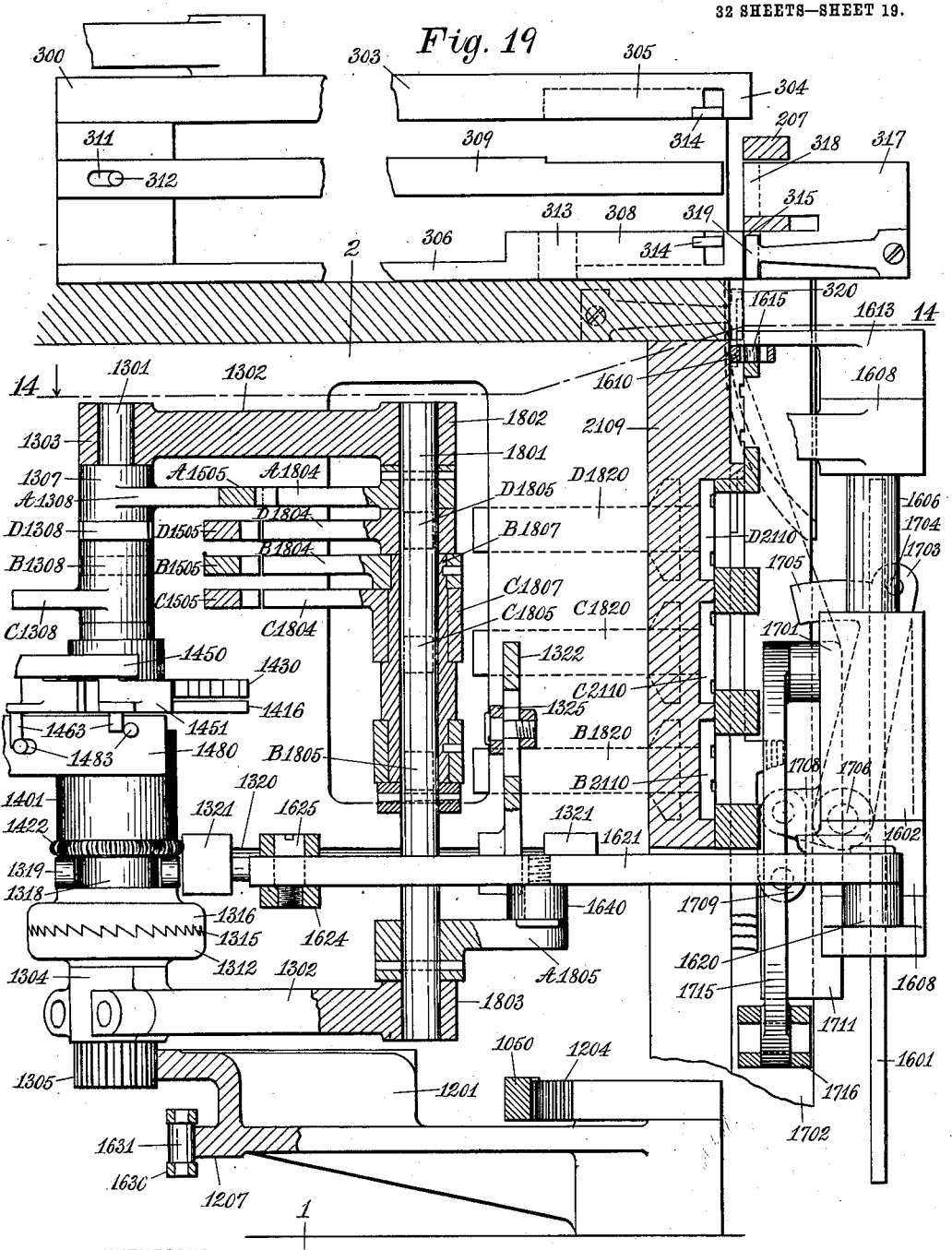

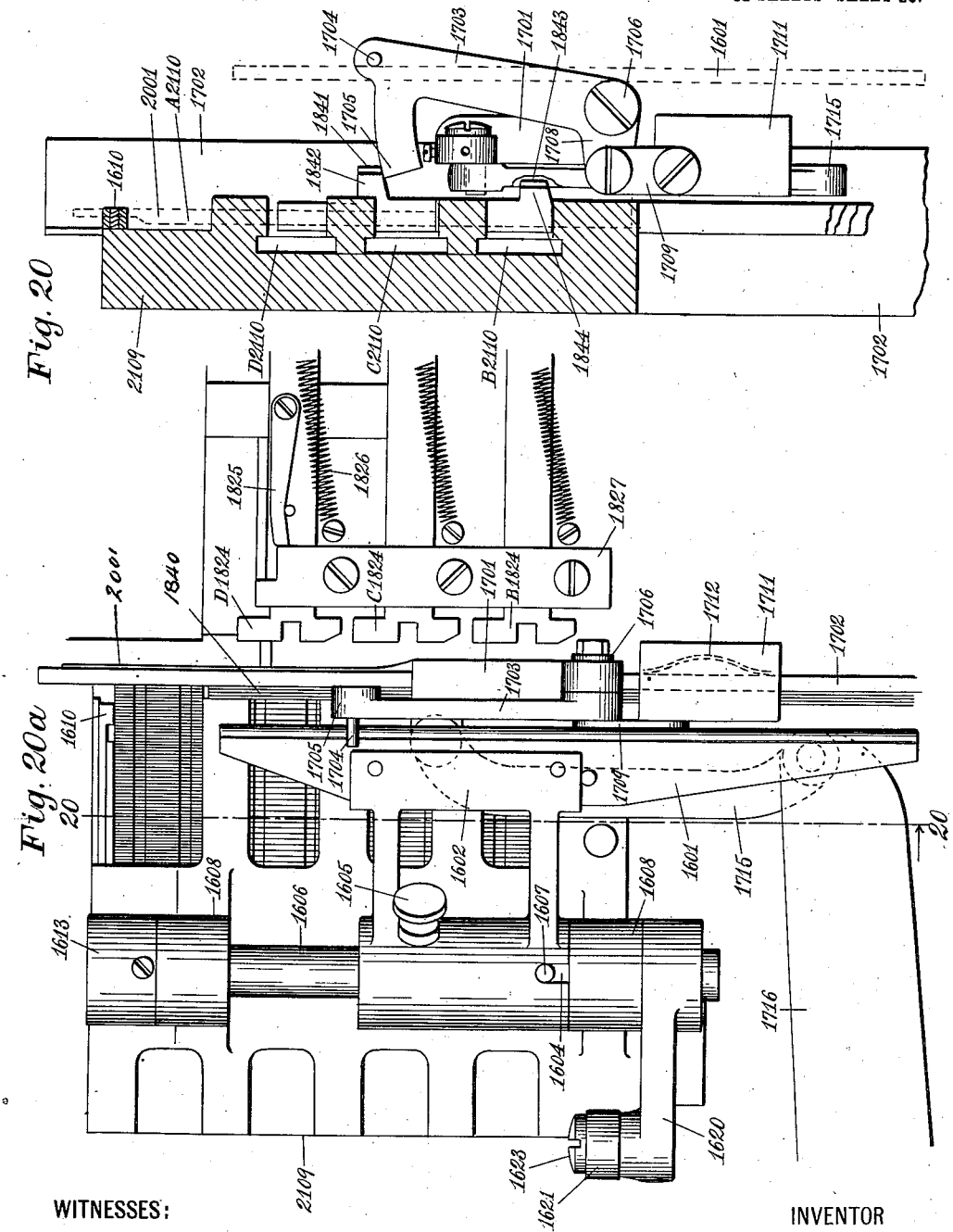

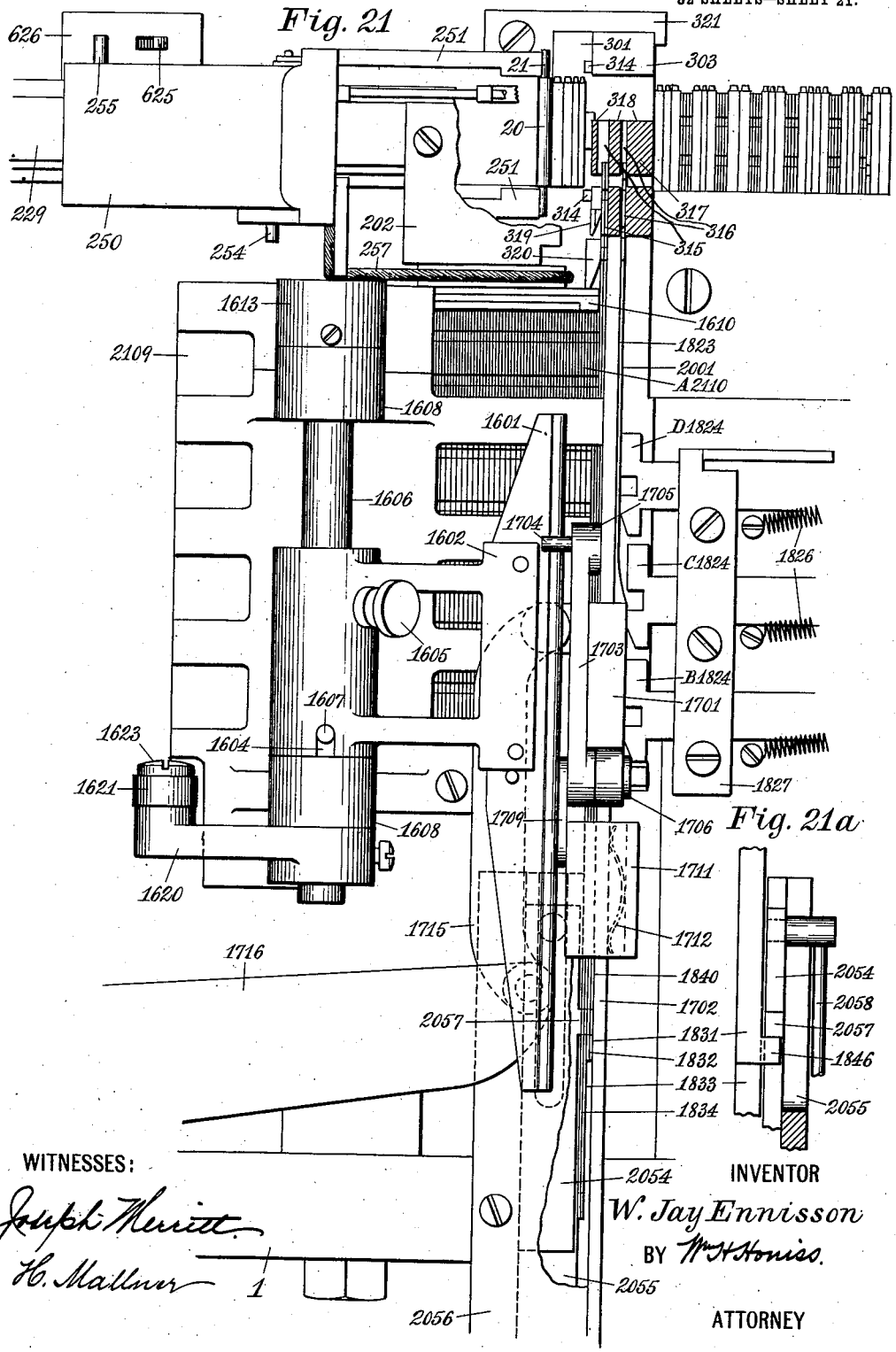

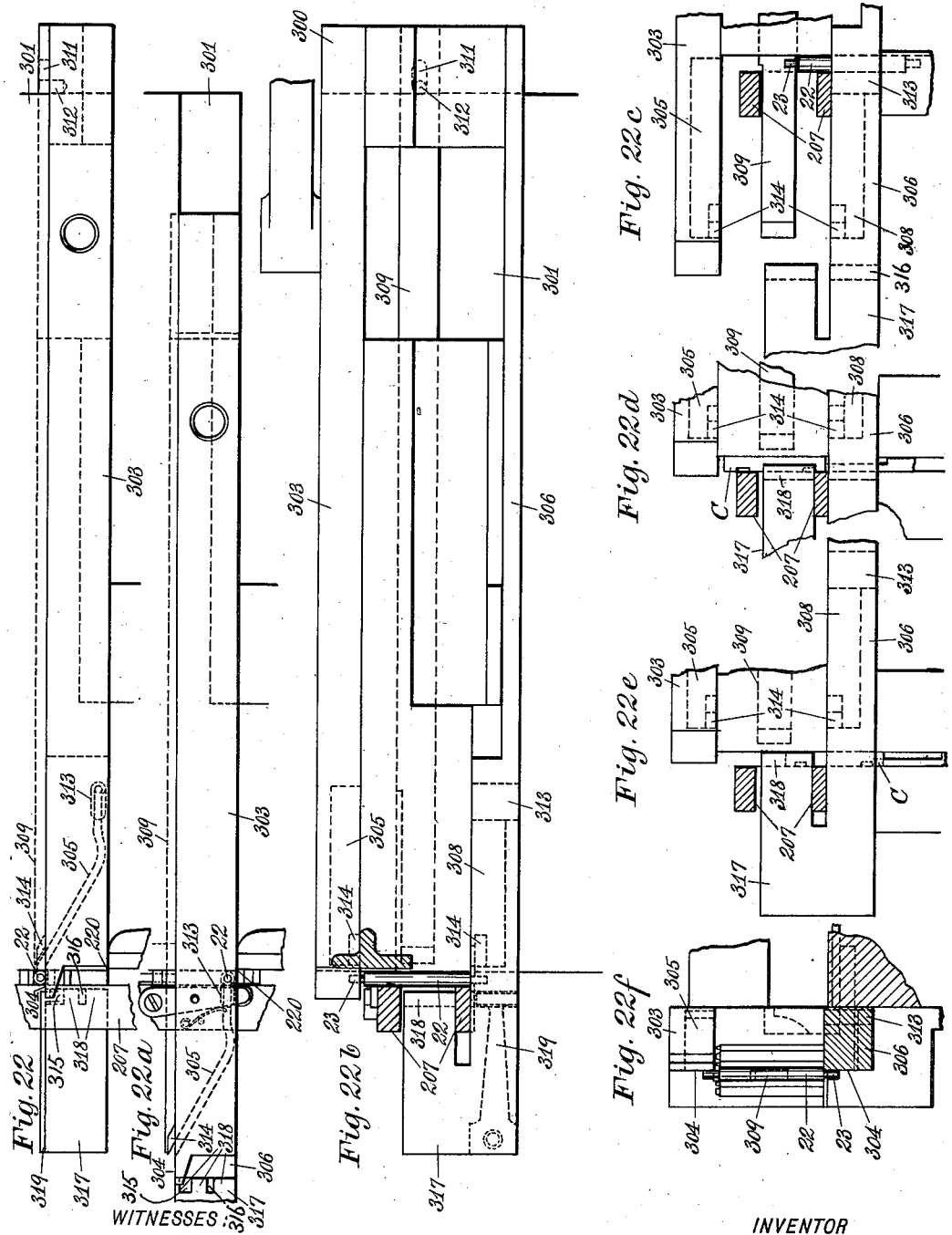

No. 844,568. PATENTED FEB. 19, 1907.
W. J. ENNISSON.
TYPE JUSTIFYING MACHINE.
APPLICATION FILED MAY 5, 1902.

32 SHEETS—SHEET 23.

WITNESSES:
Joseph Merritt
H. Mallum

INVENTOR
W. Jay Ennisson
BY W. H. Honiss
ATTORNEY

No. 844,568. PATENTED FEB. 19, 1907.
W. J. ENNISSON.
TYPE JUSTIFYING MACHINE.
APPLICATION FILED MAY 5, 1902.
32 SHEETS—SHEET 24.
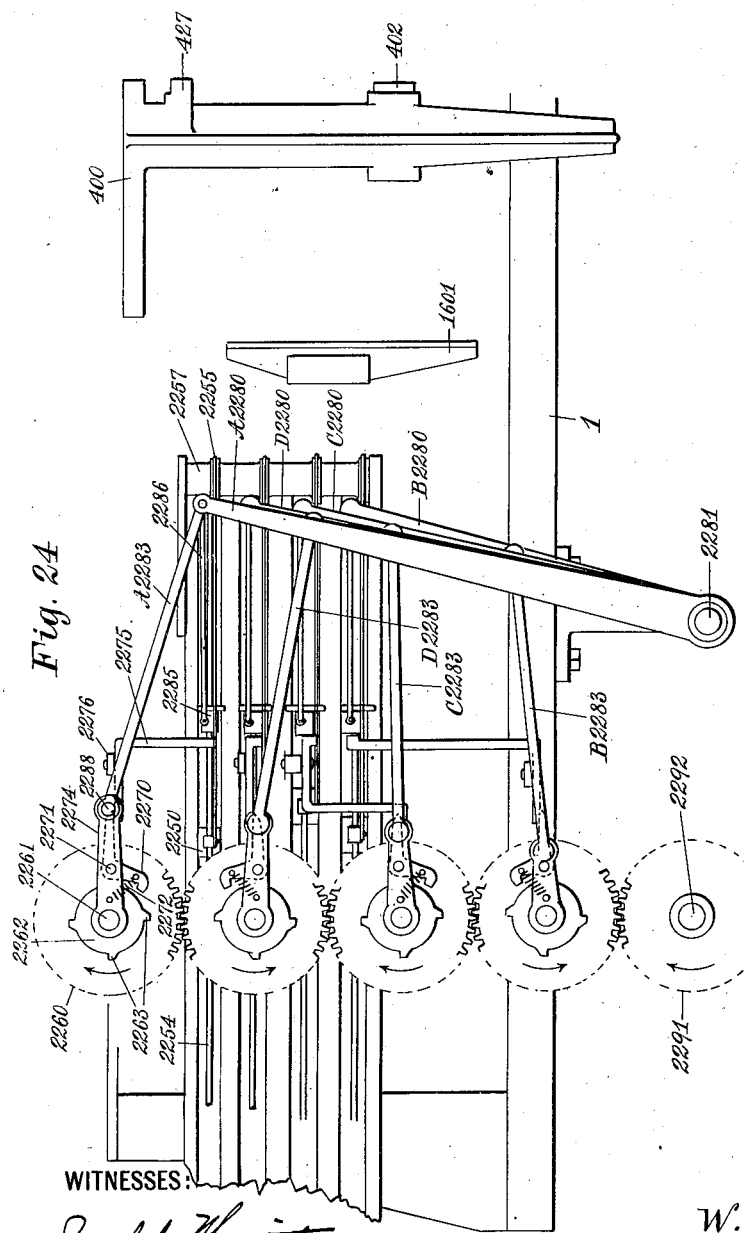
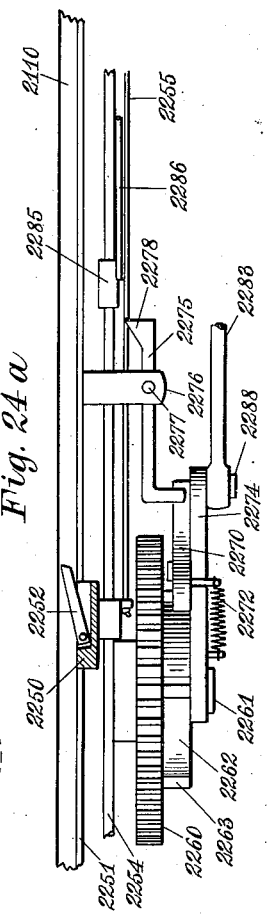
WITNESSES:
INVENTOR
W. Jay Ennisson
BY
ATTORNEY No. 844,568. PATENTED FEB. 19, 1907.
W. J. ENNISSON.
TYPE JUSTIFYING MACHINE.
APPLICATION FILED MAY 5, 1902.
32 SHEETS—SHEET 25.
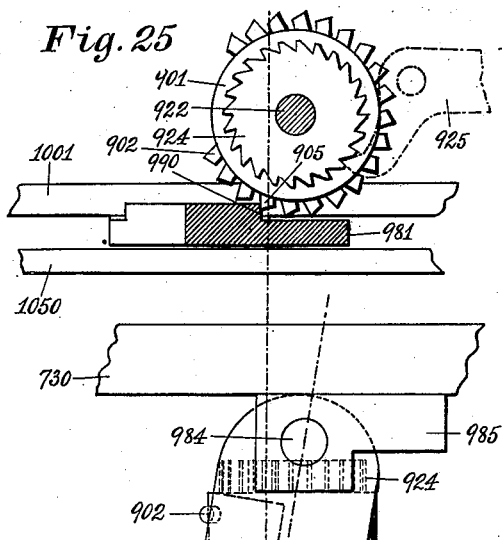
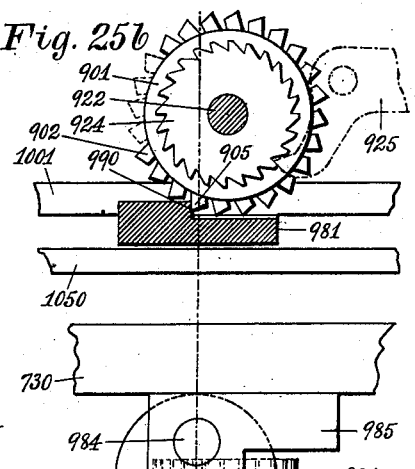
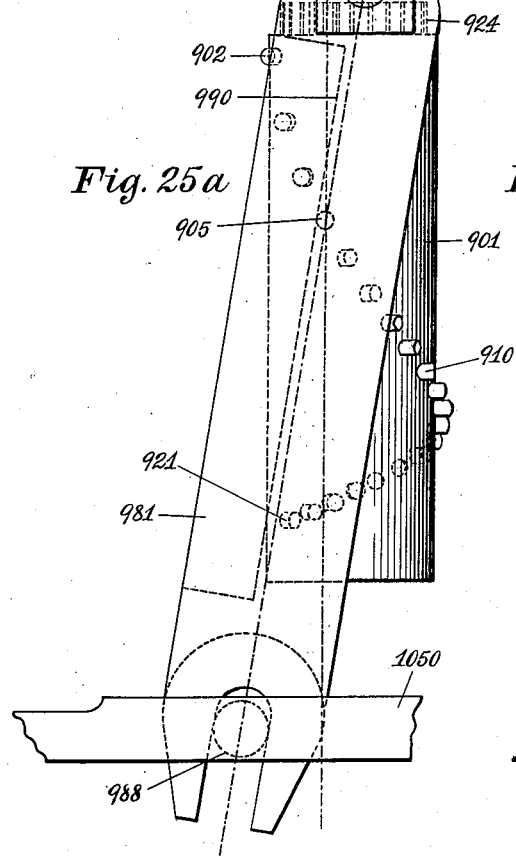
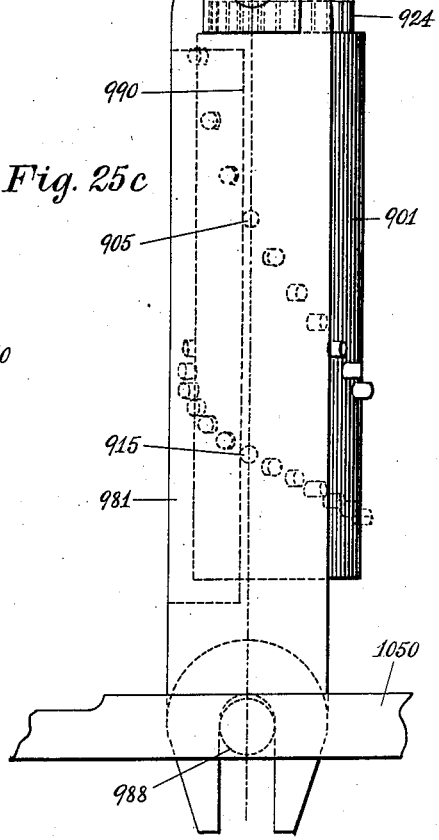
WITNESSES:
Joseph Merritt
H. Mallner
INVENTOR
W. Jay Ennisson
BY W H Honiss.
ATTORNEY No. 844,568. PATENTED FEB. 19, 1907.
W. J. ENNISSON.
TYPE JUSTIFYING MACHINE.
APPLICATION FILED MAY 5, 1902.

32 SHEETS—SHEET 26.

WITNESSES
Joseph Merritt
H. Mallner

INVENTOR
W. Jay Ennisson
BY W. H. Honiss ATTY

No. 844,568. PATENTED FEB. 19, 1907.
W. J. ENNISSON.
TYPE JUSTIFYING MACHINE.
APPLICATION FILED MAY 5, 1902.

32 SHEETS—SHEET 27.

WITNESSES:
Joseph Merritt
H. Mallur

INVENTOR
W. Jay Ennisson
BY
ATTORNEY

No. 844,568. PATENTED FEB. 19, 1907.
W. J. ENNISSON.
TYPE JUSTIFYING MACHINE.
APPLICATION FILED MAY 5, 1902.

WITNESSES:

INVENTOR
W. Jay Ennisson
BY
ATTORNEY

No. 844,568. PATENTED FEB. 19, 1907.
W. J. ENNISSON.
TYPE JUSTIFYING MACHINE.
APPLICATION FILED MAY 5, 1902.
32 SHEETS—SHEET 29.
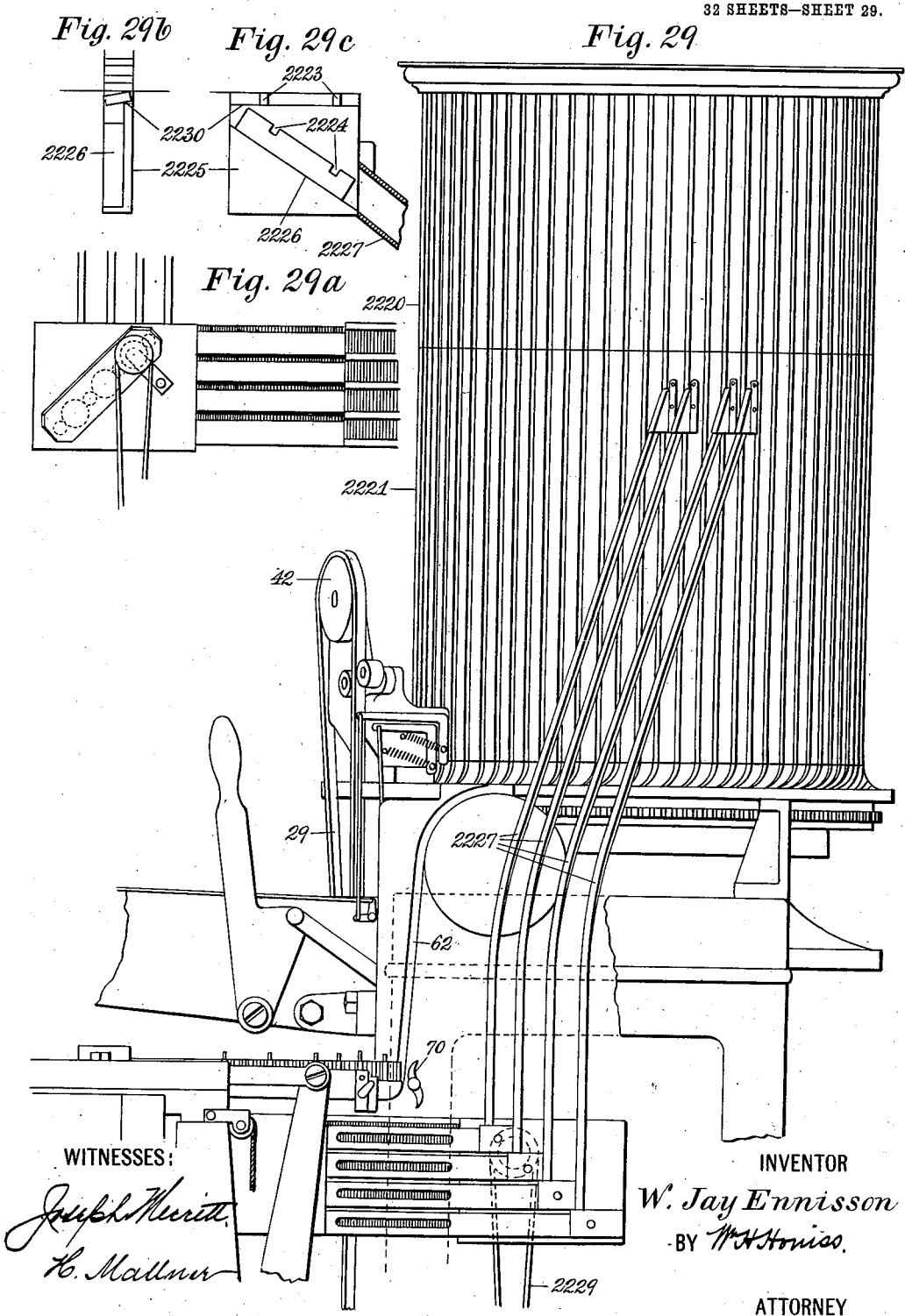
WITNESSES:
INVENTOR
W. Jay Ennisson
BY
ATTORNEY

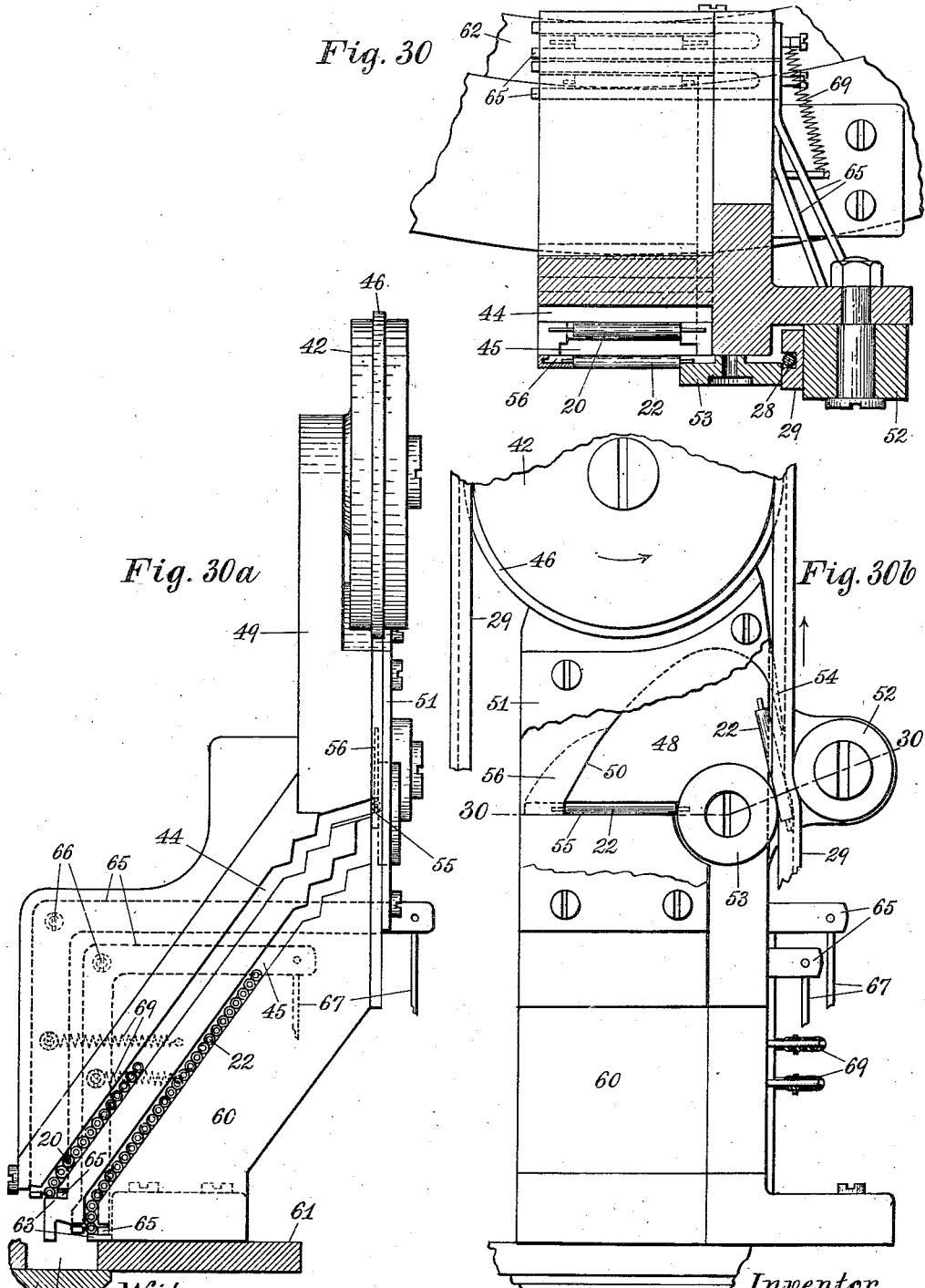

No. 844,568. PATENTED FEB. 19, 1907.
W. J. ENNISSON.
TYPE JUSTIFYING MACHINE.
APPLICATION FILED MAY 5, 1902.
32 SHEETS—SHEET 31.
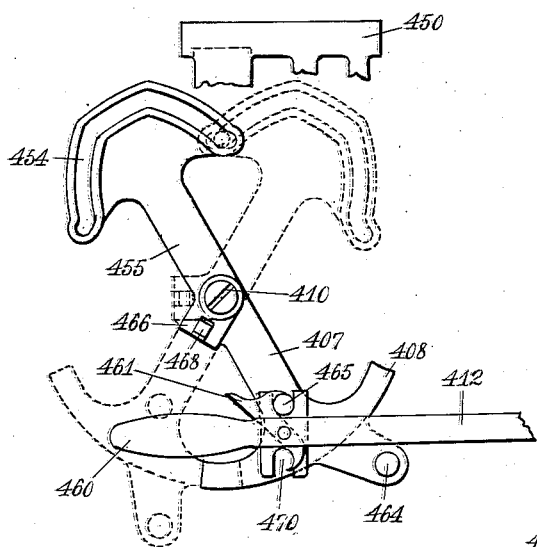
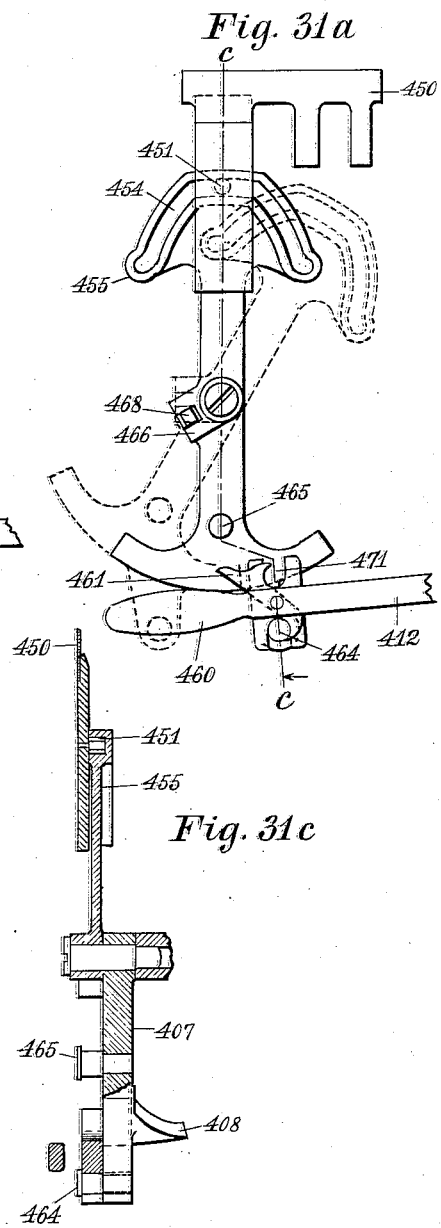
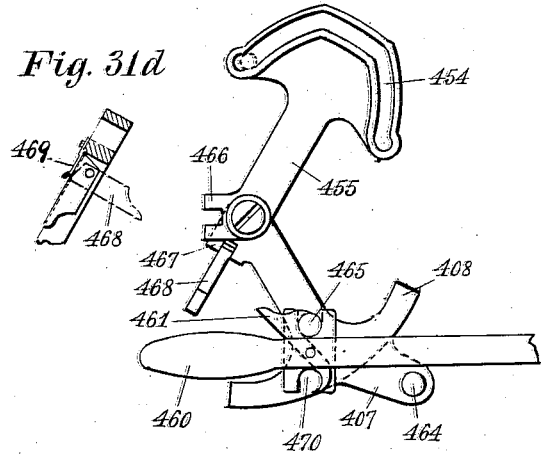
Witnesses
Joseph Merritt
H. Mallner
Inventor
W. Jay Ennisson
By W. H. Honiss Atty.

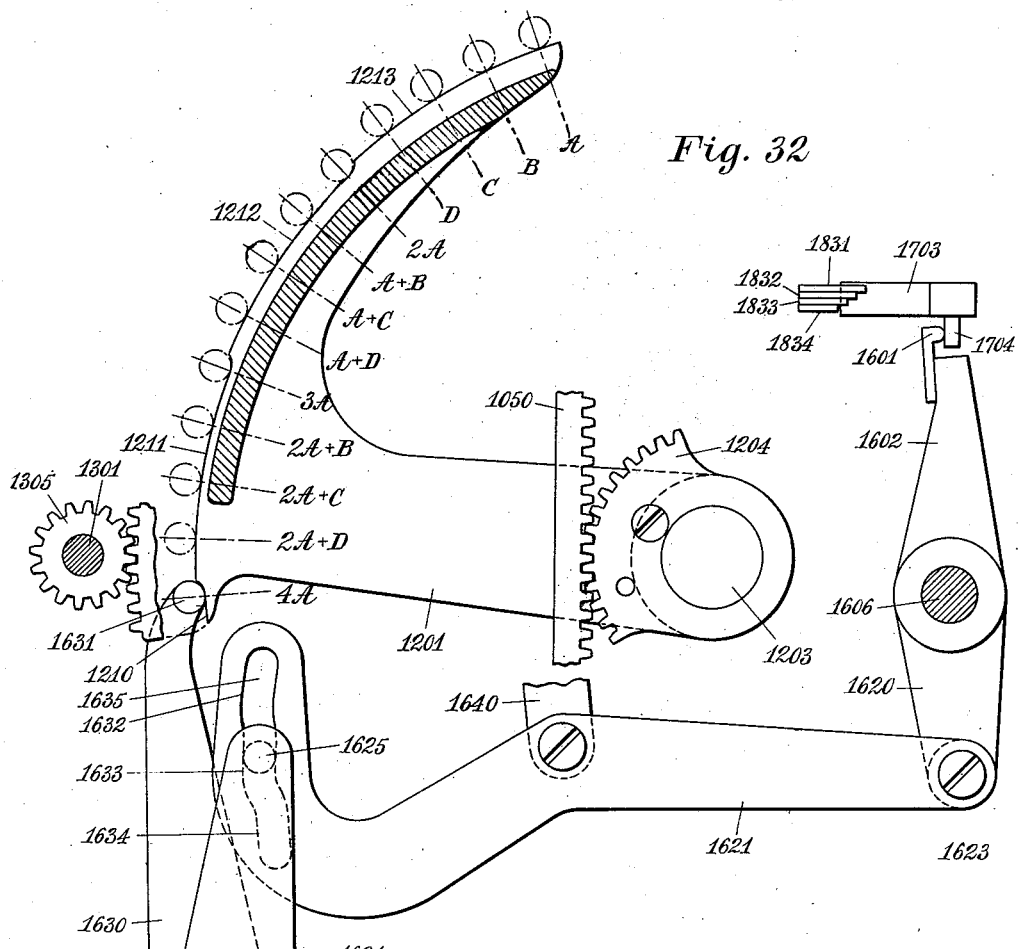
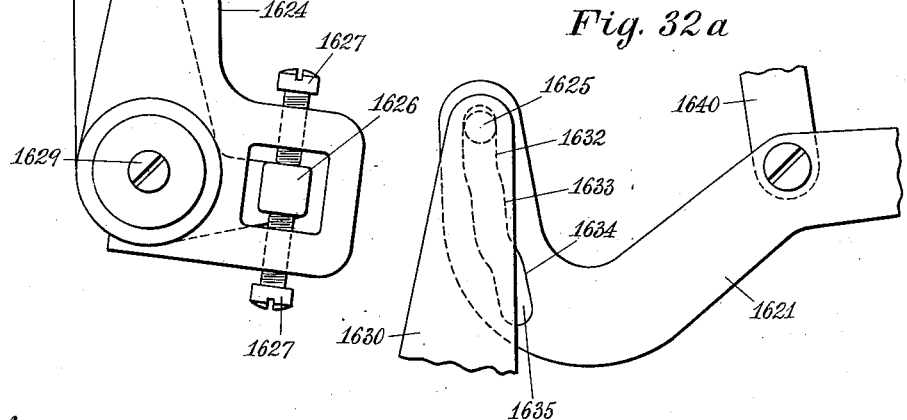

UNITED STATES PATENT OFFICE.

WALTER JAY ENNISSON, OF NEW YORK, N. Y., ASSIGNOR TO THE UNITYPE COMPANY, A CORPORATION OF NEW JERSEY.

TYPE-JUSTIFYING MACHINE.

No. 844,568.  Specification of Letters Patent.  Patented Feb. 19, 1907.

Application filed May 5, 1902. Serial No. 106,010.

*To all whom it may concern:*

Be it known that I, WALTER JAY ENNISSON, a citizen of the United States of America, and a resident of the borough of Manhattan, city and county of New York, and State of New York, have invented certain new and useful Improvements in Type-Justifying Machines, of which the following is a specification.

This invention relates to automatic type-justifying machines, and includes improved means for separating a continuous composed line of type into separate lines of approximately the required length for measuring these roughly-divided lines to ascertain the required amount of spacing and justification; for dividing the shortage ascertained by the measurement into the number of spaces in the line; for selecting and combining the required spaces in accordance with the said measurement and division; for inserting these selected spaces in their proper places in the line and delivering the justified lines into a galley.

This invention furthermore comprises many devices auxiliary or supplementary to the principal features above designated, among which may be mentioned the devices for feeding and circulating the temporary line or word separators between this justifying-machine and the composing and distributing machine, with which it is herein shown to be employed, for removing these separators from the lines in connection with the justifying operation and returning them to the composing-machine; also devices for conveying the final justifying-spacers from the distributing-channels of the machine into their respective channels of the justifying apparatus.

The machine herein shown and described as an embodiment of my present invention is employed in connection with a type-composing machine from which the type is forwarded in a continuous line. In the operation of composing this continuous line the separations between words and the separations between the intended lines are maintained by means of temporary separators, which are played into the line by the operator, preferably by means of a word-key and a line-key in the keyboard of the machine, these keys being connected with the releasing devices of the respective channels in or adjacent to the composing-machine in which these separators are stored, those channels being replenished during the operation of the machine by conveying the separators back to those channels as they are discarded from the lines during justification.

The description of the drawings and the detailed description of the machine will be better understood if prefaced by a brief explanation of the operations to which the type are directly subjected.

A continuous line of the composed type with its temporary separators in the spaces between words and in the separations between the lines is fed into the justifying-machine from its associated composing-machine through a continuous type-channel or typeway in which the type stand upright upon their feet.

Both kinds of separators project at both ends beyond the length of the type, the separators between the lines being somewhat longer than those between the words. As each line-separator arrives at a predetermined point in the tpyeway its projecting ends trip a trigger, which starts the line mechanism in operation, moving forward a line-grab which engages with the line-separator and carries it with its preceding line of type into the measuring zone of the machine, passing by a star-wheel escapement, the teeth of which are engaged by the projecting ends of the separators, which operate to allow the star-wheel to turn to an extent in accordance with the number of separators in the line. This movement of the star-wheel which is thus directly related to the number of spaces in each line to be justified is transmitted to devices which adjust the measuring and dividing mechanism in a suitable relation for that line. Among these devices is a stop-jaw against which the line is compacted during the measuring operation, and this jaw is pushed forward by the operations of the star-wheel to an extent equaling all or a portion of the aggregated thickness of the separators in the line, so as to eliminate a corresponding amount of their measurement from the total measurement of the line. The line is next engaged by a jaw or pawl of the measuring mechanism, which operates to compact the line against the stop-jaw. The movement of this measuring-pawl required to thus compact the line, from a theoretical point representing the standard or required length of the line, represents the actual shortage of that line or the amount which must be supplied by justifying-spaces to fill out the line to the required measure. This actual shortage of the line is multiplied by a compound operation of the measuring mechanism, being divided by a varying divisor representing the number of spaces in each line to be justified and at the same time multiplied by a much larger constant factor, so as to obtain as the net result a constantly-multiplied movement representing the measurement of one of the line-spaces, which is transmitted to the justifying-spacer-selecting devices, this multiplied movement being desirable in order to have the spacer-selecting devices of a practical and substantial size. The measuring mechanism and the spacer-selecting devices having been thus set in accordance with the requirements shown by the measurement the line is next seized by a second grab, which pushes the line out of the measuring zone to a point adjacent to the galley mechanism. Here the foremost separator is engaged by a transversely-moving word-slide having cam-slots which engage the projecting ends of the separator and advance it, with its preceding word-type, still farther along the typeway to a point where the word is pushed into the galley and the separator drops through an aperture in the floor of the typeway uncovered by the movement of the word-slide. The succeeding word being stopped by a temporary barrier, a space is thus formed between the two words, into which the required spacer or combination of spacers, previously determined by the measuring operation upon that line and meanwhile selected by the selecting mechanism, is now injected. The word-slide then repeats its movement upon the next separator, which in turn is replaced by a spacer combination, and so on until the entire line has thus been treated and advanced in a justified condition into the galley.

Suitable interlocking mechanism is provided for starting, controlling, and stopping the respective devices in their proper sequence, so that the line mechanism cannot commence operations upon any line until the previous line has been disposed of by the word mechanism, and the word mechanism is started into action upon a given line only upon the completion of the operations of the line mechanism thereon.

Figure 2:
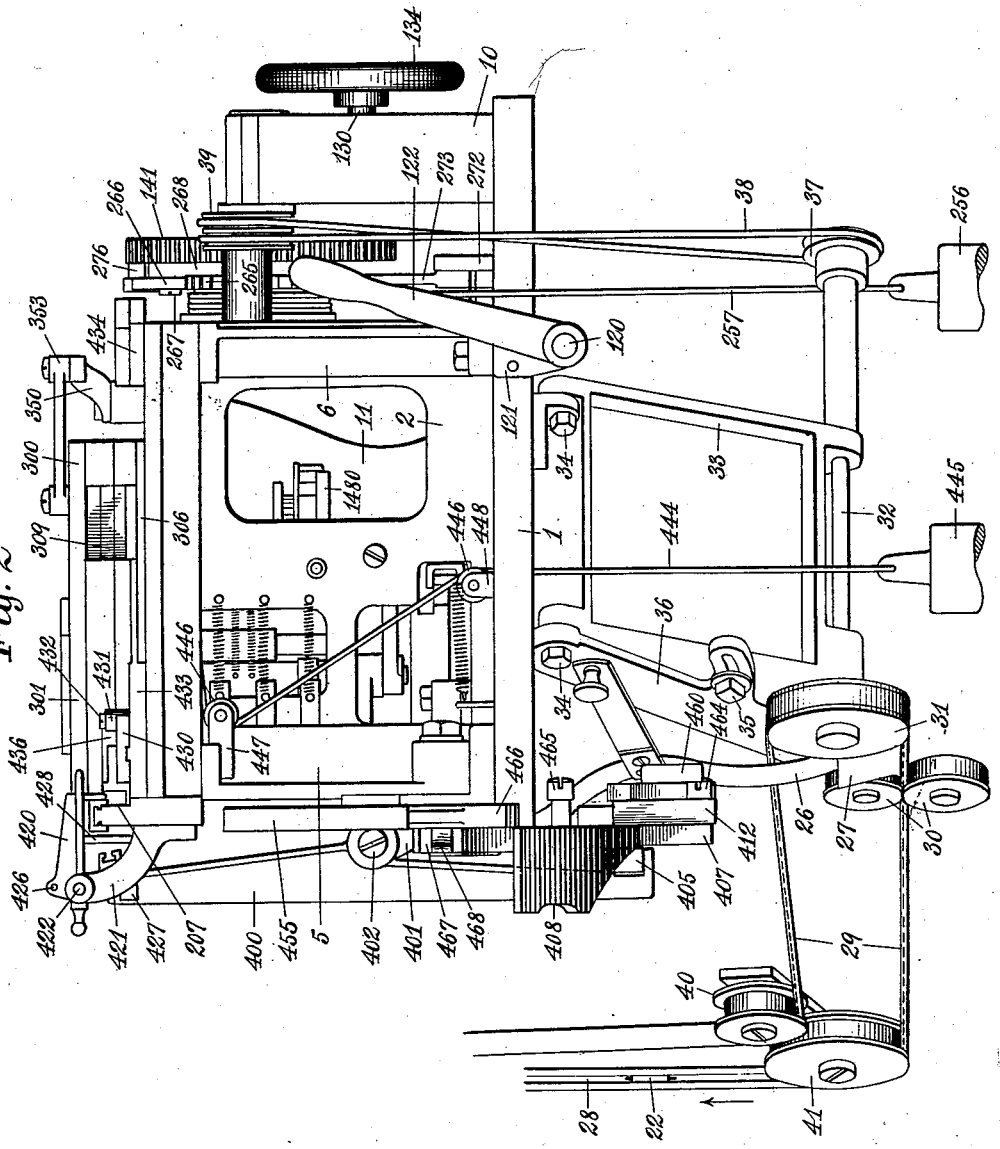
Figure 3:
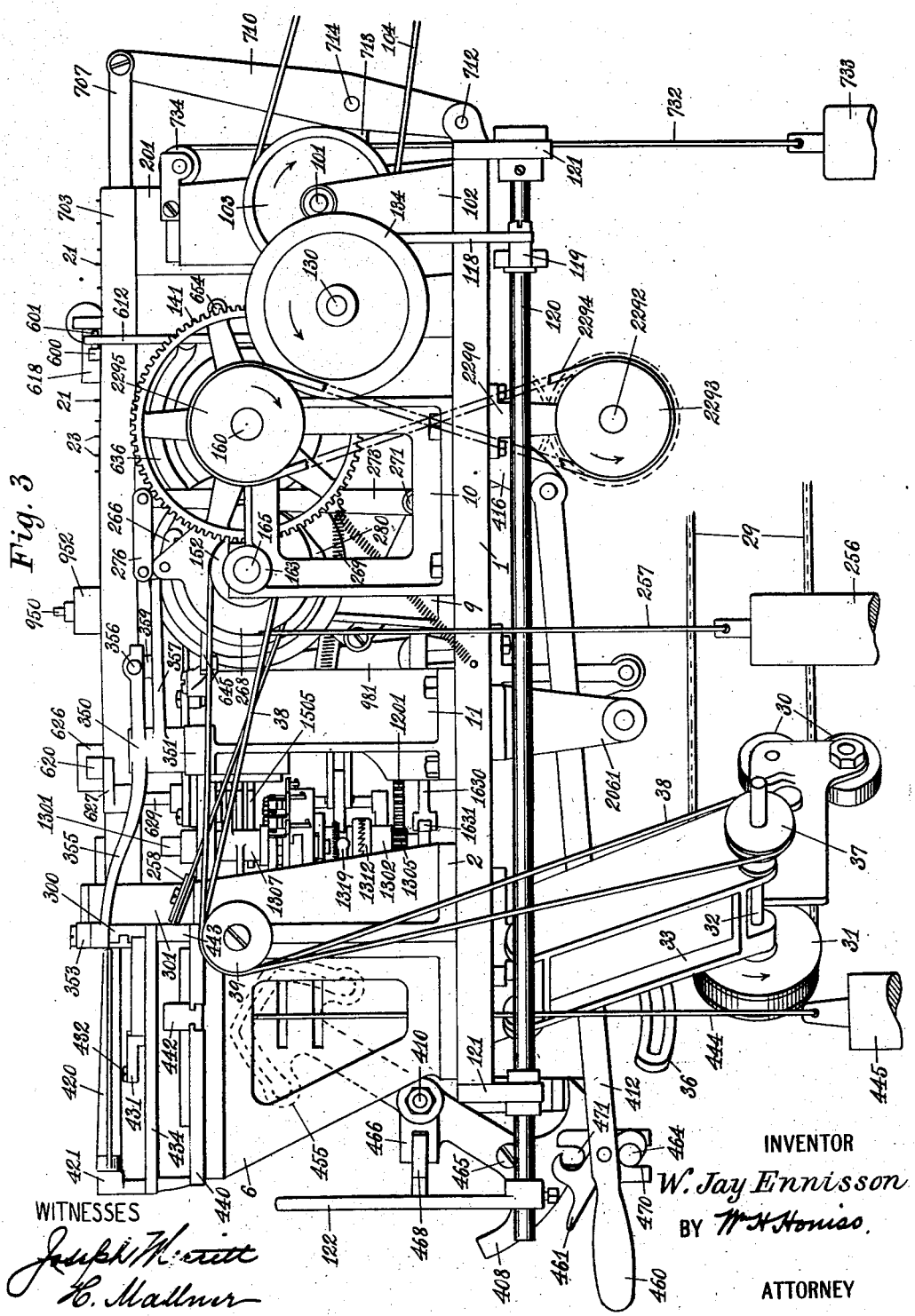
Figure 4:
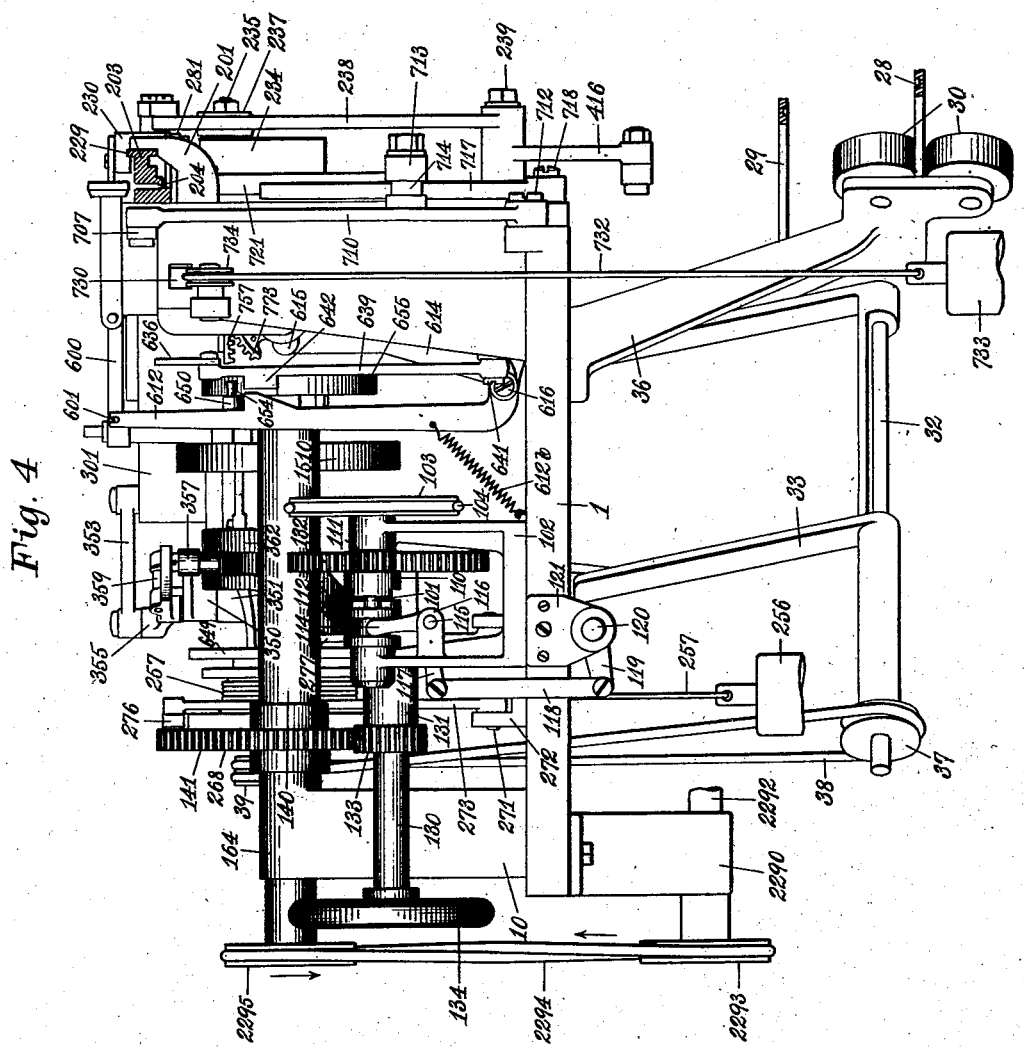
Figures 6, 6A:
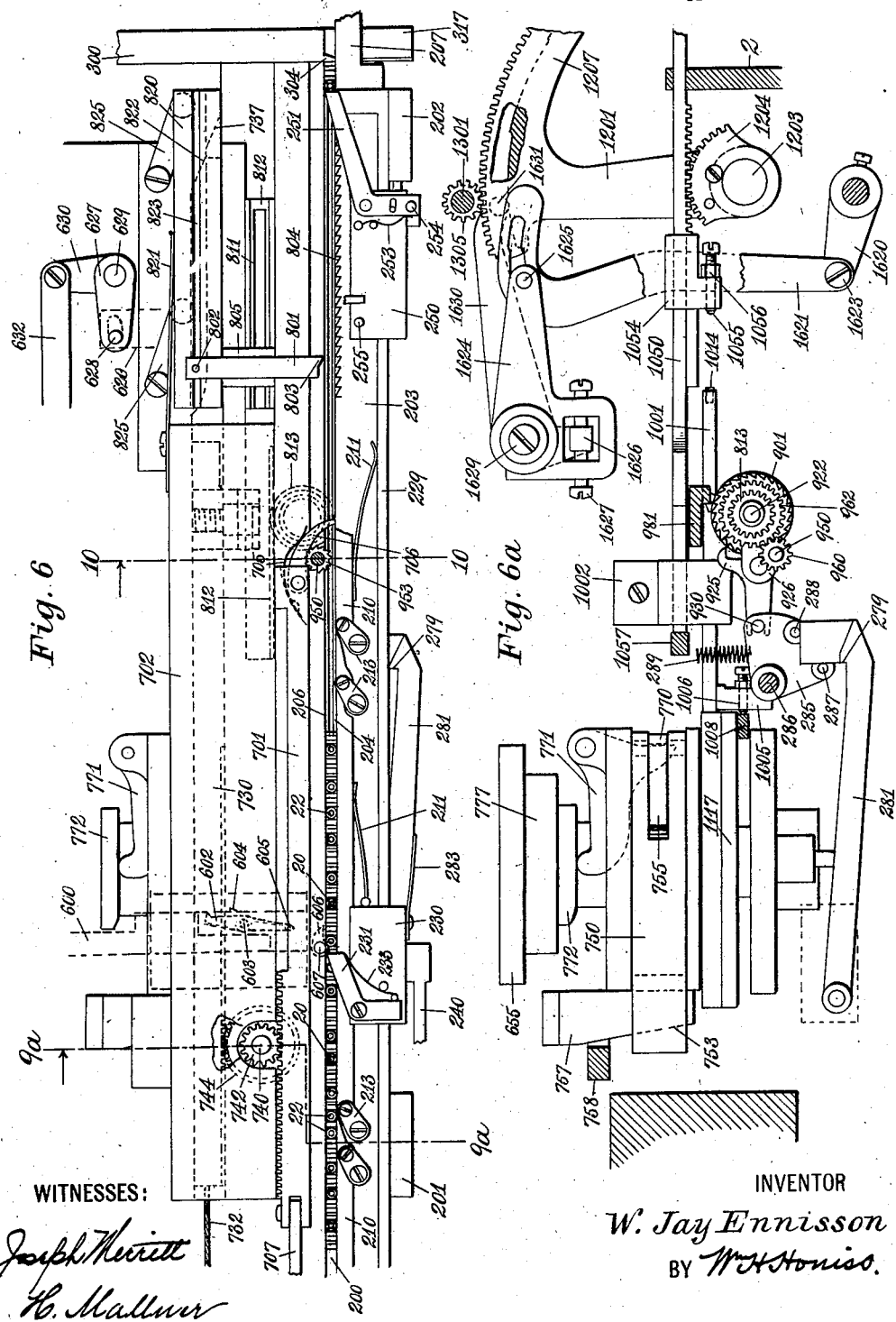
Figure 7:
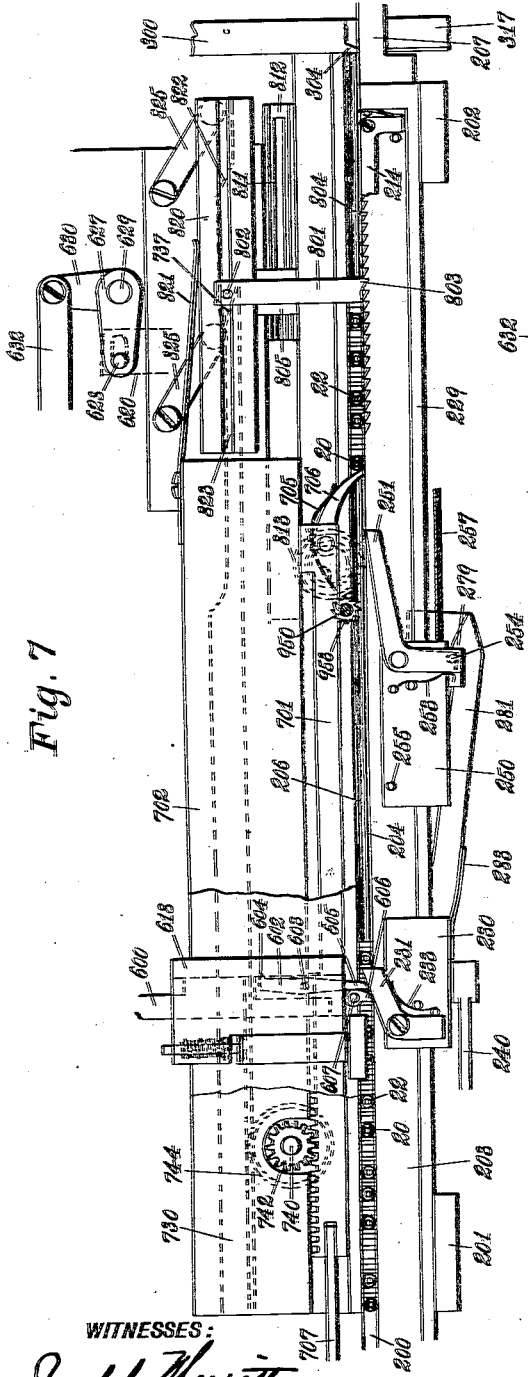
Figure 7A:
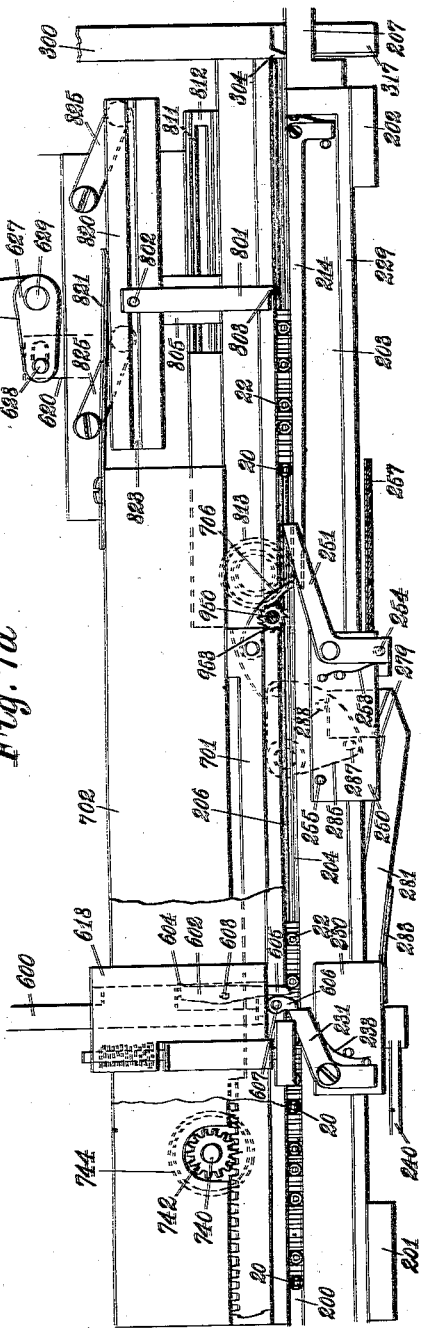
Figure 10:
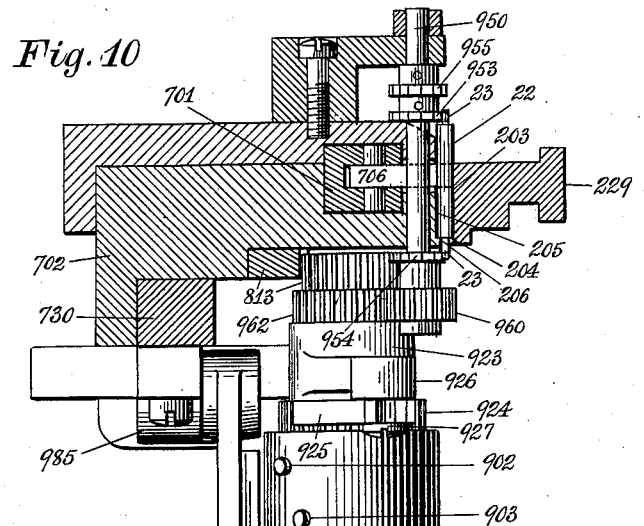
Figure 10A:
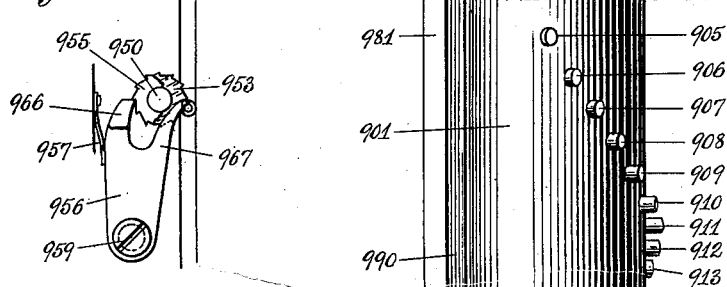
Figure 10B:
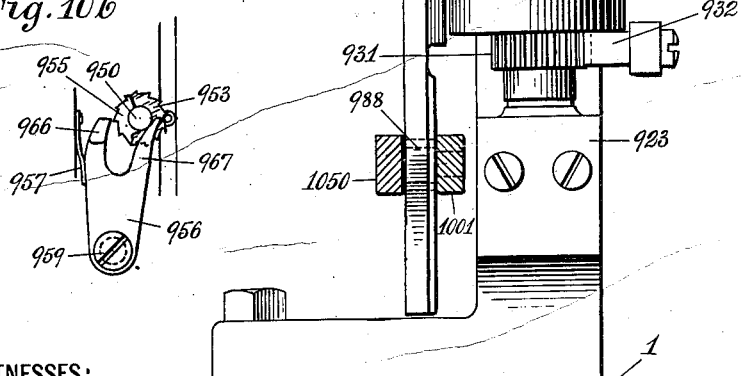
Figure 13:
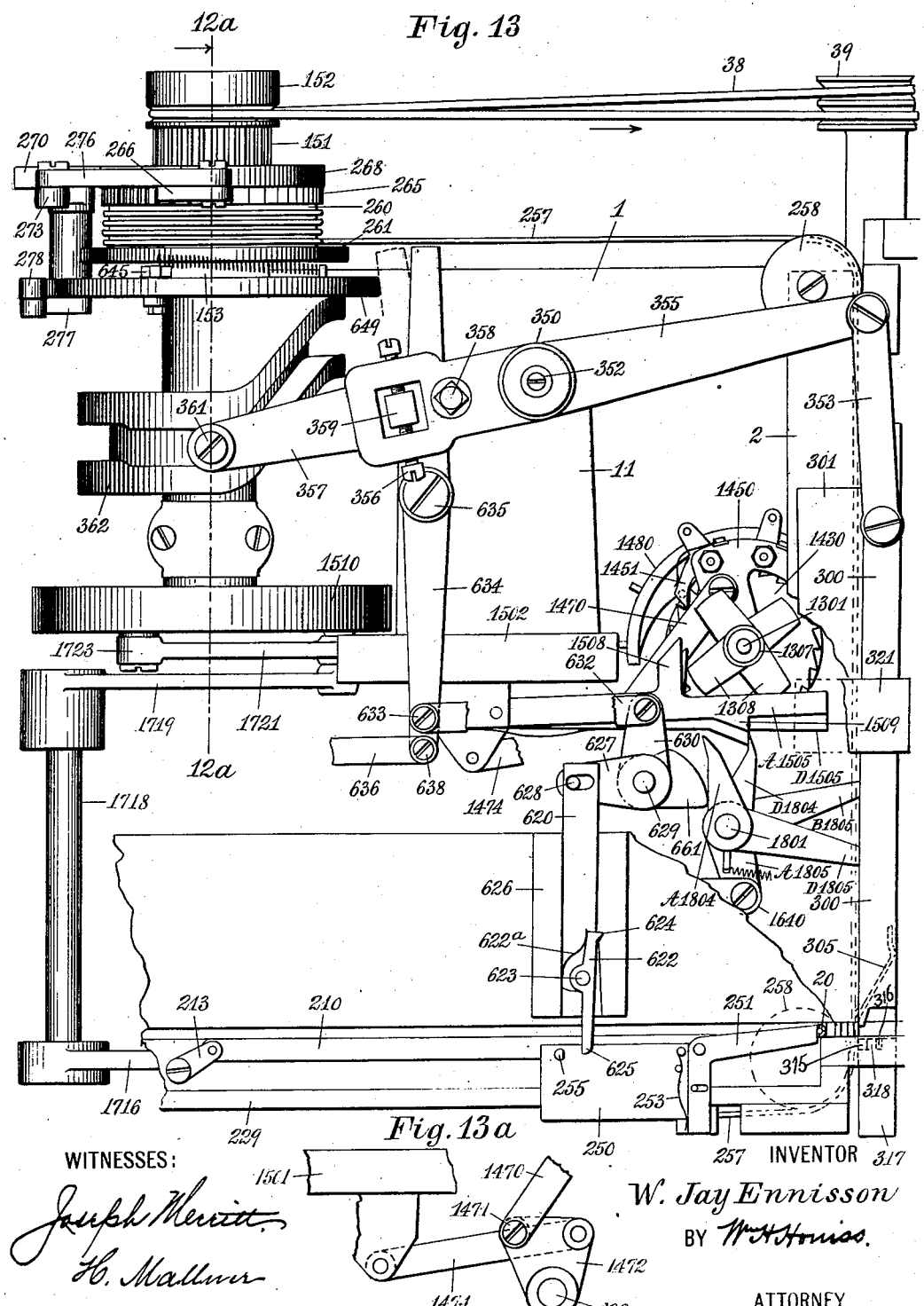
Figure 13A:
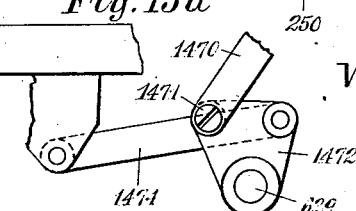
Figure 15:
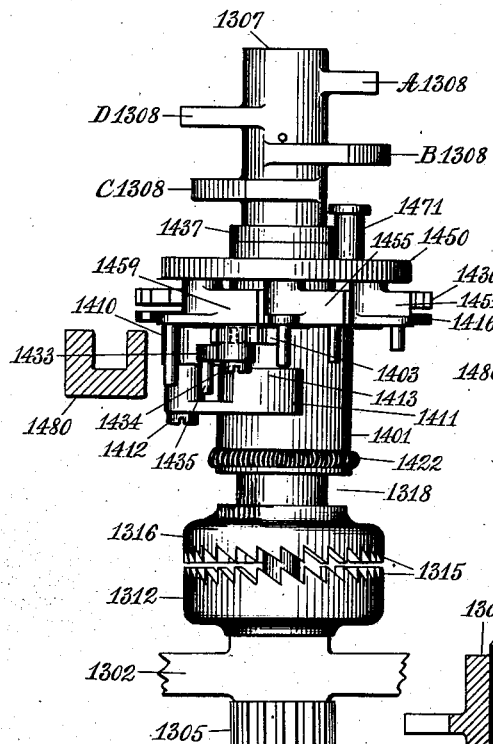
Figure 23:
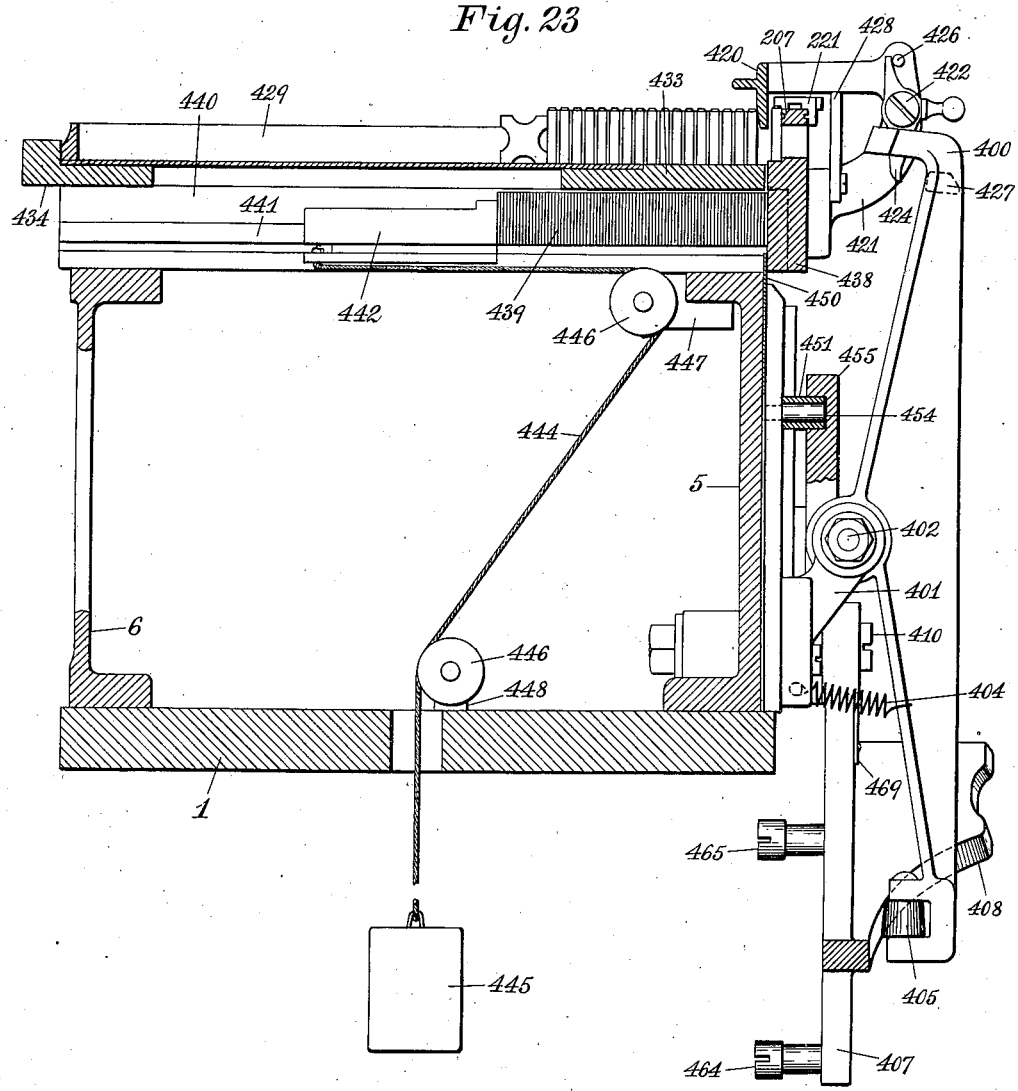
Figure 23A:
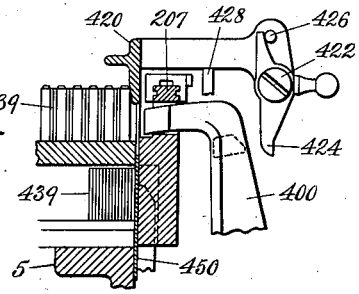
Figure 26:
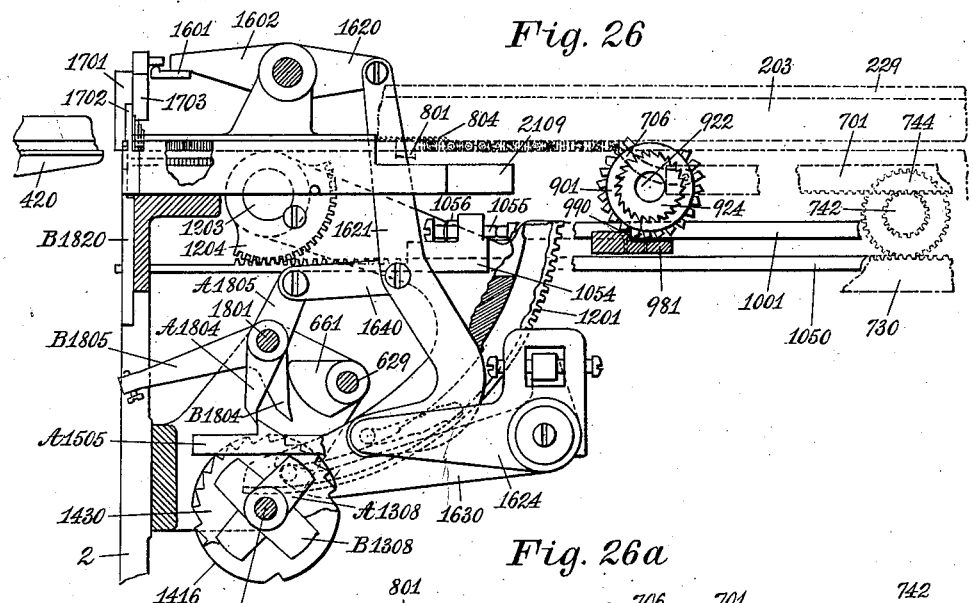
Figure 26A:
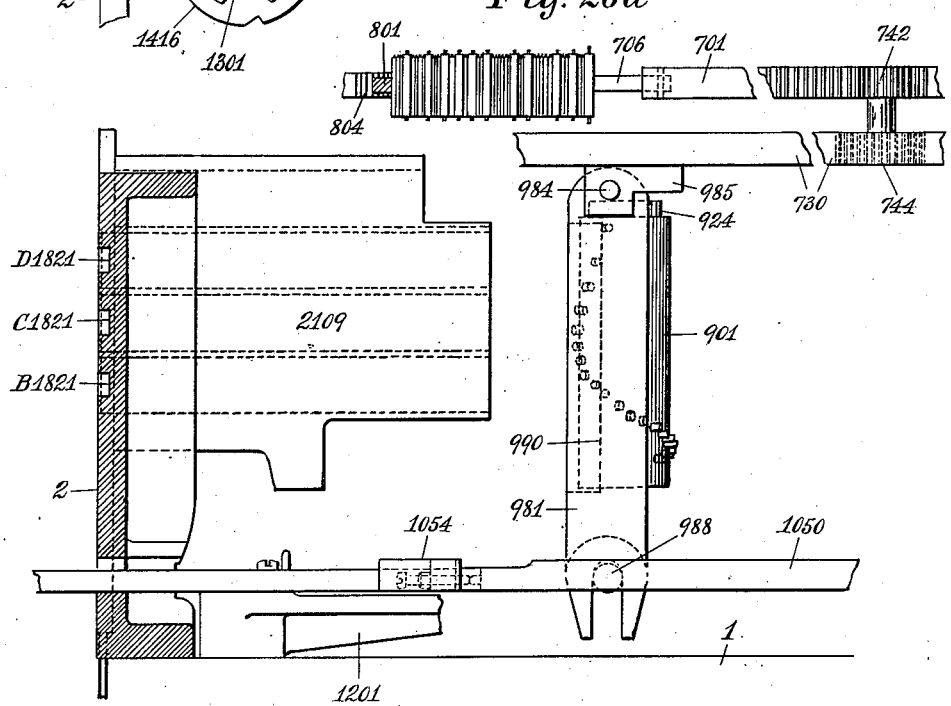
Figure 27:
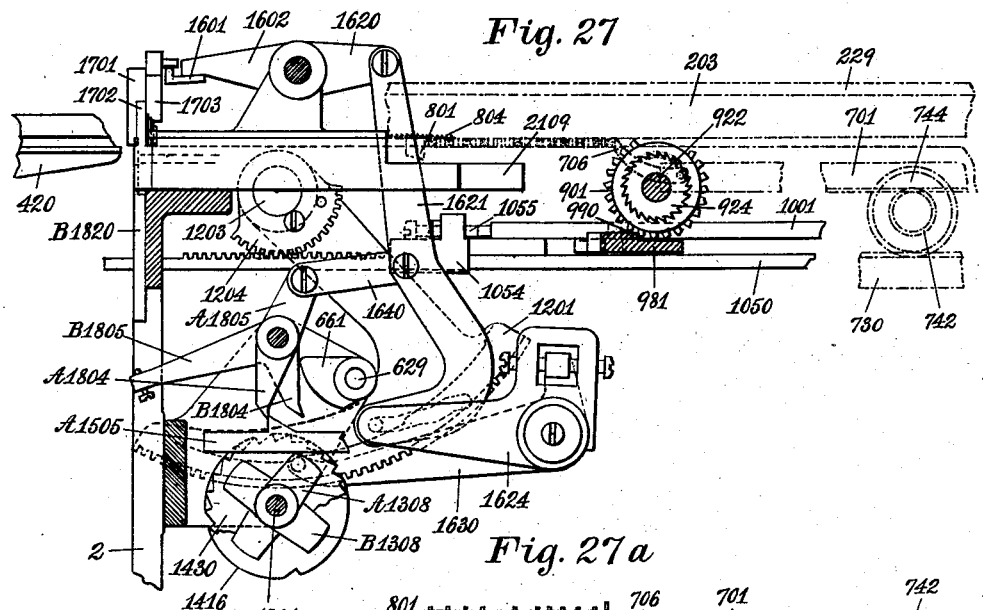
Figure 27A:
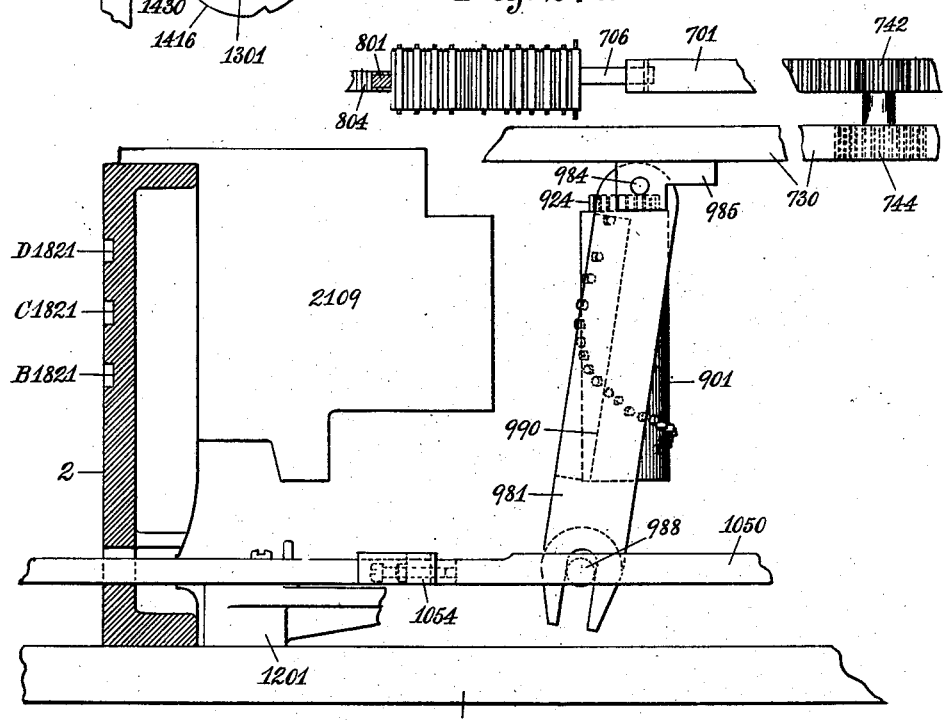
Figure 28:
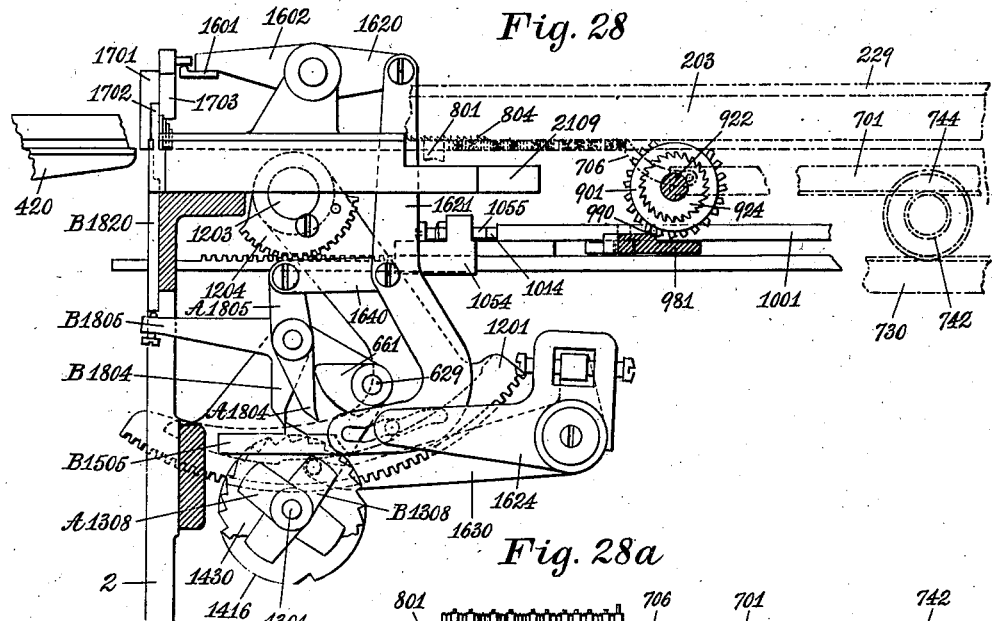
Figure 28A:
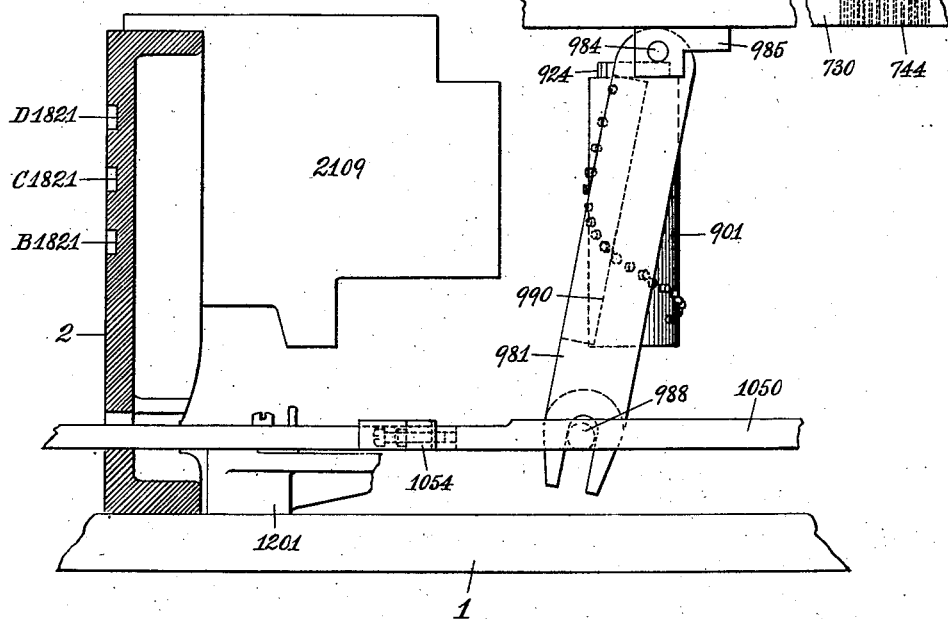

Figure 1 of the drawings is a front elevation of the justifying-machine, some portions of which are here broken away to enable other parts to be seen. Fig. 2 is an end elevation of the right-hand or galley end of the machine. Fig. 3 is a rear elevation, and Fig. 4 is an end elevation looking from the left or composing-machine end of the justifier. Fig. 5 is a general plan view of the machine, showing the parts in their resting position and showing a galley containing a number of justified lines. Fig. 6 is a plan view, in somewhat enlarged scale, of the type-channel and its immediately-associated devices in a position in which the line mechanism has been tripped and the line-grab is about to separate the foremost line of type and convey it to the measuring zone. Fig. 6$^a$ is a plan view of parts of the machine lying beneath those shown in Fig. 6. Fig. 7 is a plan view similar to that of Fig. 6, showing a line of type compacted by the measuring devices with the word-grab in position for engaging that line and moving it toward the spacer-inserting zone of the typeway. Fig. 7$^a$ is a plan view showing the stop-jaw retracted and the word-grab engaging with the line to move it forward. Fig. 8 is a rear elevation in section, taken along the line 8 8 of Fig. 5, showing the line mechanism unclutched and in its resting position. Fig. 9 is a front elevation, also in enlarged scale, showing the locking devices for the registering-slide of the measuring mechanism. Fig. 9$^a$ is a left-hand elevation in section, taken along the line 9$^a$ 9$^a$ of Fig. 6, showing the line mechanism and the devices by which the line-shaft is started into operation by the foremost line-separator of the oncoming line. Fig. 10 is a left-hand elevation, in still further enlarged scale and in section, taken on the line 10 10 of Fig. 6 of the dividing-bar, its stop-cylinder, and the devices whereby the latter is set by the passing separators. Figs. 10$^a$ and 10$^b$ are detail views of the escapement devices actuated by the separators. Fig. 11 is a rear elevation of the word-shaft mechanism. Fig. 12 is a front elevation of the word mechanism and the spacer-selecting slide. Fig. 12$^a$ is a fragmentary view in section, taken on the line 12$^a$ 12$^a$ of Figs. 11 and 13, showing the word-shaft and the parts carried thereby. Fig. 13 is a plan view of the word and spacer selecting sections of the machine. Fig. 13$^a$ is a fragmentary plan view showing the driving connection between the selecting-slide and the crank-lever for working the selector-vibrator. Fig. 14 is a plan view of the spacer-selecting and correcting mechanism. Fig. 15 is a rear elevation of the spacer-selector and the correcting mechanism in their unclutched setting positions. Fig. 15$^a$ is a view similar to Fig. 15, showing the parts in their clutched position. Fig. 15$^b$ is a cross-sectional elevation of a portion of the parts shown in Figs. 15 and 15$^a$. Fig. 16 is an elevation, and Fig. 16$^a$ a plan view, showing the selector-wings and selecting-fingers. Fig. 16$^b$ is a plan view showing the position to which the selecting mechanism is set when no correction is required, this being the same position shown in Fig. 16$^a$. Fig. 16$^c$ represents the same mechanism in the position to which it is set by the measuring devices when a correction of one unit is required. Fig. 16$^d$ shows the position to which the parts are set for a correction of two units. Fig. 17 shows the position to which the parts are set for a correction of three units. Fig. 17$^a$ shows the position to which they are set for a correction of four units, and Fig. 17$^b$ the position to which they are set for a correction of five units. Fig. 17$^c$ is a rear elevation showing the fender for the correcting-pawls, which are also here shown in their resting position. Figs. 17$^d$, 17$^e$, and 17$^f$ are plan views showing different operative positions of the correcting-pawls and their fenders. Fig. 18 shows the corrector parts moved one tooth from the position shown in Fig. 16$^c$. Figs. 18 to 18$^e$, inclusive, illustrate the movements of the selector-wings and their associated parts due to the operation of the correcting mechanism. Fig. 18$^a$ shows the parts moved two teeth from the position shown in Fig. 16$^d$. Fig. 18$^b$ shows the corrector parts moved three teeth from the position shown in Fig. 17. Fig. 18$^c$ shows the corrector parts moved six teeth from the position shown in Fig. 17. Fig. 18$^d$ shows the corrector parts moved a distance of four teeth from the position shown in Fig. 16$^d$. Fig. 18$^e$ is a fragmentary view showing the releasing operation of the parts. Fig. 18$^d$ is a plan view of the corrector parts, showing them more in detail. Fig. 19 is an end elevation in section taken on the line 19 19 of Fig. 14, showing the selecting, correcting, and injecting mechanisms. Fig. 20 is a similar end view taken on line 20 20 of Fig. 20$^a$, showing the basic selector and injectors in detail. Fig. 20$^a$ is a front elevation projected from Fig. 20. Fig. 21 is a similar front elevation showing the parts in the operation of injecting a combination of spacers into a space between the words of a line of type. Fig. 21$^a$ is a detail view looking to the left in Fig. 21. Figs. 22 and 22$^a$ are plan views showing the word-slide in two of its operative positions. Fig. 22$^b$ is a right elevation projected from Fig. 22. Figs. 22$^c$, 22$^d$, and 22$^e$ represent the forward end of the word-slide in three of its operative positions, Fig. 22$^c$ showing the parts in their second or separator-releasing position, corresponding with that shown in Fig. 22$^a$. Fig. 22$^d$ shows the parts in the fourth or spacer-retaining positions while Fig. 22$^e$ represents the parts in the third or spacer-receiving position, corresponding with that shown in Fig. 21. Fig. 22$^f$ is a front end projection of Fig. 22. Fig. 23 is an end elevation in section, taken on the line 23 23 of Fig. 5, showing the galley and leading mechanism. Fig. 23$^a$ is a detail of a part of Fig. 23, showing the parts in a different position. Fig. 24 is a front view, and Fig. 24$^a$ a plan view, showing the devices for replenishing the spacer-channels with justifying-spacers from the distributing-sections of the machine. Fig. 25 is a plan view, and Fig. 25$^a$ a rear elevation, of the dividing-bar and the stop-pin cylinder in operative relation for measuring a line containing four spaces. Fig. 25$^b$ is a plan view, and Fig. 25$^c$ a rear elevation, of the dividing-bar and its stop-cylinder also in position for measuring a four-space line, which in this instance is exactly of the maximum length, requiring only the minimum spacing herein provided for—namely, the insertion of a single basic or A spacer in each space of the line. As compared with this position, the position shown in Fig. 25$^a$ indicates the measurement of a shorter line requiring justifying-spacers or spacer combinations wider than the minimum or basic A. Fig. 26 is a plan view and Fig. 26$^a$ a rear elevation of portions of the measuring, space-dividing, and basic-selecting mechanism representing their position as set by a ten-space line, which requires for its justification a single A or basic spacer in each of its ten spaces. Figs. 27 and 27$^a$ show the same parts as in Figs. 26 and 26$^a$, excepting that they are here set by the measurement of a ten-space line, which requires for its justification two basic or A spacers in each of its ten spaces. Figs. 28 and 28$^a$ are a plan and a rear view, respectively, similar to those of the four preceding figures, excepting that they are here shown in the position to which they are set by a ten-space line, which requires one basic and one B fractional spacer for each of its ten spaces. Fig. 29 is a rear elevation of a portion of the type-composing machine with which this justifying mechanism is herein embodied, showing the type distributing and composing channels, the separator-magazine from which the separators are "played" in the composing operation, showing also the mechanism by which the justifying-spacers are conveyed from the distributing-channels of the machine to their respective channels of the justifier. Fig. 29$^a$ is a front view of the lower portion of what is shown in Fig. 29. Fig. 29$^b$ is a rear elevation, in enlarged scale, showing the bottom of a spacer-distributer channel and illustrating the operation of discharging a justifying-space therefrom into the chute leading to the spacer-channels. Fig. 29$^c$ is a side view projected from Fig. 29$^b$, showing the selecting-wards and the incline down which the spacers slide. Fig. 30 is a plan view, Fig. 30$^a$ a front elevation, and Fig. 30$^b$ an end elevation, of the type-distributing mechanism for the temporary separators, Fig. 30 being shown partly in section, taken on the line 30 30 of Fig. 30$^b$. Fig. 31 is a rear elevation of the oscillating cam which operates the leading mechanism, showing the leading plunger in its lowest position at one end of the stroke of the cam. Fig. 31$^a$ is a fragmentary end view projected from Fig. 31$^b$, showing in two positions the latch which connects the galley-plunger cam with the leading cam. Fig. 31° is an end view of the leading plunger and its cam in vertical section taken on the line c c of Fig. 31. Fig. 31ᵈ is a detail showing the two positions of the leading latch. Fig. 32 is a plan view of the multiplying-sector of the selecting mechanism and its coengaging devices of the basic selecting mechanism, representing the different positions in which the sector is set, according to the spacers or spacer combinations to be selected. Fig. 32ᵃ is a fragmentary view showing the basic cam-link moved from the position of Fig. 32 for the selection of an additional basic spacer.

The separators which are employed for temporarily preserving the separations between the words and the lines, respectively, are provided with cylindrical bodies of a diameter substantially equaling the pointwise dimensions of the type and of a length equaling the length of the type. These separators are provided with extensions at each end which are smaller than the bodies of the separators and are also preferably cylindrical. The projecting extensions 21 of the line-separators 20 are somewhat longer than the extensions 23 of the word-separators 22. These separators are not only employed for temporarily maintaining their separations, but are also utilized for advancing the words and lines along the typeway by means of grabs and the word-slide. They also perform the important functions of setting the measuring mechanism, so as to eliminate all or a portion of the measurement value of the separators themselves and of adjusting the dividing mechanism in accordance with the number of spaces in each line, so as to divide the total measurement into a corresponding number of equal parts equaling the spaces between words. The differing lengths of the extensions are utilized for distinguishing between the word separations and the line separations, the longer extensions of the line-separators being employed for starting the line mechanism in operation for engaging with the grab devices to move the line forward and for distributing these separators into separate channels after they are discarded from the line and returned to their respective storage-channels.

The final separators, which are inserted either singly or in combination, in the word-spaces of the line are of the form commonly employed in type composition and as herein employed are nicked so as to be distributed into their appropriate channels in the mechanical distribution of the dead matter. These spacers are of four different sizes, (herein designated by the letters A, B, C, and D, respectively.) The setwise sizes of these spacers are based upon a unit system, the spacer A being twenty-four units, the spacer B thirty units, the spacer C thirty-six units, and the spacer D forty-two units. This system enables the spacers to be combined in a most advantageous manner. When employed singly, their measurement values will obviously be twenty-four, thirty, thirty-six, and forty-two units, respectively. Where the width of the spaces in the line to be justified exceeds forty-two units, these spacers are combined in various ways up to any desired setwise thickness. A required thickness of forty-eight units is made up by combining two of the A or twenty-four unit-spacers. A required thickness of fifty-four units is supplied by combining an A and a B spacer, equaling twenty-four plus thirty units. A thickness of sixty units is supplied by combining one A and one C spacer, equaling twenty-four plus thirty-six units. A thickness of sixty-six units is supplied by combining one A and one D spacer, equaling twenty-four plus forty-two units. A thickness of seventy-two units is supplied by combining three of the A spacers, seventy-eight units by combining two A's and one B, eighty-four units by combining two A's and one C, ninety units by combining two A's and one D, and ninety-six units by combining four A's, and so on for any desired justification.

On account of the circumstance that the A spacer is the smallest of the series and is most frequently used in the spacer combination it is herein designated as the basic spacer, the other three being designated "fractional" spacers. Two or more of these basic spacers are frequently employed in the same combination either with or without one of the fractional spacers; but the fractional spacers are never repeated in the same combination, nor are the different fractional spacers ever combined. When used in combination, they are used only with one or more of the basic spacers.

The unit of the basis of measurement may be any desired size, according to the size of type and the accuracy of the required justification. It is, however, herein assumed that the unit represents the one-thousandth part of an inch. Therefore the A or basic spacer is assumed to be twenty-four thousandths of an inch, and the B, C, and D or fractional spacers increase therefrom by progressive steps of six-thousandths of an inch.

For clearness of comprehension this description of the machine will assume the machine to consist of six, more or less, separable mechanisms, as follows: Driving mechanism, line-handling mechanism, leading mechanism, measuring and space-dividing mechanism, spacer selecting and correcting mechanism, separator and spacer-circulating mechanism.

*The driving mechanism.*—This comprises the shafts carrying the cams and cranks from which the various movements are derived; also, the connecting and clutch devices by means of which the mechanism is started and stopped either by the hand of the operator or by the interaction of the different sections of the machine. The first driving-shaft 101 is journaled in a bracket 102 upon the bed-plate 1 of the machine and is provided with a grooved pulley 103, which is driven by a belt 104 either from the associated composing-machine or from any other convenient source of power. The shaft 101 runs continuously and has splined upon it a sliding clutch 112, which may be moved into or out of engagement with the revolving clutch 110, to which the pinion 111 is fastened. The sliding clutch is operated by means of the forked lever 114, keyed to the shaft 115, which is journaled in the bracket 116. The lever 117 is also fixed to the shaft 115 and is connected, by means of the link 118, with an arm 119 upon the rock-shaft 120. That shaft is mounted in the brackets 121 and extends longitudinally of the machine, as best shown in Fig. 3, being provided at the opposite or galley end of the machine with a hand-lever 122, by means of which the entire driving mechanism may be stopped and started by the operator.

The rotary movement of the driving-shaft 101 is transmitted from the pinion 111 to the gear 132 on the shaft 130, which is mounted in the bracket 131 and contains upon its opposite end a hand-wheel 134 and the pinion 133, the latter of which meshes with the gear 141, keyed upon the driving-sleeve 140, which turns upon the line-shaft 160 when not clutched thereto. That shaft is journaled in the brackets 8 and 10, which rest upon the bed-plate 1, and carries the several cam-wheels which actuate the line mechanism, comprising those devices which perform one complete operation for each line and which will be more particularly described in connection with the respective mechanisms which they drive or actuate.

The driving-sleeve 140 runs continuously when the machine is thrown in operation by the clutch 112 and carries upon its front end the clutch-wheel 142, provided with four teeth 143, (best shown in Figs. 8 and 9ª,) by means of which a single rotation is at the proper intervals imparted to the line-shaft 160 and its mechanism. A clutch-pawl 650 is pivoted at 651 to the side of the cam-wheel 655, fixed upon the line-shaft 160, the pawl being provided with a hooked end 656, which is in the plane of the clutch-wheel 142, a spring 652 tending to hold the clutch-pawl into contact with that clutch-wheel. That pawl, however, is held out of engagement during the intermissions in the rotation of the line-shaft by means of two independent starting-levers 612 and 639, (best shown in Figs. 8 and 9ª,) both of which must be withdrawn from beneath the pawl 650 before the latter can engage with its clutch-wheel. The first starting lever 612 is pivoted upon the stud 616 and is provided with a spring 612ᵇ, which tends to pull the lever to its pawl-releasing position. (Shown in dotted lines in Fig. 9ª.) The upper end of the lever 612 is coupled, by means of the pin 601, with the slide 600, which extends in the plane of the typeway 200 and passes through a guide-box 618. Upon the front end of this slide the detent 602 is pivoted by means of the pin 603, the rearward end of the pawl engaging with a retaining-notch 604 in the guide-box to hold the lever 612 in its pawl-engaging position, and hence to hold the line-shaft out of operation. The forward end 605 forms a trigger for the detent and extends in engaging relation to the trigger-cams 606. These cams, as best shown in Fig. 9ª, are mounted upon the vertical shaft 607, adjacent to the rearward wall of the typeway 200, and project forwardly into the plane of the typeway, so as to be engaged by the projecting ends of the line-separators, while allowing the shorter word-separators to pass between them without engagement. When moved by the line-separators, the cams 606 are swung from the position shown in Fig. 7 to that of Fig. 6, thereby disengaging the detent 602 from its notch and allowing the first starting-lever 612 to be withdrawn from beneath the pawl 650.

The second starting-lever 639, which also serves to hold the line-shaft out of operation, is pivoted to the stud 641 of the bracket 640 and is provided with a lug 642, which projects beneath the pin 654 of the clutch-pawl 650, as best shown in Figs. 4 and 8. In the latter figure the second lever 639 is swung to its pawl-releasing position clear of the stud 654, so that the line-shaft is in that figure held out of operation only by the first lever 612. The lever 639 is moved by means of the link 636, which, as best shown in Figs. 5 and 8, is connected, by means of the stud 638, with the word-shaft-starting lever 634. The link is also provided with a spring 637, (best shown in Fig. 5,) by means of which that link and the levers 634 and 639, to which it is attached, are drawn toward the left to the position shown in Fig. 5, in which, as above stated, the projection 642 of the lever 639 is withdrawn from beneath the clutch-pawl pin 654.

The word-shaft-starting lever 634, Figs. 5 and 13, is pivoted at 635 upon the top of the bracket 11, with its rearward end extending into engaging relation with the clutch-pawl 645 of the word-shaft mechanism. That pawl, Figs. 5, 11, and 12, is pivotally mounted at 646 on the side of the cam-wheel 649, with its inner hooked end 644 adjacent to the single-tooth clutch-wheel 153, keyed upon the sleeve 150, which turns loosely upon the word-shaft 165 when not clutched thereto. The sleeve also has keyed upon it the gear 151, meshing with the gear 141, by which the sleeve and the clutch-wheel are driven continuously. The word-shaft 165 is journaled in the bearings 163 and has fixed upon it the cam-wheels 649, 362, and 1510, which actuate the various portions of the word mechanism, the word-shaft, with its cams, being rotated at the required times by the coengagement of the pawl 645 with the clutch-wheel 153 when the starting-lever 634 is moved from the position shown in Fig. 5 beneath the pawl to the position shown in Fig. 13. This interlocking arrangement of the starting-levers 634 and 639 for the word and the line mechanisms, respectively, and their connection by means of the link 636 is such that when one of these mechanisms is in operation the other mechanism is held out of operation, and vice versa. It does not, however, follow that one or the other of these mechanisms is in operation at all times, since, as shown in Fig. 5, both mechanisms are held out of operation during the interval that may elapse between the justification of one line and the complete passage of the succeeding line past the trigger 605. As shown in that figure, the word-shaft is held out of operation by the starting-lever 634, and although in this position of that lever its associated lever 639 is necessarily withdrawn from the clutch-pawl 650 yet that pawl is still held out of operation by the starting-lever 612. The interlocking arrangement, therefore, not only insures the proper sequence of operation of the line and word mechanisms, respectively, but also insures that neither of them shall start in operation until a full line shall have passed into their zone of operations. This interlocking starting mechanism is held in the position shown in Fig. 5 by means of the spring 637 until the line-shaft, after being started by the trigger 605, has completed a rotation, and thus by means of its associated line mechanism has performed its cycle of movements upon the new line and has arrived again at its stopping position, at which point the cam-surface 643 of the cam-wheel 655 moves the lever 639, carrying the projection 642 beneath the pin 654, and thus disengaging the clutch-pawl 650 from its clutch-wheel 142 and stopping the further rotation of the line-shaft. Simultaneously through the interlocking connection the lever 634 is moved to the position shown in Fig. 13, thus starting the word-shaft and its mechanism in operation upon the line upon which the measuring and other functions of the line mechanism have just been performed. Inasmuch as the word-shaft 165 must make one rotation for each space in the line to be operated upon, it is necessary to hold the starting-lever 634 in the position shown in Fig. 13 throughout the required number of rotations. This is accomplished by means of a detent 622, which is pivoted at 623 on the forward end of the slide 620, the point of the detent being pressed by the spring 622ª into a notch 624 in the side wall of the guide-box 626 when the parts are in the position shown in Fig. 13, the slide 620 being connected, by means of the pin 628, with an arm 627, fixed on the shut-off shaft 629, to which is also fixed an arm 630, connected with the starting-lever 634 by means of the link 632. The forward end 625 of the detent 622 projects over the typeway into engaging relation with the pin 255 on the word-grab 250, which collides with the trigger end 625 of the pawl and releases it from the latching position (shown in Fig. 13) when that grab reaches the position in which it is advancing the last word into the plane of the word-slide, Fig. 5.

The slide 620 is pushed forward again, so as to carry the detent 622 into latching position, with its end 625 extending across the typeway upon the completion of each rotation of the line mechanism and the starting of the word-shaft mechanism, the slide 620 being connected with the word-shaft-starting lever 634 by the arms 627 and 630 and the link 632. Thus the starting of the word mechanism resets the trigger by means of which that mechanism is stopped.

The trigger 605 at the line-forming zone is also reset to tripping position coincidently with the completion of each rotation of the line mechanism by means of the inclined cam-surface 617 on the side of the cam-wheel 655, which engages with a pin or roller 615 of the cam-arm 614, which is attached to or integral with the first starting-lever 612, through which the cam-surface 617 operates to push the starting-slide 600 forward from its dotted to its full-line position of Fig. 9ª, so as to push the trigger end of the detent 602 into engagement with the trigger 606 and latch it in that position, as shown in Fig. 7, in readiness to be tripped by the succeeding line-separator. Thus the completion of each rotation of the line-shaft operates, through the cam-surfaces 643 and 617, to reset the trigger devices of the two starting-levers by means of which the starting of the next rotation of the line-shaft is controlled.

*Line-handling mechanism.*—The typeway 200 extends continuously from the point where the type and separators are received from the composing-machine, Fig. 29, to the galley 429 at the right-hand end of the machine, being supported upon the brackets 201 and 202. The typeway is open at the top, its front wall 203 and rear wall 205 being separated by a space slightly greater than the pointwise dimensions of the type, so as to allow the latter to pass through freely. The bottom of the channel is formed by the square-shouldered ledges 204 and 206, Figs. 9ª-10, which have a space between them slightly greater than the thickness of the extensions of the type-separators, so that the lower ends of the latter may pass freely between the ledges, which therefore support the separators by their shouldered ends and support the type by their feet. Although the typeway is continuous, it will be found convenient to consider it as consisting of four zones, designated as the "line-forming," the "measuring," the "space-inserting," and the "galley" zones, respectively. The line-forming zone comprises that portion extending from the packer of the composing-machine to the resting position of the measuring-pawl 706. The measuring zone extends from thence to the farthest position of the stop-jaw 801. The space-inserting zone extends from thence to the galley and holds the line as its words are picked up by the word-slide 300, and the galley zone comprises the remainder of the right-hand end of the typeway, extending into the galley-section.

The front wall 207 of the galley is coincident with the front wall 203 of the typeway and practically forms a continuation thereof, the wall 207 being provided with an opening through which the galley-plunger 400 may pass, Fig. 23. A rear wall is supplied by the vertically-reciprocating rule 420, which, while the words are entering the galley-section of the typeway, is in its lowest position and practically forms a continuation of the rearward wall 205 of the typeway.

Upon the top of the front wall of the typeway are arranged the parallel swinging presser-bars 210, each of which is mounted upon two parallel swinging arms 213. These presser-bars are held, by means of the springs 211, toward the type-channel, and the bars themselves are slightly inclined with relation to that channel, so as to exert a slight pressure against the foremost character of each type-line as it moves forward along the typeway or at whatever point it may happen to stop, so as to prevent the foremost type from falling forward in the channel. A swinging retaining-bar 214, Fig. 7ª, is pivoted at the galley end of the typeway and is inclined thereto in a direction the reverse of the presser-bars 210, so that it acts as a retaining device upon the line-separator of each line as it is brought into the measuring zone by the grab, so as to prevent the type from falling backward when not engaged by the grab or the measuring-pawl.

The succeeding lines after passing the trigger-cams 606 in the line-forming zone are advanced along the typeway at the proper times by means of the line-grab 230 and the word-grab 250. These grabs are mounted for sliding movement upon the guide-rail 229 and are provided with the double pawls 231 and 251, respectively, which are pivotally mounted upon their respective slides and are held by the springs 233 and 253, respectively, toward the typeway. The pawls are forked or double, their ends extending above and below the typeway into engagement with the upper and lower extensions 21 of the line-separators only, being far enough apart so that the word-separators can pass between them. The resting position of the line-grab is shown in Fig. 6, with the point of its pawls 231 rearwardly of the position occupied by the line-separators when it operates upon the trigger 606 to start the line mechanism in operation, and the grab moves from that position toward the right far enough to carry each line-separator 20 and the line of type in front of it somewhat ahead of the rearward or resting position of the measuring-pawl 706. (Shown in Fig. 6.) The range of movement of the word-grab is from the position shown in Fig. 7 to that shown in Fig. 5. The first grab 230 is driven positively in both directions by means of the crank-pin 235 on the crank 234 of the line-shaft 160. The crank movement is imparted to the grab through the medium of the sliding block 237 and the slotted lever 238, which is pivoted at 239, its upper end being connected with the line-grab 230 by means of the link 240. Thus at each rotation of the line-shaft a line of type is carried from the line-forming zone of the typeway into the measuring zone thereof in position to be acted upon by the measuring devices.

The word-grab 250 rests during the intervals in its operation approximately in the position shown in Fig. 5 and is carried back to the opposite end of its movement (shown in Fig. 7) by means of a detachable connection with the line-grab, while the latter returns to its normal resting position. That connection consists of the latch 281, which is pivotally attached to the line-grab 230 and held toward engaging relation with the word-grab by the spring 283. When the line-grab moves forward from the position shown in Fig. 6 to carry the line into the measuring zone, as shown in Fig. 7, and at the forward end of that movement the hook 279 of the latch 281 engages with the pin 254 of the double pawl 251 and draws it back, as shown in Fig. 7, the engagement of the latch at one side of the pivot of the pawls serving at the same time to draw the points of those pawls away from the line, as shown in Fig. 7. On arriving at the position shown in the latter figure the forward end of the latch engages with a pin 287 on the crank-lever 285, which swings on the stud 286, and is also provided with another pin 288, which by the swinging movement thus imparted to the lever is carried against the rearward side of the latch 281, Figs. 6ª, 7ª, thereby swinging it forwardly and releasing it from the pin 254 of the word-grab. The latter is then carried forward by means of its connection through the medium of the cord 257 with a weight 256. The cord passes around the two idle pulleys 258 and several times around the drum 260, Figs. 5, 11, and 13, and thence to its weight 256. That drum and its actuating mechanism serve as a check upon the descending weight to prevent it from exceeding the rotative speed of the drum while advancing the word-grab and serves to arrest the action of the weight and sustain it while the word-grab is at rest during the movement of the word-slide, so as to remove the pressure of the weight from the side of the word-slide.

The drum 260 is loosely mounted on the word-shaft-driving sleeve 150 and is provided with an interior annular raceway for a circle of balls 264, separated by a corresponding number of ratchet-teeth 263, projecting outwardly from the clutch-wheel 153. The shape of these teeth is best shown in Fig. 11, they being inclined upon their rearward sides, so that the balls will drop down and wedge between the teeth and the interior surface of the drum 260, thereby preventing the latter from being drawn by its weight 256 at a rotated speed greater than that of the clutch-wheel 153. The outer surface of the drum is also provided with a circle of ratchet-teeth 265, which are engaged by a pawl 266, which is pivotally mounted at 267 upon the circular disk 268, which swings freely upon the sleeve 150. The pawl is bell-cranked, Figs. 11, 12ᴬ, and 13, its outer end being connected, by means of the link 276, with a pawl-lever 273, which is pivotally mounted at 271 upon a bracket 272 and is provided with a cam-arm 277, having a roller 278 bearing against the periphery-cam 280 of the word-shaft 165, whereby each rotation of the word-shaft imparts a vibratory movement to the pawl. The required movement of the lever 273 toward the right as viewed in Fig. 11 carries the pawl 266 into engagement with its ratchet and moves that ratchet and its attached drum to lift the weight 256, thus relieving the word-slide of the pull of the weight. The cam 280 is so shaped and timed as to thus sustain the weight while the word-slide 300 is making its forward and return movements, after which the lever 273 drops back to the position shown in Fig. 11, thereby releasing the ratchet 265 and the drum and allowing them to rotate forward, with the word-shaft still controlled by the series of balls 264. As the lever returns to the position shown in Fig. 11 the disk 268 is also returned by means of the spring 269, which connects the disk with the lever 273 or to any convenient part, holding the projection 270 against the stop 274, thereby enabling the further continued movement of the lever 273 to raise the pawl 266 out of contact with the ratchet 265, in which position the parts rest while the weight draws the word-grab forward and until the succeeding movement of the word-slide.

The measuring and space-dividing mechanism operates upon the line while it is in the position shown in Fig. 7, the line being moved into the measuring zone by the line-grab, while the word-grab is employed to forward the line after the completion of the measuring operation to the space-inserting zone, during which time the spacer-selecting mechanism also performs its functions. The detailed description of these two mechanisms will follow this description of the line-handling mechanism.

The word-slide devices of the line-handling mechanism are next in order of description. The word-slide 300 is mounted to reciprocate horizontally at right angles to the typeway and adjacent to the side of the galley, as best shown in Fig. 5, its reciprocating movement being imparted by means of the cam 362 of the word-shaft 165, through the medium of the adjustable lever 350, pivotally mounted at 352 upon the bracket 351 and connected with the word-slide 300 by means of the link 353. The lever 350 is in two parts for convenience of adjusting the travel of the word-slide and comprises the arm 355 and the arm 357, pivotally joined at 352, the arm 357 being provided with a projection 359, which is engaged by the adjusting-screws 356, mounted in the arm 355, these arms being clamped after adjustment by means of the screw 358, thus forming, in effect, an integral lever.

The functions of the word-slide are to separate the successive words of each line as it is moved up by the word-grab, to remove the separators from the line, to assist in the substitution of the final justifying-spacers as they are presented by the spacer selecting and injecting devices, and thus to advance the completed justified line into the galley. These functions are performed by the successive reciprocations of the word-slide, each of which completes a word. At each reciprocation of the word-slide the separator lying behind the foremost word is engaged by diagonal cams of the slide, which extend above and below the line and move the word along the typeway, crossing the pathway of the slide, into the galley, the separator itself falling through a hole in the floor of the typeway, which is exposed beneath the separator at the end of the forward movement of the slide.

The word-slide 300 slides in a guideway of the bracket 301, being held down by the gib 321. The slide consists of two principal members 303 and 306, Figs. 19, 22ᵇ, 22ᶠ, separated from each other slightly more than the length of the type, thereby permitting the latter to pass in upright position between the two members. The upper surface of the lower member 306 of the slide is on a level with and constitutes an extension of the bottom of the typeway 200. A cam-groove 308, Figs. 19, 22, 22ᵃ, is cut into this upper surface of the lower member, and a similar cam-groove 305 is cut in the under surface of the upper member 303. These cam-grooves are coincident in plan view and are disposed diagonally across the direction of movement of the slide. These cam-grooves are of a sufficient depth and width to receive the extensions 21 and 23 of the separators and open toward the left, so as to receive those extensions as the type and its separators pass in from the typeway.

One wall of each of the cam-grooves extends beyond the left-hand faces of the word-slide and forms hooks 314 for engaging the projecting ends of the separators and bringing them within the zone of the slide. The opposite or rearward ends of the cam-paths after extending diagonally across the word-slide nearly through to the right-hand face thereof, as shown in Figs. 22 and 22$^a$, return slightly as they extend backwardly along the slide. The lower cam-path terminates at its rearward end in a slot 313, which extends through the lower member, and when the slide is in the position shown in Fig. 22$^a$ it coincides with an opening leading to a discharge-chute 26, through which the released separators drop to a conveyer, which returns them to their channels in the composing-machine, as will be hereinafter more fully described.

The lower member 306 of the slide is provided with two rectangular openings, Figs. 21 and 22, designated as the "basic" portal 315 and the "fractional" portal 316, of a suitable size and so located as to be brought into coincidence with the typeway and the raceways through which the justifying-spacers are injected and to permit those spaces to be pushed up from below through these portals into the typeway. These portals extend upwardly through the partition-block 317 at the rearward end of the slide, having the partitions 318 to form supports for maintaining the spaces in upright position after they are injected into the typeway. Portions of the front wall 207 of the typeway are carried through the word-slide above and below the partition-block, as best shown in Figs. 22 to 22$^e$, inclusive, to confine the injected spacers in the line of the typeway during the subsequent transverse movement of the word-slide. The justifying-spacers are injected into the line through their respective portals, while the word-slide is in the position shown in Fig. 22$^e$, the fractional spacers being injected through the portal 316 from the raceway 1823, while the basic spacers are injected through the portal 315 directly from the end of the basic-spacer channel $A^{2110}$, as best shown in Fig. 21, past the presser-feet 319 and 320, after which the word-slide moves forward to the fourth position, (shown in Fig. 22$^d$,) so as to bring the portals 315 and 316 slightly out of coincidence with the type-channel, thereby supporting the spacers during the withdrawal of their respective injecting-plungers, whereupon the slide moves farther forward to its first position for receiving the next word.

The word-slide is also provided with an auxiliary slide or gate 309. This is mounted upon and carried by the word-slide, connected therewith at its rearward end by means of the pin 312 working in the elongated slot 311. This gate serves as a stop for the foremost type of the second word while the leading word is being operated upon by the word-slide. In this connection it may be noted that the word-slide is carried to four successive positions relative to the typeway and performs a different function in each position besides those performed in passing from one position to the other. These positions are:

The first or stop position, which is that shown in Figs. 5, 19, 22, 22$^b$, and 22$^f$. In this position of the slide the typeway intersects the slide at a point just in front of the entrance to the grooves 305 and 308 and presents the stops 304 in the vertical plane of the typeway just above and below the type, so as to engage with the projecting ends of the separators and bar their further progress after permitting the word-type to pass between the stops. In this position the gate 309 is withdrawn from across the typeway, and the type therein constituting the foremost word can pass into the plane of the word-slide, as shown in Fig. 22, the upper surface of the lower member 306 in advance of the cam-groove 308 presenting a floor continuous with that of the typeway, upon which the feet of the type may slide.

The second or releasing position of the slide is that shown in Figs. 22$^a$ and 22$^c$. In this position the word-slide has moved forward and by means of the inclined cam-grooves 305 and 308 has moved the separator and its preceding word across the zone of the word-slide, so that the word-type are delivered into the galley-section, while the separator drops through the slotted opening 313, in which the lower cam-groove 308 terminates and which in this position of the word-slide coincides with an opening leading to the chute 26, through which the released separators fall to a conveyer, which returns them to the type-channels of the composing-machine, as will be hereinafter more fully described. This position is the limit of the forward stroke of the word-slide.

The third or receiving position, Figs. 21, 22$^e$, is that in which the slide reaches the limit of its backward stroke and brings its spacer-receiving portals 315 and 316 into coincidence with the typeway and with the injecting-channels for the spaces.

The fourth or retaining position of the slide, Fig. 22$^d$, is that occupied by the slide after moving about one-half of the width of the typeway forward from the third position, thereby restoring a part of the typeway-floor beneath the spacer combinations which were inserted while in the third position.

In passing from the first position to the second the word-slide engages with the projecting ends of the separators of the foremost word and carries it, with its preceding word-type, along the typeway, across the zone of the word-slide, the cam-grooves 305 and 308 approaching near enough to the right-hand wall of the word-slide to carry its word-type into the galley-section, as shown in Fig. 22ª, where the word-type are pushed by the spring-detent 218 against the rule 420 and behind the retaining-shoulder 220, formed by the end of the rearward wall 205 of the typeway. This portion of the movement of the word-slide thus separates each foremost word of the line from its succeeding word, thus leaving a space for the insertion of the final justifying-spacers from below, as will be more fully hereinafter described in connection with the spacer-selecting mechanism. The succeeding words are thus carried into the galley-section of the typeway between the rule 420 and the typeway-wall 207, the forward end of the line being pushed against the friction-block 221, which slides with frictional resistance upon the wall 207, while the rearward end of the line is prevented from falling backwardly by the retaining-shoulder 220. The completed and justified line is then pushed into the galley by means of the galley-plunger 400, Figs. 1, 2, and 23, which is a lever pivotally mounted at 402 upon the bracket 401 on the front face of the galley-bracket 5. The lower end of the galley-plunger is held by the spring 404 against the cam 408, being preferably provided with a roll 405. The cam is attached to or integral with the swinging cam-arm 407, which is mounted on the stud 410 and is connected, by means of the link 412, with the lower end of the arm 416, attached to or integral with the slotted grab-lever 238.

As the swinging cam-arm 407 is drawn backwardly toward the left the upper end of the galley-plunger is moved backwardly through the slot in the front wall 207 of the galley, Fig. 23, against the line of justified type waiting to be pushed into the galley. This movement of the galley-plunger is also utilized to raise the rule 420, which stands behind the line, out of the way, so that the latter may be pushed back to place against the preceding lines. To accomplish this, the rule 420, which is pivoted at 422 upon the bracket 421, is provided with a pawl 424, which is engaged by a projecting lug 427 upon the upper end of the galley-plunger, the parts being so arranged that the rule is elevated above the line of type before the latter is moved back by the galley-plunger. Immediately after the line has been carried behind the overhanging rule and before the galley-plunger returns, the rule is allowed to drop into its position upon the stop 428, thereby retaining the line in position in the galley. The pawl 424 is loosely pivoted upon the stud 422 and engages with a pin 426, projecting from the side of the rule-arm. When the galley-plunger reaches its inner or rearmost position, the lug 427 is carried past the pawl 424, thereby permitting the latter, with the rule, to drop to its lower position, the loosely-swinging pawl serving as a by-pass to permit the galley-plunger 400 to return to its forward or resting position. (Shown in Fig. 23.)

The galley-section of the line-handling mechanism is located at the right-hand end of the machine. The ends of the galley 429 are supported upon the head-plate 433 and the foot-plate 434, which rest upon the leading-plate 440, which in turn rests upon the galley-brackets 5 and 6. An adjustable head 430, carrying a latch 431, pivoted at 432, is mounted upon the arm so as to be adjustable to suit the different widths of galleys employed, and the adjustable side piece 436 is also adapted to be set to suit those different widths, the latch 431 serving to latch the removable galley 429 in place.

*Leading mechanism.*—In connection with this galley mechanism a leading device is preferably provided adapted to be operated in suitable time relation to the galley mechanism and line mechanism of the justifier. This leading apparatus may be adjusted to insert either one or more leads at each interval between lines, and it may also be readily thrown into and out of operation by the attendant, who by a simple movement of the hand may adjust the mechanism to produce either solid, single-leaded, or double-leaded matter.

The leads 439 are arranged in galley form immediately below the head-plate 433, Fig. 23, being supported upon the leading-plate 440, which is supported by the front galley-bracket 5 and the rear galley-bracket 6. The leads are held in alinement in column form in coincidence with the galley between the side bars 443 and 441, the latter of which is adjustable. The column of leads is pushed forward against the stop-plate 438 by means of a pusher 442, traveling in guides in the plate 440, Figs. 3 and 23. That pusher is drawn forward by means of the weight 445, to which the pusher is connected by means of the cord 444, passing over the idle pulleys 446 on the brackets 447 and 448, respectively. The leading-plunger 450 is guided in suitable ways in the front face of the galley-bracket 5 to slide in a vertical direction immediately beneath the foremost lead, Fig. 23, the extent of movement being sufficient to carry the lead from the column into the plane of the lines held in the galley. The leading-plunger is operated by means of the cam 455, which is mounted to oscillate upon the stud 410 and engages with a roll or pin 451, appurtenant to the plunger 450. The cam is driven by means of a detachable connection with the cam-arm 407, which is also mounted to oscillate upon the stud 410, being driven, as already described, by means of the link 412, connected with the arm 416 of the grab-lever. The detachable connection between the cam-arm 407 and the leading-cam 450 is made by means of a latch 468, which is pivotally mounted upon the slotted arm 467 of the cam-arm 407 and is adapted to engage with the slotted arm 466 of the leading-cam 455, being mounted so as to be swung to the two positions shown in Fig. 31ᵈ, a spring 469 serving to hold it in either of these two positions. When turned to the dot-and-dash position, it engages with the latch 468, as shown in Figs. 31 and 31ᵃ, so that the arm 407 and the cam 455 operate together as an integral member, and when turned to the full-line position shown in Fig. 31 the two arms are disconnected, so that the leading-cam arm 455 stands still while the cam-arm 407 continues to vibrate with the grab-lever arm 416, so as to continue its operations upon the galley-plunger 400, which must operate once on each line, whether the leading device is in operation or not.

The cam-path 454, by means of which the leading-plunger is operated, is so shaped that it may be utilized to impart either one or two complete vertical reciprocations to the leading-plunger at each oscillation of the cam according to the amplitude of movement imparted to the cam. When the cam is moved to the extent shown by comparison of the full-line and dotted-line positions thereof, (shown in Fig. 31ᵃ,) only one-half the cam-groove 454 is brought into use, so that a single vertical reciprocation is imparted to the leading-plunger 450 for each line; but when the cam 455 is oscillated to an extent shown by a similar comparison in Fig. 31 the length of the cam-groove 454 is brought into use, and the plunger 450 is made to reciprocate twice at each oscillation of the cam. As a means for thus varying the amplitude of movement of the cam 455, the connecting-link 412 and the cam-arm 407 are adapted to be coupled at two positions at different radial distances from the center of oscillation of the latter, as best shown in Figs. 31 to 31ᵇ. The cam-arm is provided with two studs 464 and 465, the end of the link 412 being provided with bearings 470 and 471 for receiving these studs, which when seated in their respective bearings are latched in place by means of the thumb-latch 461, which is arranged in a convenient relation to the hand of the operator when he grasps the handle 460 of the link 412 to shift it from either stud to the other.

In the operation of this apparatus when set for single-leading, the lead is pushed up into the plane of the galley into the space immediately beneath the rule 420, as the galley-plunger 400 comes forward, the lead following the rule 420 in its upward movement from the position shown in Fig. 23, so that the lead is inserted between the two last lines of the galley. When the apparatus is set for double-leading, as shown in Fig. 31, the first lead is inserted, as already described for single-leading, and the last line of type is pushed beyond the rule 420, after which the extension of the cam 408, which is brought into action upon the galley-plunger by the increased amplitude of movement of the arm 407, allows the plunger 400 to drop back slightly to the position shown in Fig. 23ᵃ, leaving an opening between the last line of type and the face of the plunger 400, into which the second lead is then pushed by the action of the cam 455 in swinging to the full-line position in Fig. 31, whereupon the plunger 400 makes another forward movement sufficient to carry the second lead beyond the plane of the rule 420, which then drops behind that lead and retains it in place while waiting for the succeeding line.

*Measuring and shortage dividing mechanism.*—The function of this mechanism is to measure the line to ascertain its shortage and to ascertain the thickness of the required spacer or combination of spacers which must be inserted in each of the spaces between words in order to fill out or justify the line to the required measure. According to this treatment of the problem a twofold operation is performed—first to measure the line to ascertain the total shortage to be supplied, and, secondly, to divide that total shortage into the number of spaces in the line.

The measuring agencies operate upon both ends of the line to be measured. One of these agencies is designated a "stop-jaw" 801, which prior to the measuring operation is advanced along the typeway to an extent in accordance with the number of separators in the line, so as to eliminate from the measurement of the given line all or a portion of the thickness of the separators employed in that line. In the present instance it is assumed that no spacer smaller than A or basic spacer will be employed in the final justified line. Therefore the measuring and dividing operations are arranged to ascertain how much in excess of one of the basics must be inserted in each space in order to justify the line. For this reason the stop-jaw 801, instead of being pushed forward to an extent equaling the entire thickness of all the separators in a line, is only pushed forward to an extent equaling the thickness of all the word-separators less an equal number of basic spacers, or, in other words, for each word-separator contained in a line the stop-jaw is pushed forward to an extent equaling the separator-thickness less the thickness of the basic or A spacer.

Although the stop-jaw is moved longitudinally of the typeway by means which effect the approximate movement required, its final position is accurately determined by a series of teeth in a rack 804 in the front wall of the typeway. The front end of the stop-jaw 801 is provided with a tooth 803, which at the conclusion of the longitudinal setting movement of the stop-jaw is moved forward into contact with the appropriate tooth of the rack 804, the teeth of which are of appropriate form to withstand the pressure of the forward end of the line against the left-hand side of the stop-jaw. The length of this rack is adapted to the requirements of the longest lines to be justified by the machine.

The stop-jaw 801 is mounted to slide transversely of the typeway at about the middle of the height thereof in a guide-box 805, which is mounted on ways 811 on a rack 812, the guide-box being provided with means for clamping it to the rack at any desired position of its length, so as to enable the stop-jaw to be adjusted for different measures or lengths of line to be justified. The rearward end of the slide is provided with a pin 802, which engages in a groove 823 of a bar 820, which is mounted upon the swinging arms 825, so as to be swung toward and from the typeway while maintaining a parallel relation thereto, in order to carry the stop-jaw across the typeway from the position shown in Fig. 7ᵃ to that of Fig. 7, being yieldingly held toward the latter position by means of the spring 821. The bar 820 is provided with a beveled shoulder 822, which is engaged by the correspondingly-beveled forward end of the second measuring-slide 730 to move back the swinging bar and its connecting stop-jaw against the pressure of the spring at the conclusion of the measuring operation when it is desired to withdraw the stop-jaw from in front of the line, as shown in Fig. 6. The rack 812 is supported in suitable guideways in the framing and extends toward the left into engagement with a gear-wheel 813 on the cylinder-shaft 922, Figs. 6ᵃ and 10. The longitudinal setting movement of the stop-jaw is by means of its geared connection with the cylinder-shaft imparted at the same time and by the same means as the setting of the stop-cylinder 901, to be hereinafter described.

Having thus described the mechanism of the stop-jaw, which is stationary during the measuring operation, and thereby forms a fixed basis for the measurement, I will next describe the movable members of the measuring combination. The measuring-slides are mounted to slide longitudinally of the machine parallel with the typeway. The first measuring-slide 701 is connected positively with the second measuring-slide 730 by means of gearing, which causes the second slide to move twice as far as the first slide and in the opposite direction. This second slide is connected with a third or registering slide 1001 by means of a dividing-bar 981, which by the operation of a stop-cylinder imparts a movement to the registering slide suitably related to the size of the spaces in the line.

The first measuring-slide 701 is guided in suitable bearings in the slide-plate 702 and is provided at its right-hand end with a measuring-pawl 706, which is held by the spring 705 in engaging relation across the typeway 200 and constitutes the movable jaw operating at the rearward end of each line to compact the type forwardly against the fixed or stationary stop-jaw 801, as shown in Fig. 7. The rearward side of the left-hand end of the first measuring-slide 701 is provided with rack-teeth which mesh with the gear 742 on the vertical shaft 740, which is mounted in bearings in the plate 702 and is provided at its lower end with the gear 744, meshing with teeth on the front side of the second measuring-slide 730, Figs. 6, 7, and 9ᵃ. The left-hand end of this second measuring-slide extends toward the galley-section of the machine and terminates in the beveled surface 737, which engages with the correspondingly-beveled surface 822 to move the stop-jaw forward and back, as previously explained. To the under side of this second measuring-slide is also attached the bracket 985, to which is pivotally suspended at 984 the dividing-bar 981, Figs. 8, 10, and 25ᵇ. The slotted or bifurcated end of this dividing-bar engages with the registering slide 1001 by means of the stud 988.

The movements of the measuring mechanism are modified in transmission from the second measuring-slide 730 to the registering slide 1001 in accordance with the number of spaces in the line being measured. This modification is accomplished by means of the dividing-bar 981 and a stop-cylinder 901, which is mounted on a vertical shaft 922, journaled in the bracket 923 adjacent to and in front of the dividing-bar, Figs. 25 to 28. The front face of the dividing-bar is provided with a projecting ledge 990, which extends quite close to the cylinder from end to end thereof, as best shown in Figs. 25 to 25ᶜ. The peripheral surface of the cylinder is provided with a series of stop-pins 902–921. Twenty of these stop-pins are herein shown, being thereby adapted to justification of lines having a maximum of twenty spaces; but this number may be increased to any desired extent. These stop-pins are arranged at regular angular intervals around the periphery of the cylinder, occupying twenty of the twenty-four equal divisions thereof. These stop-pins are spaced longitudinally of the cylinder at unequal intervals, decreasing in spacing from the top toward the bottom of the cylinder in accordance with the decreasing ratio required for dividing that movement into the number of spaces in the line. The uppermost stop-pin 902 is located at such a vertical height relative to the pivots 984 and 988 of the dividing-bar as to impart to this particular arrangement of the mechanism a movement suitable for selecting one spacer or spacer combination of the required thickness to be inserted in a line having but a single space. The second pin 903 is at a vertical position suitable for selecting a spacer or spacer combination of half the thickness that would have been selected by the use of the first pin 902, inasmuch as two of them are to be employed in the two spaces of the line, and so on through the succeeding pins of that series.

As a means for setting the appropriate stop-pin of the cylinder in operative relation to the dividing-bar, the cylinder is provided at its upper end with a gear 962, which meshes with a pinion 960 on the lower end of the star-wheel shaft 950. The cylinder is also provided with the gear 813, meshing with the rack 812, which operates, as already described, to set the stop-jaw concurrently with the setting of the stop-cylinder, both in accordance with the number of separators contained in the line. This setting is accomplished by means of the passing extensions of the word and line separators, Figs. 10 to 10<sup>b</sup>. The star-wheel shaft 950 is provided with the star-wheels 953 and 954, which project across the typeway above and below the ends of the type, so as to be engaged by the ends of the passing separators. Inasmuch as these projecting ends are, at least for the smaller sizes of type, somewhat delicate, they are not relied upon to advance the stop-cylinder, but operate the star-wheel devices as an escapement, the turning of the cylinder being accomplished through the medium of the gear 931 on the lower end of the cylinder, which meshes with the rack 932, the latter being moved longitudinally by its frictional connection with the arm 416, which is worked by the crank 234 for the grab mechanism. The connection between the rack 932 and the arm 416 is made by means of the rod 975, which is pivoted at 971 to the swiveling friction-block 970, sliding on the bearing 972 of the lever-arm 416. The setting of the stop-cylinder takes place while the first grab 230 is moved forwardly, the forward movement of the lower arm 416 being thus utilized through its frictional connection with the rack 932 to draw the cylinder around as the escapement star-wheels are tripped by the projections of the passing separators. The construction and operation of the escapement devices will be understood by reference to Figs. 10 and 10<sup>a</sup>. The escapement pallet-lever 956 is pivoted at 959 adjacent to the typeway and is held toward that typeway to the position shown in Fig. 10<sup>a</sup> by means of the spring 957. One arm or pallet 966 engages with the reversed ratchet-wheel 955, which is pinned to the upper portion of the star-wheel shaft 950, while the lower arm or pallet 967 projects into the pathway of the upper extensions of the separators. The action of a passing separator, as illustrated in Figs. 10<sup>a</sup> and 10<sup>b</sup>, is to push back the pallet and free the arm 966 from the ratchet 955, as shown in Fig. 10<sup>b</sup>, thus permitting the star-wheel and its associated stop-cylinder to be turned one step forward, this being repeated with each succeeding separator in the line, so that when the line has passed by the star-wheel the stop-cylinder and the stop-jaw are set to positions which accord with the number of separators contained in the line to be measured and justified.

Inasmuch as the line-separator also operates upon the escapement device and advances the stop-cylinder and the stop-jaw one place farther than would be required for the number of spaces in the line, this extra movement is provided for at the beginning of the setting movement, the resting position of the stop-jaw and the stop-cylinder being one space back of what may be termed their "theoretical starting position," so that the action of the line-separator is eliminated in the final result. The thickness of the line-separator does not enter into the measuring problem, since what may be termed the "theoretical starting position" of the measuring-pawl 706 begins at a point in the typeway which would be coincident with the beginning of a standard or full-length line, the movement of the measuring-pawl from this point until it is stopped by the compacted line being the effective measuring movement of the pawl, equaling the total thickness of justifying-spacers that must be inserted in the spaces of that line above, or rather in addition to the predetermined basic spacers for which this particular mechanism is arranged.

As the stop-cylinder is moved forward to its setting by the conjoint action of the frictional driving and escapement devices above referred to it is retained in the set positions by means of a detent 925, pivoted at 927 to the hub 926 of the bracket 923, Figs. 6<sup>a</sup>, 10, and 25. That detent is held into engagement with the ratchet-wheel 924, fixed to the upper end of the stop-cylinder 901, by means of its slotted engagement with the pin 930, attached to the cranked lever 285, Fig. 6<sup>a</sup>, the crank and the pawl being resiliently drawn backwardly by means of the spring 289. That cranked lever, as already described, is also employed for the function of detaching the latch 281 of the first grab from the second grab as the latter is drawn back, and this detaching movement serves also to withdraw the detent 925 from the ratchet 924 and allow the stop-cylinder to be returned to its zero or starting position as the first grab comes back for the succeeding line. The cylinder is thus returned by means of the cranked arm 934, pivoted at 935 to the bed-plate 1, the upper end of the arm bearing against the end of the cylinder-rack 932, while the lower end of the arm is carried by the succeeding stroke of the plunger-lever 1716, which is provided with a stud 936 for engaging with the arm 934.

During the time that the first line-grab is pushing a line into the measuring zone past the escapement mechanism and while the stop-cylinder and stop-jaw are thus being set to their appropriate positions for that line the measuring-slide rests in its retracted position, (shown in Fig. 7ª,) being drawn back and held in that position by means of the link 707, connecting the first measuring-slide 701 with the arm 710, which is pivoted at 712 to the bed-plate 1. That arm is connected at 714 with the cam-arm 717 by means of the link 713, Figs. 1 and 2. That cam-arm is pivoted at 718 to the bed-plate 1, and its upper end engages with the cam 721 upon the line-shaft 160, being held into engaging relation with that cam by the weight 733, which is attached, by means of the cord 732 passing over the idle pulley 734, to the left-hand end of the second measuring-slide 730. As each line is carried forward to the measuring zone the line-separator of that line in passing the triggers 606 trip the detent 602, thereby starting the line mechanism, as above described. As the cam 721 rotates it allows the measuring-slides to be moved forward by the weight 733 until the movement is stopped by the contact of the measuring-pawl 706 with the end of the line, as shown in Fig. 7. The measuring-pawl is retracted far enough behind its theoretical starting position so that the first portion of its measuring movement is utilized to retract the beveled end 737 from behind the corresponding bevel 822 of the swinging bar 820, thereby letting the stop-jaw 801 forward, so that its tooth 803 enters the notch of the rack 804, to which it has been moved in the setting operation before the measuring-pawl reaches the theoretical starting-point of its measuring movement.

In order to compact the measured line closely against the stop-jaw 801 and in order to retain the measuring-slides in the measured position during the subsequent setting of the registering-slide, a locking device is provided, which is best shown in Figs. 6ª, 8, and 9ª. The second measuring-slide 730 has upon its under side the ratchet-rack 738, which is engaged by the point of a pawl 755, mounted upon a lock-slide 750, which is beneath and parallel with the second measuring-slide 730 and has a longitudinal movement slightly greater than the pitch of the teeth 738. The lower cranked arm 770 of the locking-pawl 755 projects downwardly from its pivot in engaging relation to an arm of the cranked cam-lever 771, the other end of which engages with the side of the cam 772 on the line-shaft 160, which operates to lift the locking-pawl 755 into contact with the ratchet-rack 738 just after the conclusion of the forward measuring movement. The left-hand end of the lock-slide 750 is engaged by a transversely-sliding wedge 757, Figs. 6ª and 9ª, sliding in a bearing 758 and engaging with a beveled face 753 of the slide 750. The under side of the wedge 757 is provided with rack-teeth which are engaged by the sector-gear 773, pivoted upon the stud 775, an arm 776 of the sector being held against the cam 777 on the line-shaft by means of the spring 661, which serves to push the wedge forward when permitted to do so by the cam 777, which takes place at the conclusion of the measuring operation and just after the locking-pawl 755 has been raised into engagement with the ratchet-teeth 738, thereby taking up all lost motion in both measuring-slides and preventing the recoil of the rack during the subsequent operation of the dividing-bar in setting the register-slide, after which the wedge 757 is retracted by the cam 777 and the locking-pawl 755 is dropped out of the ratchet, thereby releasing the measuring-slides for their succeeding movements.

The registering-slide 1001, to which the lower end of the dividing-bar 981 is attached, is mounted for longitudinal movement in the bracket 1002, its rearward end being guided by the clamping devices to be hereinafter described. The slide is moved toward the right, which is in the direction of the progress of the type, by means of the cam-lever 1008, which is pivotally suspended at 1011 from the bracket 1010 and is provided with a cam-lug 1009, which comes against the cam 1012 on the line-shaft 160, Fig. 9. The cam-lever 1008 bears against the adjusting-screw 1006 in the lug 1005 of the registering-slide 1001, and to that lug is also attached a spring 1004, which holds the registering-slide into contact with the lever 1008 and holds the latter into contact with its cam 1012. During the operation of setting the stop-cylinder to place the registering-slide is moved forward by its cam-lever 1008, thereby carrying the forward end of the dividing-bar to its forward position, the upper end being also carried in the same direction by the second measuring-slide 730, to which it is attached, so that the dividing-bar is in this way carried clear of the stop-pins, permitting them to be set to position. At the conclusion of the measuring operation and after the upper slides are locked in position against the line, as above described, the registering-slide is let back by its cam until the dividing-bar is stopped by its ledge 990 colliding with the appropriate stop-pin of the cylinder, which has been set to the engaging position by the new line. The tendency of the spring 1004 to turn the stop-cylinders is resisted by the detent 925 engaging with the ratchet-wheel 924, and the tendency of that spring acting upon its stop-pin as a pivot to move the measuring-slides, to which the upper end of the dividing-bar is attached, is resisted by the operation of the locking-pawl 755 and the wedge 757, as above described.

Having thus set the registering-slide to position in accordance with the measurement of the line, it is clamped in that position while the result of the measurement is being transmitted to the spacer-selecting devices. The left-hand end of the registering-slide 1001 is slotted to form a series of leaves 1013, which are interlaced with a similar series of leaves 1102 of a stationary clamping-piece 1101. The interleaved portions of the members slide upon a bearing 1003 of the foot of the bracket 8, and the clamping movement is imparted by the cam 1117 on the line-shaft 160, which cam acts upon the roller 1115 in the cam-lever 1112, that arm being pivotally mounted at 1116 of the bracket 1108 and provided with the arm 1107, which rests upon the clamping-arm 1104, pivoted at 1109 above the interleaved portion of the registering-slide and its clamping-piece. During the setting movements of the slide the arms 1104 and 1112 are held out of their clamping position by the spring 1106, after which the cam 1117 compresses the leaves, and thus rigidly clamps the slide in place. This interleaved construction forms a very positive locking device.

In some forms of construction the movement of the registering-slide might be communicated directly to the selecting mechanism; but for greater accuracy and for independence of operation of the devices the two mechanisms are disconnected. (See Figs. 6ª, 8, and 28.) After the registering-slide 1001 is set and clamped, as just described, in a position determined by the measurement of the line it serves as a stop for setting the sector-rack 1050, which is appurtenant to the spacer-selecting mechanism, and will therefore be described in detail in connection therewith.

Figs. 25ª and 25ᶜ show the position of the stop-cylinder and the dividing-bar in the position occupied by them when measuring a four-space line, which is of the maximum length assumed for this machine, or, in other words, which requires only the assumed minimum spacing, which will be satisfied by the insertion of a single A or basic spacer in each of the spaces of the line, this position of the dividing-bar being therefore the assumed zero or theoretical starting position from which the effective measuring movement begins. In these figures the fourth stop-pin 905 is shown in engagement with the shoulder or ledge 990 of the dividing-bar. For purposes of illustration the lowermost stop-pins of the series are shown in dotted lines in position occupied by them when the fourteenth stop-pin 915 is in engagement with the dividing-bar for operating upon a fourteen-space line.

In Figs. 25 and 25ᵇ the same parts are shown in the position occupied by them when measuring a four-space line, which is shorter than that assumed in Figs. 25ª and 25ᶜ, and which therefore requires wider justification, as is evidenced by the position of the dividing-bar as compared with its position in Fig. 25ᶜ.

The second measuring-slide herein employed for reversing the direction and multiplying the extent of movement of the first slide, although preferable in the construction herein shown, would not be essential in all cases, since the required multiplication can all be attained by suitably proportioning the dividing-bar or its coöperating parts of the selecting mechanism, and where a second slide is thus employed it may obviously be disposed in any angular relation to the first slide that may be required by the character or the location of the dividing-bar or of the spacer-selecting mechanism. In some simple forms of this device the dividing-bar might be attached directly to the first measuring-slide and the positions for the stop-pins so established with relation to the divider-bar that the movement of the measuring-slide would be transmitted to the registering-slide unchanged for a single-space line, divided by two for a two-space line, divided by three for a three-space line, and so on, and in that case the stop-pins would contact with the dividing-bar at points representing, respectively, one-half, one-third, one-fourth, &c., of its operative length from its lower end; but in the present machine a double function is performed by the bar. It not only transmits to the registering-slide a motion variably divided in accordance with the requirements of the number of spaces in the line, but it also and at the same time multiplies the variably-divided movement by a constant factor, the double function being reduced to a single operation by means of the arrangement of the stop-pins. The movement of the first measuring slide is multiplied by two in its transmission to the second measuring-slide, and the relation of the stop-pins to the operative length of the dividing-bar is such that the measuring movement is further multiplied by nine. Therefore the actual movement of the registering-slide equals the actual measuring movement of the measuring-pawl multiplied by eighteen and divided by the number of spaces in the liner, or, in other words, the movement of the registering-slide is eighteen times the thickness of the spacer or spacer combination that is required to fill out each of the spaces in the line. This multiplied movement, as elsewhere stated, is for the purpose of enabling the spacer-selecting devices to be of a practical and substantial size.

*Spacer-selecting mechanism.*—A description of this mechanism should be prefaced by a description of the spacers themselves and of the system upon which their sizes, selection, and combination are based. These spacers, as stated at the beginning of the specification, are of four different sizes, (designated herein by letters A, B, C, and D, respectively.) The sizes of these spacers are based upon a unit system, the spacer A being twenty-four units, the spacer B thirty units, the spacer C thirty-six units, and the spacer D forty-two units. This system enables the spacers to be combined in a most advantageous manner, increasing the combinations as required by increments of six units from the basic or twenty-four-unit spacer up to any required size. In the mechanism herein shown, however, the maximum limit of combinations is four basic spacers, or ninety-six units, which is large enough for most purposes; but this system may be extended to any desired extent either by continuing the order of combinations or by increasing the size of the unit. In progressing from the smallest to the largest size of spacer combinations the gamut or cycle of the four spaces A, B, C, and D is repeated, with the addition at each repetition or cycle of another basic. This cyclic order of the system on which the spacers are selected and combined is admirably adapted to the operations of the rotary space selecting and correcting mechanism herein employed, each complete rotation of which represents the gamut or cycle of these four spacers, the succeeding rotations representing the repetitions of the gamut up to the required extent. This system will best be understood if represented in tabular form, as follows:

| Cycles. | Space measurement in units. | Spacers selected. |
|---|---|---|
| First | .024 | A |
|  | .030 | B |
|  | .036 | C |
|  | .042 | D |
|  | .048 | 2 A |
|  | .054 | A plus B |
| Second | .060 | A " C |
|  | .066 | A " D |
|  | .072 | 3 A |
|  | .078 | 2 A " B |
|  | .084 | 2 A " C |
| Third | .090 | 2 A " D |
|  | .096 | 4 A |

In the machine shown, for constructive reasons having nothing to do with the principle of the machine, the selector rests at the position for maximum selection during the measuring and space-dividing operations and is then rotated toward its minimum limit to the position determined by the result of those operations and then rotates back toward the maximum limit, if required, under the action of the correcting mechanism, as described hereafter.

On account of the circumstance that the A spacer is the smaller of the series and is most frequently used in the spacer combination it is herein designated as the "basic" spacer, the other three being designated "fractional" spacers. Two or more of these basic spacers are frequently employed in the same combination, either with or without one of the fractional spacers; but the fractional spacers are never repeated in the same combination nor are different fractional spacers ever combined. When used in combination, they are used only with one or more of the basic spacers. These four sizes of spacers are stored in the channels A2110, D2110, C2110, and B2110 in the space-case 2109, Figs. 19, 20, and 21, located from top to bottom in the order named, the prefixed letters designating the spacers contained in the respective channels. These spacer-channels are connected with their respective distributing-channels of the composing-machine, the spacers being circulated in a manner to be hereinafter described, and each channel is provided with a follower 2250, by means of which the columns of spacers are pushed forward toward the ejecting or discharging end of the channels.

On account of the repetition and combination of the basic spacers they are handled somewhat differently from the others or fractional spacers, which are not repeated in the same combination nor combined excepting with one or more basics. Therefore the selecting and ejecting devices for the basic or A spacers require a separate description, which will precede that of the fractional spacer mechanism.

The channel A2110, as best shown in Figs. 19 and 21, is directly beneath the typeway 200 and opens into the vertical raceway 1840, which is wide enough to receive four of the basic spacers side by side and extends upwardly to the typeway 200 in the plane of the word-slide 300, communicating with the basic portal 315 of the word-slide when the latter is in its third position. The required number of basics is pushed upwardly through the portal 315 into the typeway by means of one or more of the basic ejectors 1831, 1832, 1833, and 1834, which rest side by side in the basic raceway 1840, their upper ends when in resting position being just below the bottom of the spacer-channel A2110. These plungers are each of the approximate thickness of a basic spacer, so that when one or more of them are pushed upwardly they will carry with them a corresponding number of the basics out of that channel into the typeway.

In order to enable the required number of these plungers to be selected and pushed upwardly, they are provided in the order of their numerals with the projecting selecting-wards 1841, 1842, 1843, and 1844. These wards project to different lengths, as best shown in Figs. 19 and 20, the ward of the first basic ejector 1831 being the longest, and so on down to the ward 1844 of the fourth basic ejector 1834, which is the shortest of the series. The length of these wards may vary as much as desired, and the necessity for the great accuracy in the movement of the basic plunger, which would be necessary if these ejectors differed only by the thickness of a basic, is thus avoided. The required number of these ejectors is selected and raised to eject a corresponding number of the basic spacers by means of the basic selector-pawl 1703, which is pivotally mounted at 1706 upon the plunger-slide 1701, which is mounted to reciprocate vertically upon the guide 1702 and is connected by means of the link 1715 with a lever 1716, fixed to the rock-shaft 1718, which is journaled in the bed-plate 1 and has at its rearward end an arm 1719, the end of which is connected by the pitman 1721 with the crank-pin 1723, upon the side of the selecting-slide cam 1510 upon the word-shaft 165, Figs. 12 and 13, by means of which the basic selector-pawl 1703 reciprocates vertically to the required extent at each rotation of that word-shaft.

The arm 1708 of the pawl is connected, by means of the link 1709, with a friction-block 1711, sliding on the guide 1702, which is provided with a spring which bears against the guide 1702 and offers frictional resistance to the vertical movements of the block 1711, so that latter as it is pulled upwardly by the link 1709 reacts upon the pawl 1703 at the beginning of the upward stroke to pull the upper end of that pawl inwardly toward the selecting-wards 1844 1844 of the basic ejectors, and when pushed downwardly by the link 1709 at the beginning of the downward movement it reacts to push the pawl outwardly.

The upper end 1705 of the pawl 1703 projects inwardly toward engaging relation with the selecting-wards 1841 1844, and the swinging movement of this upper end of the pawl is so controlled during this upward movement as to cause it to engage with one or more of the selecting-wards or to pass by them without engaging any by means of the selector-guide 1601, Figs. 14, 20, and 20ª. That guide extends vertically the length of the vertical movement of the pawl 1703, the latter being provided with a projecting pin 1704, which rests upon the guide. That guide is attached to an arm 1602, carried by the rock-shaft 1606, which is journaled in the brackets 1608. The lower end of that shaft is provided with an arm 1620, having pivotally attached to it at 1623 a link 1621, which is operated as hereinafter described from one or both of two sources, the cumulator 1207 and the rotary selector 1307, to rock the shaft 1606 and the guide 1601 to the position in which the selector-pawl 1703 will engage with the desired number of basic ejectors or will be held out of engagement with them, as may be required, Fig. 14.

To the upper end of the rock-shaft 1606 is attached a gate-arm 1613, the outer end of which connects, by means of the pin 1615, with the gate 1610. That gate slides in ways in the upper end of the space-case, Figs. 14 to 21, and extends above the ejecting end of the basic channel A2110, the movements of the gate imparted to it by its arm 1613 serving to close the throat or opening through which the basic spacers are ejected, so as to prevent more than the required number of spacers being pushed up by the ejectors in case the spacers should be stuck together, the gateway being controlled so as to leave an opening upwardly from the end of the basic channel equalling the thickness of the ejectors pushed up by the pawl 1703, as best shown in Fig. 21. The shaft 1606 and its attached parts are yieldingly held in the direction of the arrow 1616 by means of the spring 1617, Fig. 14, the controlling devices operated through the link 1621 being applied in a reverse direction, so as to move the parts against the tension of the spring 1617.

The arm 1602 is keyed or splined to the shaft 1606 by means of the pin 1607 of the shaft engaging with the slot 1604 of the arm, which is secured in its operative position (shown in Fig. 20ª) by means of the thumb-screw 1605. By loosening that thumb-screw and raising the arm 1602 until it is clear of the pin 1607 the arm may be swung around, so as to carry the guide 1601 away from the front of the spacer-channels to permit ready examination or adjustment of the parts.

The presser-feet 1824 may also be provided with means for latching them back, as shown in Fig. 20ª, in which the latch 1825 is pivotally mounted upon the presser-foot D1824, and when the presser-foot is drawn back abuts against the right-hand side of the cap 1827, the cap being cut away to permit the forward movement of the latch when the latter is raised to release the presser-foot.

As a means for returning the basic ejectors 1831 1834 again to their lowest positions, the lower ends of those ejectors are provided with the projections 1846, the tops of which are engaged by a lug 2057 upon a slide 2054, sliding upon the guide 2055, held in place by the gib 2056, Figs. 1, 21, and 21ª. The slide 2054 is provided with a connecting-rod 2058, which is pivotally attached to the end of the auxiliary lever 2060 which is pivoted at 2062 to the bracket 2061 and carries the link 2063, pivoted at 2064. The upper end of that link is provided with a notch 2065, which engages with a stud 2066 on the side of the cam-lever arm 1716, being held yieldingly into engaging relation to that stud by means of the spring 2067, one end of which is attached to the link and the other to the cam-arm. (See Fig. 1.) This connection of the slide 2054 with the cam-lever arm 1716 operates during the first portion of the downward stroke of that arm to carry down quickly those basic ejectors which were moved up by the previous upward stroke of the arm 1716, so as to promptly withdraw the upper ends of those ejectors from the portal 315 of the word-slide and enable the latter to make its succeeding movement. Upon reaching in its downward stroke the position shown in Fig. 1, the link 2063 is detached from the ejector-lever 1716 by means of the stud 2069 on the cylinder-bracket striking the cam-surface 2068 of the upper end of the link 2063. As the ejector-lever nears the lower end of its movement its lower edge strikes upon the stud 2070, fixed in the link 2063 near its lower ends, and completes the downward return movement of the basic ejectors, moving them to the position occupied by the ejectors 1833 and 1834 in Fig. 21.

The fractional spacers B, C, and D are stored in the channels 2110 of the space-case 2109. These channels for the fractional spacers are behind the plane of the typeway 200 and the channel for the basic spacers, and communicate, by means of cross-passages at the ends of the channels, with the fractional raceway 1823, into which they are pushed as required by their respective ejectors 1820, which are mounted in the guides 1821 in the main bracket, Figs. 14, 19, and 21. These ejectors are held in their backward position by means of the springs 1822, the ends of the ejectors being in engaging relation to their respective ejector-arms 1805. By means of these ejectors the fractional spacers are pushed into the raceway 1823 beneath the presser-feet 1824, which under the tension of the springs 1826 retain their respective spacers in position, when the ejectors are withdrawn, after which the presser thus held is pushed upwardly into the typeway 200, through the raceway 1823 and the portal 316 of the word-slide by the plunger 2001, Figs. 20, 20ª, and 21, attached to the plunger-slide 1701. As best shown in Fig. 21, this raceway 1823 for the fractional spacers is at the right of the basic raceway 1840, the latter being wide enough in the machine here shown for four basic spacers, whereas the fractional raceway 1823 is only wide enough for a D spacer, which is the largest spacer to pass through this channel. Whenever one or more basics and a fractional are combined, as in the instance illustrated in Fig. 21, they are carried up together by their respective plungers under the operation of the plunger-lever 1716.

The three ejectors 1820 are operated upon by the three ejector-arms B1805, C1805, and D1805, each of which is provided with an adjustable screw 1806 for engaging with the respective ends of the ejectors 1820. These arms are pivotally mounted upon the vertical rock-shaft 1801, journaled at its ends in the bearings 1802 and 1803 of the bracket 1302. These three ejector-arms are provided with selector-arms B1804, C1804, and D1804, respectively. A fourth arm A1805 is fixed upon the shaft 1801 by means of a cross-pin and is connected, by means of the link 1640, with the basic cam-link 1621, so that by oscillating the shaft 1801 the rearward end of that cam-link may be shifted to bring either one of its three steps 1632, 1633, and 1634 into engagement with the stud 1625 of the lever-arm 1624. This shifting of the arm serves to operate the selector-pawl guide 1601, as already described, and thus cooperates in determining the number of basic spacers to be selected, and serving also when moved to the position shown in Fig. 14 to carry the basic selecting-pawl entirely out of operation to shut off the selecting mechanism, while removing the line-separator, as hereinafter described.

The link-shifting arm A1805 and the three ejector-arms B, C, and D1805 are each provided with a selector-arm 1804, distinguished in the drawings by prefixing the letters A, B, C, and D respectively. The arm A1805, which is pinned to the rock-shaft 1801, is operated by means of the uppermost selector-arm A1804, which is also secured to that shaft by a cross-pin, Fig. 19. The arm B1805 is secured to a sleeve B1807, loosely mounted on the shaft 1801, the upper end of the sleeve having fixed upon it the selector-arm B1804. The ejector-arm C1805 is provided with an integral hub C1807, which is mounted to oscillate upon the sleeve B1807, that hub being provided with the integral selector-arm C1804, while the ejector-arm D1805 is mounted to oscillate loosely upon the shaft 1801, being provided with the integral arm D1804. By this arrangement each of the ejector and link-shifting arms 1805 may be oscillated independently of the others by means of their respective selector-arms 1804, which extend rearwardly, as best shown in Figs. 13 and 19, into engaging relation to the four selecting-fingers 1505, which are herein distinguished by prefixing A, B, C, and D in accordance with the spacers, for which they are respectively employed. These selecting-fingers are pivotally mounted at 1504 upon the reciprocating selecting-slide 1501, Figs. 12, 13, and 14, which is fitted in the guides 1502 on the bracket 11 and is driven, by means of a cam 1510 on the word-shaft 165 engaging with the roller or stud 1511 appurtenant to the slide.

The selecting-fingers 1505 are pressed rearwardly by means of the springs 1506, so as to hold those fingers yieldingly into engaging relation to their respective wings of the selector 1307, which is set in accordance with the measurement of each line, and by its positions determines which one of the four selecting-fingers is to be employed, as will be hereinafter described. The selecting-fingers are each provided with a cam-arm 1508, the inclined ends of which engage with an abutment 1503 on the guide 1502 when the slide is in its backward or resting position, (shown in Fig. 14,) so as to hold the selecting-fingers 1505 out of engagement with the wings 1308 of the selector, that being the position of the selector-slide when the selector is set to position after the measurement of each line. Each finger is also provided with a shoulder 1509, which projects from the front side of the finger into operative relation to the respective selecting-arms 1804, as best shown in Fig. 13. The relation of these fingers and arms to the wings 1308 of the selector is such that only one finger 1505 is ever deflected into engaging relation to its arm 1804 at any stroke of the selecting-slide, the movement of that slide imparted by its cam 1510 being sufficient to move the selected arm 1804 to the extent represented by the positions of the two arms A1804 and D1804 in Fig. 13, and that movement being sufficient to eject one of the fractional spacers from its channel into its raceway 1823, or to move the basic cam-link 1621 laterally from the position shown in Fig. 32 to that of Fig. 32ª.

Inasmuch as the word-shaft mechanism must make a complete movement for each of the separators in a line in order to remove those separators therefrom and inasmuch as the operation of removing the last or line separator must not be accompanied by the insertion of justifying-spacers in place of that separator, it is necessary to throw the selecting devices automatically out of action during the last stroke of the word mechanism while removing the line-separator. To this end means are provided for supporting the selector-arms 1804 in engaging relation to the selecting-fingers 1505 while operating upon the word-separators of the line and for withdrawing them from that operative relation while operating upon the last or line separator. This is effected by means of the shut-off cam 661, which is affixed to the shut-off shaft 629, previously described in connection with the driving mechanism. While the word mechanism is in operation upon the word-separators of a line, the shut-off shaft and its cam are held in the position shown in Fig. 13 by means of the detent 622. The cam 661 when in this position forms a stop for the rearward or resting position of the selecting-arms 1804, as shown by the position of the arm A1804 in Fig. 13, the arms B, C, and D being returned to this position by means of the springs 1826, while the arm A1804 is returned to this position against the shut-off cam by means of the spring 1642. Thus the shut-off cam 661 serves as a stop for the backward resting position of all four of the selector-arms 1804, and when in position for the word-spaces of a line operates, as shown in Fig. 13, to support those selector-arms, so that any one of them may be engaged by the forward movement of its selecting-fingers when moved forward by the selector 1307; but when operating upon the final or line separator of each line which is not to be replaced by justifying-spacers the detent 622 is tripped and the shut-off shaft 629 turned to the position shown in Figs. 5 and 14, thereby allowing the four selector-arms 1804 to swing farther back to a position where they cannot be engaged by their respective selecting-fingers as the latter make their final forward movement with the word mechanism to enable the word-slide to advance the last word of each line into the galley and to remove the line-separator from the line.

By the description thus far given it will be evident that the selecting-fingers 1505 are carried forward and back by the selecting-slide 1501 for each of the separators contained in the line which is being justified and that while operating upon the word-spacers of the line the selecting-arms 1804 are held by the shut-off cam 661 in the position shown in Fig. 13, so that one and only one of the selecting-arms 1804 is operated at each forward movement of the fingers, the selection of the finger being dependent upon the position of the rotary selector 1307, which, as shown in Figs. 16 and 16ª, is provided with four wings located in the plane of the four fingers 1505. These four wings constitute the selector for determining the selection and combination of the justifying-spacers for each line, and the position of the selector is determined by the result of the measuring operation performed upon each line, as already described.

The selector 1307 is fixed upon the vertical shaft 1301, which is mounted to rotate in the hubs 1303 and 1304 of the brackets 1302. The lower end of the selector-shaft has fixed upon it a gear 1305, which meshes with the sector 1201, pivotally mounted upon a stud 1203, supported in the bed-plate 1 of the machine. That sector has fixed upon it the rack-sector 1204, which engages with a rack 1050, mounted to slide longitudinally in the main bracket 2 and in the slide-bracket 1002. That rack is provided with a lug 1054, carrying an adjusting-screw 1055, which is fixed in place by the lock-nut 1056. The left-hand end of the rack engages with a cam-lever 1057, which is pivotally mounted at 1059 upon the bracket 1058, and engages, by means of the pin or roller 1061, with a cam 1062 on the line-shaft 160. By means of this cam and cam-lever the rack 1050 is held in its extreme forward or right-hand position, so as to hold the sector 1201 in the position shown in Fig. 32 during the line-measuring operation and while the registering-slide 1001 is being set and clamped to place, after which the cam 1062 lets the rack backward to the left until the screw 1055 of the rack 1050 collides with the stop 1014 of the registering slide 1001, Fig. 6ª. The rack is moved to the left and held against the cam-lever 1057 by the action of the coiled spring 1065, Fig. 5, the outer end of which is attached to the main bracket 2, the inner end being attached to the upper end of the selector-shaft 1301 and operates through that shaft the gear 1305 and sectors 1201 and 1204 upon the rack 1050.

Fig. 32 represents the devices of the spacer-selecting mechanism, which act directly through the link 1621 upon the basic selector-guide 1601. The sector 1201 is provided with the cumulator 1207, which is a sector having the steps 1210, 1211, 1212, and 1213, upon which rests the roll or stud 1631 appurtenant to the arm 1630, which is pivotally mounted at 1629 and is adjustably connected with the lever-arm 1624 by means of the lug 1626 and the adjusting-screws 1627. The latter arm is provided with a roll or stud 1625, which engages in a slot 1635 of the link 1621, that slot being arranged in three steps 1632, 1633, and 1634, which may be brought successively into engagement with the stop 1625 by means of the link and its shifter-arm A1805. The position shown in Fig. 32 is the usual resting position of the link, being swung to the position of Fig. 32ª whenever an additional basic is called for by the selecting-finger A1505 and being moved in the opposite direction, so as to bring the step 1634 into engagement when the spacer-selecting mechanism is to be shut off altogether, which occurs during the last moment of the word-slide upon each line for the removal of the line-separator therefrom. These devices are shown in Fig. 32 in the position occupied by them while at rest during the line-measuring operations, the roller 1631 resting upon the step 1210 of the cam-sector, which is the maximum selecting position in which three A spacers would be selected by virtue of that step; but in this position of the sector the selector-wing A1308 is in the arc of contact and operates through its selecting-finger to move the link to the position shown in Fig. 32ª, thereby selecting four A spacers. The other principal positions of the stud 1631 with relation to the steps of the cumulator are shown by dotted circles in Fig. 32, and in connection with each of these positions is indicated the spacer or spacer combination which would be selected at that position.

It should be noted that the movement of the sector 1201 represents a magnified measurement of one of the spaces of the measured line regardless of the number of those spaces—a factor which has been eliminated by operations of the space-dividing mechanism. The multiplication of the space measurement imparted to the registering slide is herein shown to be approximately eighteen-fold, and this magnification is further increased by the relative sizes of the sectors 1204 and 1201, so that the linear movement at the pitch-line of the sector 1201 is approximately eighty-one times the measurement of one space in the line, the exact relation being determined by the requirement that a complete rotation of the selector-shaft 1301 shall represent twenty-four units of space measurement.

The extreme forward position in which the selecting mechanism is held by the cam 1062 during the measuring operation is that for selecting four "A" or basic spacers, which is the maximum of justification herein provided for. Thus it will be seen that the measurement of a line of the minimum length, requiring, therefore, the maximum justification herein assumed, would operate to move the registering slide 1001 up against the contact-screw 1055 of the rack 1050 and retain it in the extreme position, (shown in Fig. 32,) so that it would not be let back at all when released by the cam 1062, whereas longer lines, requiring less justification, will result in setting the registering slide farther back toward the minimum limit. (Illustrated in Figs. 26 and 26ª.) As the rack is thus let back to its resting position against the end of the registering slide 1001 the selector 1307, being geared to the sector 1201, makes a complete rotation for each step of the sector 1207, so that while the sector 1201 turns from one extreme position to the other—that is to say, from its position for selecting four A spacers to the position in which it selects but one A spacer—the selector 1307 makes three complete rotations, each rotation representing a single space measurement of twenty-four units, which is the thickness of one of the A spacers, a quarter-rotation representing six units, which is the difference in size between the series of four justifying-spacers employed herein. When the sector 1201 is set to the position in Fig. 32, with the roll 1631 resting upon the step 1210, the selecting mechanism is in position to select four A or basic spacers, and those four basics would be selected for the measurement of any line showing a deficiency of ninety-six units in each space. In swinging back from the position of Fig. 32 the roll 1631 passes along the successive steps 1211, 1212, and 1213, each rise of the roll upon a higher step operating upon the link 1621 to select one less basic, the several principal positions of the roll 1631 with relation to the stepped sector 1207 being shown by dotted circles in Fig. 32. In connection with each of these positions of the roll 1631 is indicated the spacer or spacer combination that will be selected while in that position, it being understood that the positions shown in Fig. 32 are only those in which the space measurement will be exactly satisfied by the insertion of the designated spacers in each space of the line without "correction." The positions of the roller 1631 intermediate those shown in Fig. 32 would indicate deficiencies that would not be exactly satisfied by the repetition of any spacer combination and would therefore require the employment of the spacer-correcting mechanism, the operation of which will be described later on.

When the spacer-selecting mechanism is thus let back from the position of Fig. 32 to the position determined by the setting of the registering slide, the selecting mechanism is locked in that position by means of a clutch 1312, which surrounds the selecting-shaft 1301 and is fixed to the bracket 1302. That clutch is provided with twenty-four teeth 1315, corresponding with the number of units represented by a complete rotation of the selector 1307. A coöperating clutch 1316, appurtenant to the shaft 1301, is provided with teeth for engaging with the teeth of the clutch 1312. The clutch 1316 is herein shown to be also provided with twenty-four teeth; but this is not essential, since a single tooth upon one of these clutches operating in conjunction with twenty-four on the other clutch would be sufficient for all practical purposes. The clutch 1316 is splined upon the shaft 1301 and is fitted to slide vertically thereon, being controlled by a forked clutch-lever 1319, which engages with the groove 1318 of the clutch 1316. That lever is mounted upon the rock-shaft 1320 of the bracket 1321 and is provided with an upwardly-extending arm 1322, which is connected, by means of a link 1325, with the cam-arm 1057. The link is made in two parts, connected by a spring 1342, and the link is provided with a slot 1343, which engages with a pivot-stud 1344 upon the lever 1057. The slot 1343 allows the cam-lever 1057 to make its full stroke without a corresponding amount of movement of the clutch 1316, which requires only to be lifted into and out of contact with the teeth of its operating-clutch 1312, while the spring 1342 allows the link to be extended in case the clutch-teeth should meet end to end. The clutch is held in its resting or open position during the setting operation of the selecting operation by means of the spring 1326, attached between the bracket 2 and the link 1325, and is closed to the position shown in Fig. 8 by the operation of the cam 1062 acting through the lever 1057 and the link 1325.

The selector 1307 is pinned upon and rotates with the shaft 1301 and is the medium through which the space measurement takes effect upon the selecting-fingers 1505. In order to operate independently upon those fingers, the selector is provided with four wings 1308, arranged, as shown in Figs. 16 to 16ª, in the respective plane of their coöperating fingers. In the drawings the letters A, B, C, and D are prefixed to the numerals of these wings and their coöperating selector-fingers and are indicative of the respective spaces A, B, C, and D, which they serve to select and bring into use. In other words, when the uppermost wing A1308 is in the position shown in Fig. 16ª the selecting-finger A1505 is deflected, so that it engages with the selector-arm A1804, and thus calls for an A or basic spacer, and so on for each of the other three or fractional spacers B, C, and D. It may be noticed that the selector-wings and their fingers are not arranged vertically in the alphabetical order of their respective letters; but this is due to the exigencies of construction and assembling of this particular mechanism and is immaterial. The wings 1308 are, however, disposed circumferentially of the selector 1307 in their proper alphabetical order, as will be seen in Figs. 16 and 16ª. The arrangement and circumferential width of the wings 1308 with relation to the selecting-fingers 1505 is such that whatever may be the position of the selector one and only one of the wings is in the "arc of contact," which equals a quadrant of the circle, designated by the six radial lines 0 to 5 in Fig. 16ª. Each wing while in this arc will deflect its selecting-finger 1505 into engagement with its selector-arm 1804. As soon as one wing passes out of this arc of contact the succeeding wing is moved into that arc. Hence whatever may be the position of the selector some one of its wings is within the arc of contact.

Figs. 26 and 26ª show the position to which the measuring and spacer-selecting devices are set by the measurement of a ten-space line of the maximum length, requiring, therefore, the minimum amount of justification, which is satisfied by the insertion of a single A or basic spacer in each of the ten spaces of the line. In this position the sector 1201 would rest at the opposite extreme from that shown in Fig. 32, with the stud 1631 resting upon the highest step 1213 of the sector 1207. With this setting of the sector and with the link 1621 in its intermediate position (shown in Fig. 32) the basic selecting-pawl 1703 would be held entirely out of engaging relation to its basic ejectors; but this setting of the apparatus brings the selector-wing A1308 into engaging relation with the finger A1505, so that the latter upon its forward movement engages with the selector-arm A1804, and thereby moves the link 1621 to the position shown in Fig. 32ª, thereby adjusting the guide 1601 so as to let the pawl engage with and carry up the first basic ejector 1831.

Figs. 27 and 27ª represent the same parts in operation also upon a ten-space line, which, however, in this case requires two A or basic spacers in each space of the line. The difference in position of the parts as compared with Figs. 26 and 26ª is evident by the inclination of the dividing-bar 981 and the position of the sector 1201, which here is moved far enough to bring the second step 1212 beneath the stud 1631, thereby allowing the link 1621 to move forward the selector-pawl 1703 to engage beneath the first basic ejector 1831. This change in the position of the sector 1201 from that shown in Figs. 26 and 26ª involves a complete rotation of the selector, so that the wing A1308 is again in selecting position, deflecting the finger A1505, so that the arms A1804 and A1805 are actuated, thereby moving the link 1621 from the position of Fig. 32 to that of Fig. 32ª and allowing the selector-pawl 1703 to move into engagement beneath the second basic ejector 1832, so that two of these ejectors are carried up, and consequently two basic or A spacers are inserted in each space of the line.

Figs. 28 and 28ª show the position to which the measuring and spacer selector devices are set by the measurement of a ten-space line, requiring the combination of one basic and one "B" fractional spacer for each of its ten spaces. Consequently the selector 1307 will be advanced one-fourth of a rotation from the position shown in Fig. 27, so that the wing B1308 will be moved into the arc of contact and will deflect its selector-finger B1505 into engaging relation to the selector-arm B1804 and operate the ejector B1820. The position of the sector 1201 is correspondingly changed, so that the roll 1631 of the arm 1630, although resting upon the same step 1211, as in Fig. 27, is about one-fourth of the length of that step removed from the position of Fig. 27, corresponding with the quarter-revolution of the selector. As the result of this setting a single basic spacer will be carried up by the basic ejector 1831, and a single B fractional spacer will be ejected and carried up at the same time in the manner already described. Up to this point it is evident that all lines of type which could be evenly justified by the repetition of any one of the spacers or spacer combinations in each space of the line would operate through the measuring and registering devices to set the sector 1201 and its coöperating selector 1307 to some one of the thirteen positions indicated in Fig. 32 by the thirteen positions of the roll 1631; but on account of the almost infinite variations in the length of the line it is necessary to provide for justification of the intermediate lengths of line, which would operate to set the selecting devices to positions intermediate those shown in Fig. 32. In this machine provision is made for five of these intermediate positions or at intervals representing single units instead of the six-unit intervals. (Represented in Fig. 32.) It is in connection with these intermediate measurements and the corresponding positions of the selector that the correcting mechanism is employed, a description of which will now be given.

*The correcting mechanism.*—Inasmuch as the arrangement and relation of the measuring devices and the selecting mechanism is such that a complete rotation of the selector 1307 represents a measured deficiency of twenty-four units in each space of the line, it follows that a deficiency of six units would be represented by a fourth of a rotation of the cylinder and a deficiency of one unit be represented by one twenty-fourth of a rotation thereof; hence the provision of twenty-four teeth in the locking-clutch 1312, by virtue of which the selector operates upon differences of a single unit in the space measurements of the lines. Therefore the selector may be locked to place in any one of twenty-four positions in each of its rotations, a quadrant of which is represented in Fig 16ª by radial lines numbered "0" to "5," inclusive, and is herein termed the "arc" of contact, these radial lines representing the center line of any one of the wings 1308 in each of the possible positions which that center line of the wing may occupy during the quadrant of its movement in which it is in operative relation to the selecting-fingers 1505. Whenever the space measurement of a line is such that it is exactly satisfied by one of the spacers or spacer combinations, the selecting-wing for that spacer or spacer combination is set at the position designated by 0, corresponding exactly with the positions of the sector 1201 indicated in Fig. 32, and remains in that position throughout the justification of that line. In other words, when the space to be justified is exactly equal to one of the spacers or spacer combinations the roller 1631 will occupy one of the positions shown in Fig. 32, while the selector-wing 1308 for that spacer or spacer combinations is set to and remains in the position 0 of Fig. 16ª; but when the space measurement is not exactly equal to one of the set combinations the selector-wing representing the nearest smaller combination will be initially set with its center line in one of the positions 1, 2, 3, 4, or 5 and operates through its associated selecting-finger 1505 to select that smaller combination, meanwhile advancing the selector in accordance with the accumulating deficiency, and thus bringing the succeeding wing into the arc of contact, and thus operates to select the next larger space, and thereby supply all or a portion of the accumulated deficiency, after which the selector drops back to its initial position until the continued accumulating deficiency and the advancing movement again selects the larger combination, and so on until the line is completed. The function of the correcting device is to thus advance the selector at a rate substantially in accordance with the accumulating deficiency until the succeeding wing is brought into action to select the larger spacer combination and then return the selector to its initial position, repeating this alternate action of the two selector-wings throughout the justification of the line.

The correcting mechanism is all mounted on or appurtenant to the selector-shaft 1301. The principal agent through which the operations of the correcting mechanism takes effect upon the selector is the ratchet-wheel 1430, which is pinned or otherwise fixed upon the selector-shaft 1301 by means of a pin 1432 or in any other convenient way. The ratchet is provided with twenty-four peripheral teeth 1431 in accordance with the twenty-four units represented by a complete rotation of the selector and agreeing in this respect with the number of teeth of the clutch 1312. As a means for advancing the ratchet and the selector 1307 during the correcting operation it is provided with a series of pawls 1451, 1455, and 1459, which are arranged in a tandem relation with respect to the teeth of the ratchet 1430, being pivotally mounted upon the pawl-arm 1450 and pressed toward operative engagement with the ratchet-teeth 1431 by means of the springs 1454, Figs. 13, 16$^b$.

The pawl-arm 1450 is mounted to oscillate in concentric relation to the ratchet 1430, being herein shown to be mounted upon the hub of that ratchet and held lengthwise in place by means of the collar 1437. This pawl-arm receives at each operative stroke of the word mechanism an oscillatory movement slightly greater than four teeth 1431 of the ratchet-wheel, this movement being imparted to the arm through the medium of the link 1470, which connects the stud 1471 of the pawl-arm with a crank-arm 1472, which is mounted to oscillate freely upon the vertical shaft 629, being driven by a connecting-rod 1474 from the selecting-slide 1501, Figs. 12, 13, 13$^a$. The intermediate crank-arm 1472 is employed because of the difficulty in this particular machine in connecting the pawl-arm 1450 directly with the selecting-slide 1501, which might readily be done by rearrangement or modification of the mechanism. The pawl-arm is moved in a direction to advance the ratchet 1430 by the return or idle stroke of the selecting-slide. By this arrangement the selector receives its advancing movement while the selecting-fingers 1505 are being drawn back, and those fingers operate upon their succeeding forward movement to select the spacer or spacer combination determined by the position thus corrected of the selector. The operation of these three pawls is controlled in accordance with the required amount of correction by means of fenders, which prevent all other than the required pawl-arm from acting upon the ratchet during the correcting operations. All three of the pawls are held entirely out of engagement with the ratchet-teeth while the word mechanism is out of operation, so as to permit the selecting mechanism to be set to place. For this latter purpose the pawls are provided with arms 1453 and the pins 1463, which when the pawls are in their extreme forward position slightly beyond that shown in Figs. 18 to 18$^c$, in which extreme position the pawls are held by the selecting-slide when in its extreme backward or resting position, collide with the pins 1483 appurtenant to the fender 1480, thereby holding the points of all three pawls entirely clear of the ratchet-teeth 1431.

The fender 1480 is attached to or integral with the bracket 1302, extending from the main bracket 2. That fender partially encircles the correcting mechanism, being provided with two wings 1485 and 1486. The latter wing is in concentric relation to the path of the pawls 1451, 1455, and 1459. The two latter pawls are provided with pins 1487 and 1488, respectively, which project from the pawl and overlie the wing 1486 of the fender 1480, Figs. 17$^c$ to 17$^f$. That wing is cut away in steps 1481 and 1482, so that the shorter pin 1488 of the third pawl 1459 will drop off from the fender at the step 1481 into engagement with the ratchet-teeth 1431 only after passing by two of those teeth on its forward movement, while the longer fender-pin 1487 of the second pawl 1455 will not drop off the step 1482 of the fender into engagement with the teeth 1431 until after it has passed three of those teeth on its forward movement. The first pawl 1451 does not engage with the fender 1480 at all at any time. Hence so far as that fender is concerned the first pawl might advance the ratchet-wheel 1430 four teeth at each of its forward movements; but the operations of these pawls are further controlled by means of the guard-disk 1416, which is mounted to turn freely upon the shaft 1301 adjacent to and below the ratchet-wheel 1430, Figs. 15 to 15$^b$. All three of these pawls are wide enough to overlie the ratchet-wheel 1430 and the guard-disk 1416, so that the latter serves to hold the pawls out of engagement with the ratchet-teeth even when the pawls are free from the fender 1480, excepting at four positions of the disk, where it is provided with the notches 1421, which are spaced equally around that periphery, the notches coinciding in size with the notches between the teeth 1431 and in position with every sixth notch between those teeth, thus representing by their angular separation six units upon the measurement basis herein assumed, so that these notches 1421 have their definite and intimate relation to the wings 1308 of the selector, and hence these notches 1421 are herein distinguished by the prefixed letters A, B, C, and D, respectively, corresponding with the similarly-lettered wings 1308 of the selector.

The guard-disk 1416 is fitted to turn freely upon the shaft 1301 between the ratchet-wheel 1430 and the collar 1419, which is fixed to the shaft 1301. As a means for locating the disk in proper relation to the selector-wings 1308 the disk is provided with a pin 1418, which is yieldingly held against the stop-lug 1415 of the clutch-barrel 1401, Figs. 16 to 18$^a$, by means of the spring 1422 coiled around that barrel and attached to the projecting stud 1423 of the disk. It will be remembered that the clutch 1316 is lifted out of locking engagement with the clutch 1312 during the setting of this spacer-selecting mechanism, so that all parts mounted upon the shaft 1301 are carried in practically integral relation therewith during the setting operation, the subsequent locking together of the clutches 1312 and 1316 serving to retain the latter with its clutch-barrel 1401 in the position thus set, so that it affords an initial basis for the subsequent rotary movements of the correcting mechanism, the guard-disk 1416 being returned to its initial position at each backward stroke of the pawls, while the selector is returned thereto only at the completion of each correcting operation.

The clutch 1316 is not only arranged to move longitudinally upon the shaft 1301 for its clutching and unclutching movements, but that shaft is adapted to rotate in the clutch to the extent of ninety degrees, being connected by means of the spring 1402, one end of which is attached to the collar 1419, while the other is attached to the clutch-barrel 1401. The tension of the spring tends to rotate the shaft and its attached parts backwardly with relation to the clutch-barrel 1401. As the selector is advanced by the correction-pawls it is detained by means of a ratchet-sector 1403, Fig. 8$^a$, which is fixed to or integral with the clutch-barrel and is provided with five teeth, which are engaged by a detent-pawl 1433, pivotally mounted upon a stud 1434, fixed in the side of the ratchet-wheel 1430 and extending through the annular slot 1417 of the intervening guard-disk 1416, the length of the slot being sufficient to enable the ratchet-wheel to turn ninety degrees with relation to the clutch-barrel and the disk. The detent 1433 is provided with a pin 1435, which projects into the plane of the switch-pawl 1411, which is pivotally mounted at 1412 upon the lug or bracket 1410 of the clutch-barrel 1401. The switch-pawl is provided with a cam-shaped flange 1413, which engages beneath the pin 1435 of the detent 1433 when the latter is advanced the distance of one of the teeth of the sector-ratchet 1403 beyond the fifth or final tooth thereof, as shown in Fig. 18$^e$, thereby raising the detent 1433 out of the path of those teeth, and thus allowing the detent and its ratchet-wheel 1430 to return to its initial position, (shown in Figs. 16$^b$ to 17$^b$,) the end of the pawl striking against the bracket or lug 1410, against which it is yieldingly held by the action of the spring 1402, that being the relative position of the ratchet and the clutch-barrel while the mechanism is being set and at all times excepting when advanced therefrom by the correcting mechanism. Thus the function of the detent 1433 and its sector-ratchet 1403 is to retain the ratchet-wheel, and hence the selector, in each of the positions to which it is advanced by either of the correcting-pawls 1451, 1455, and 1459 while the pawls are returning from the position of Figs. 18 to 18$^e$ to the position of Figs. 16$^b$ to 17$^b$. The detent and sector-rack are not brought into operation at all when justifying a line the spaces of which are exactly filled by a repetition of the same spacer or spacer combinations in all those spaces, or, in other words, when the selecting mechanism is set to any one of the positions represented by the roll 1631 in Fig. 32, since in each of those positions the guard-disk 1416 is set so that it prevents any of the ratchet-pawls from engaging with the ratchet-wheel 1430. These pawls are carried at the end of each forward stroke against the pins 1483 to raise the pawls clear of the ratchet 1430, so as to permit that ratchet to return to its initial position at the completion of each correction, and the pawls rest in this raised position during the setting of the selecting mechanism.

When each space measurement in the line to be justified equals any mulitple of six units, the sector 1201 is set so that the roll 1631 is in one of the positions shown in Fig. 32, and the selector 1308 is set with some one of its four wings in the position occupied by the wing A1308 in Fig. 16$^a$, that position being therein designated by an 0, indicative for purposes of the present explanation that no correction is required. In the case illustrated in Figs 16$^a$, 16$^b$, and 17$^d$ the selector is shown to be set in a position in which the guard-disk holds the three correcting-pawls out of contact with the ratchet-wheel 1430 even if the second and third pawls have in their forward movement dropped off from the fender 1480, so that the correcting mechanism in such a case is not brought into operation at all, and the selector remains in the position to which it is originally set throughout the justification of the line.

In the settings illustrated in Figs. 16ª, 16ᵇ, 25, 26, 27, and 28 the parts are set by measurements which show that the spaces in the line will be exactly filled by the repetition of the same spacer or spacer combination in each space of the line, therefore requiring no correction. In such cases the fender 1480, as shown in Figs. 16ᵇ and 17ᵈ, will prevent the correcting-pawl from engaging with the ratchet-wheel 1430 throughout its forward stroke. Therefore in all such cases the selector 1308 will remain in the position to which it is initially set.

The position of the selector shown in Fig. 16ª is that to which it is set by any measurement which shows a requirement of twenty-five units in each space of the line, or, in other words, showing a requirement of one unit in excess of the basic spacer A. Therefore the selector-wing A is set to the position 1 of Fig. 16ª, one notch in advance of the position of 16ᵇ, thus indicating the deficiency of one unit and the necessity of a corresponding correction. In this setting of the selector the appurtenant guard-disk 1416 is set to the position indicated in Figs. 16ᶜ and 17ᵉ, so that the third pawl 1459 will be brought into operation and at each forward movement will advance the ratchet and selector one tooth to the position shown in Figs. 17ᶠ and 18, and, continuing, will advance the wing A1308 through the second, third, fourth, and fifth positions to the position 6, at which latter position the arm A1308 passes out of the operative quadrant or arc of contact and the wing B1308 is brought into that arc, thereby selecting and inserting a B spacer at the sixth stroke of the word mechanism, which, being six units greater than the A spacer, just supplies the deficiency which has accumulated at that time. As the selector is thus advanced by its step-by-step movement it is retained in the succeeding positions by means of the detent 1433 and the sector-ratchet 1403; but the sixth stroke of the word mechanism advances the detent the distance of one tooth beyond the fifth tooth of the sector 1403, so that the switch-pawl 1411 drops beneath the pin 1435, raising the detent and permitting the selector to return to its initial position of Fig. 16ᶜ, from which position it is again advanced and again returned until the line is completed. In this connection it should be noted that the selector remains in the position to which it is initially set by the measuring devices while the selecting-fingers make their first forward stroke, the second forward stroke of the fingers taking effect upon the first corrected position of the selector, and so on, so that the sixth forward stroke of the selecting-fingers takes place while the selector is in its fifth corrected position from that of Fig. 16ᶜ, which is that indicated by the numeral 6 in Fig. 16ª, the selector being held in this position during that stroke by the detent 1433 engaging with the fifth tooth of the sector-ratchet 1403, that detent being moved to its releasing position (shown in Fig. 18ᵉ) by the return of the selecting-fingers from that sixth stroke, so that upon the seventh forward stroke the selecting-fingers find the selector in its initial position of Fig. 16ᶜ. In all cases the selector is returned to its initial setting whenever it has been advanced to the extent of six of its own notches, because of the circumstance that the sector or detent-ratchet 1403 has but five teeth, the position of the sixth tooth being occupied by the end of the detent-releasing switch-pawl 1411.

The selecting mechanism is shown in Fig. 16ᵈ in the position to which it is set for a correction of two units corresponding with the position 2 of Fig. 16ª. In this position the guard-disk 1416 permits the second pawl 1455 to engage with the ratchet-wheel 1430 after that pawl has made half of its forward stroke, so as to advance the ratchet two notches by the last half of that stroke to the position shown in Fig. 18ª, this advancing movement of the ratchet and the selector taking place during the return of the selecting-fingers from their first stroke, in which a basic spacer was inserted, leaving a deficiency of two units as to the first space in the line. Upon the second stroke of the selecting-fingers another basic spacer is inserted in the second space of the line, and the ratchet is advanced two more teeth, indicative of an accumulated deficiency of four units, which carries the selecting-wing 1308 out of the arc of contact and advances the succeeding wing B1308 into the arc of contact, so that a B spacer is selected and inserted in the third space of the line by the third forward stroke of the selecting-fingers. Thus the correction is made to balance the deficiency at each third stroke in such a case, and upon the return movement of each third stroke of the selecting-slide the detent is carried to its releasing position with relation to the switch-pawl 1411, so that the selector is returned to its initial setting position of Fig. 16ᵈ, from which the selector is again advanced as before, returning at each third stroke to its initial setting position.

The initial position to which the selector is set for a correction of three units is shown in Fig. 17, in which the selector-wing A1308 is set to the position 3 of Fig. 16ª, being thus within the arc of contact, so that an A spacer will be selected and inserted in the first space of the line by the first forward stroke of the selecting-fingers. The position of the guard-disk due to this initial setting is such that during the first return movement of the selecting-fingers the first correcting-pawl 1451 engages with the ratchet and advances it three teeth to the position shown in Fig. 18b, thereby advancing the wing A1308 to the position 6 out of the arc of contact and bringing the wing B1308 into the arc of contact, so that in the second forward movement of the selecting-fingers a B spacer will be inserted. The correction thus balancing the accumulated deficiency, the selector is returned to its initial setting for another A spacer. Thus the selection alternates between the A and B spacers throughout the line.

The initial position to which the selector is set for a correction of four units is shown in Fig. 17a, the selector-wing A1308 being in the arc of contact in the position 4 of Fig. 16a, so that an A spacer will be inserted in the first space of the line by the first forward movement of the selecting-fingers. The position of the guard-disk 1416 due to this initial setting is such that the first correcting-pawl 1451 will advance the ratchet two teeth, thereby moving the selector-wing A1308 to the position 6 out of the contact arc and bringing the wing B into that arc, where it remains during the succeeding two strokes of the word mechanism, advancing two notches at a time through that arc by the succeeding strokes until upon its return from the third stroke, which advances the selector-detent 1433 to its releasing position, so that the selector stands again in its initial position 4 and selects an A spacer for the fourth space of the line. Therefore the accumulated deficiency is balanced by the correction at every third operation of the word mechanism. For example, in the present illustration it is assumed that the space measurement is twenty-eight units. Three of these spaces amount to eighty-four units, which are supplied by the insertion of an A or twenty-four-unit spacer in the first space and a B or thirty-unit spacer in the second and third spaces.

The initial position to which the selector is set for a correction of five units is shown in Fig. 17b, the wing A being in the position 5 of Fig. 16a, and consequently within the arc of contact. In this case the initial setting of the guard-disk 1416 is such that the ratchet-wheel 1430 is exposed to the action of the first correcting-pawl 1451 at the last quarter of its movement, which thereby advances the ratchet and the selector a single notch at each stroke, so that an A spacer is selected and inserted in the first space of the line, after which the wing B is moved into its arc of contact and remains therein during the succeeding five strokes of the word mechanism, being advanced through that arc one notch at a time, as already stated, until upon its return from the sixth stroke the selector-detent is advanced to its releasing position of Fig. 18e and returns to its initial position of Fig. 17b in time for the seventh operative stroke of the word mechanism. In this case the first six spaces of twenty-nine units each aggregate one hundred and seventy-four units, which is supplied by one A or twenty-four-unit spacer and five B or thirty-unit spacers, equaling one hundred and seventy-four units.

Figure 15A:
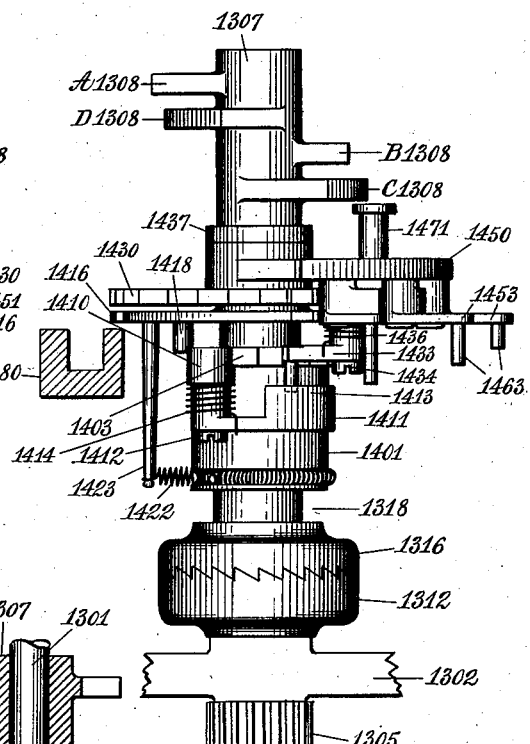
Figure 15B:
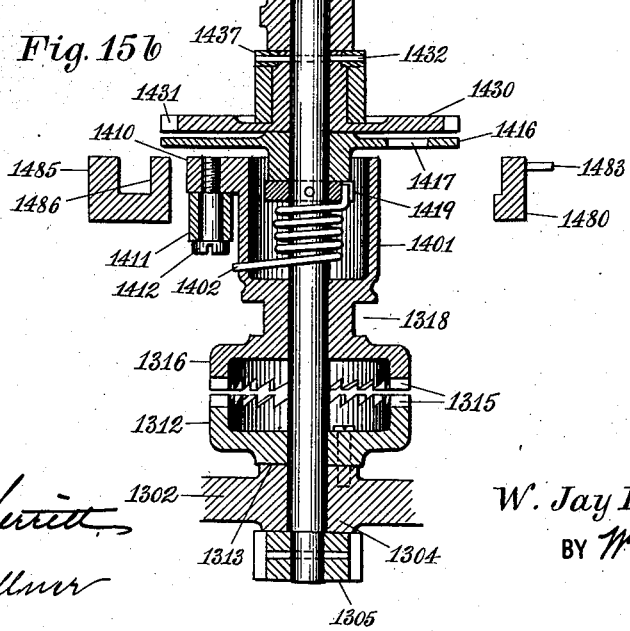

It must frequently happen that the completion of a line of type will not be coincident with the completion of a correction therein, so that the selector-detent 1433 will be left in engagement with one of the teeth of the ratchet-sector 1403. Therefore the detent must be released at the completion of each line, so as to permit the detent and the selector in such cases to return to its initial position with relation to the clutch-barrel in readiness for the new setting upon the succeeding line. This is accomplished by the vertical unlocking movement of the clutch-barrel 1401 from the position of Fig. 15a to Fig. 15, which vertical movement carries the ratchet-sector 1403 above the detent 1433, as shown in Fig. 15, thereby disengaging them and allowing the detent with its sector to return to its resting position with the end of the detent against the lug 1410, as shown in Fig. 16b.

For greater convenience of comparison between the different settings of the selector for the different corrections required the foregoing examples all relate to the position of the selector-wing A1308. It will be understood, however, that the other wings are similarly set in varying relations to the arc of contact under similar conditions or requirements as to the spacers or spacer combinations which they respectively represent. In other words, whenever the measurement of a line exactly calls for a B spacer, either with or without the addition of one or more basic spacers, the selector-wing B1308 will be initially set to the position 0 of Fig. 16a and remain in that position throughout the justification of that line. If the measurement is one, two, three, four, or five units greater than the spacer B, either alone or in combination with one or more of the basic spacers, then the selector-wing B1308 will be initially set to the position 1, 2, 3, 4, or 5, respectively, thereby bringing the correcting mechanism into operation to satisfy the deficiency thus indicated by the initial position of the wing. The selector-wings C and D1308 are similarly set and operated whenever the measurement calls for the use of the C or D spacer, either with or without the addition of one or more basic spacers and with or without correction.

By reference in Fig. 32 to the table showing the progressive order of the increasing size of the spacers or spacer combinations it will be seen that the beginning of each repetition of the cyclic order of the four spacers is attended by the substitution of two basic spacers for the fractional D spacer employed in the preceding smaller combination, this being obviously in accordance with the progressing sizes of the system, two basics being forty-eight units, or six units greater than the D or forty-two-unit spacer. In applying this system mechanically this substitution of the two basic spacers for the fractional B is accomplished by the coöperation of the rotating selector and the stepped surfaces 1210 1213 of the sector 1201. That sector is geared to the selector 1307 in such a relation that in the rotation of the sector the selector-wing A1308 is brought into the arc of contact coincidently with the passing of the roll 1631 from a higher to a lower step, Figs. 27 and 32, so that one of the added basics is obtained by the direct operation of the arm 1630 and pin 1625 upon the link 1621, due to the roll 1631 passing to a lower step of the cam-sector, and the other added basic is obtained by the operation of the selector-wing A1308 operating, as shown in Fig. 27, to move the link 1621 to the position of Fig. 32$^a$. Thus at the beginning of each repetition of the cyclic order the basic cam-link 1621 is doubly operated upon by the selector-wings and the cam-arm 1630, so as to move the basic selecting-pawl 1703 far enough to engage with two additional basic plungers.

*Separator and spacer-circulating mechanism.*—The temporary separators 20 and 22 after being discarded from the line in the justifying operation by dropping them through the slot 313 into the chute 26 slide through that chute into the hopper 27, which guides the separators into register with the pocket 28 of the conveyer 29 just in front of the rolls 30, which press the separators into the pocket to the position shown in Fig. 1. The conveyer 29 is preferably a flexible endless belt driven by the grooved pulley 31, mounted on the shaft 32, which is journaled in the swinging bracket 33, pivotally mounted at 34 to brackets attached to the under side of the bed-plate 1, the swinging movement of the bracket enabling the conveyer to be kept at a suitable driving tension by means of a spring or weight or be clamped by means of the bolt 35 in the slotted arm of the bracket 36, which bracket also serves to support the hopper 27 and the studs on which the presser-rolls 30 are mounted. The rearward end of the shaft 32 is provided with a pulley 37, which receives a belt 38, which is driven by the grooved pulley 152 on the word-shaft sleeve 150 or from any other convenient rotating member of the machine, the belt passing over the idler-pulley 39.

The conveyer 29 passes around the idle pulleys 40 and 41 and around the idler-pulley 42, which is mounted above the storage-channels 44 and 45 for the line and word separators, respectively, Figs. 30 and 30$^b$. Where, as herein shown, the pocket 28 of the conveyer is a continuous longitudinal groove extending along the conveyer, one or more of the pulleys over which the conveyer runs may be provided with a circumferential rib 46 like that shown upon the pulley 42 in Figs. 30 and 30$^b$, the function of the rib being to register with the pocket 28, and thereby assist in guiding the conveyer in its desired path. A distributing-channel 48 is located in the side of the casing 49 above the separator-channels 44 and 45, that channel being in the plane of the pocket 28 of the conveyer. The channel 48 is slightly wider than the bodies of the separators and is of substantially the outline shown in Fig. 30$^b$ by the line 50. The front wall of the channel is formed by the plate 51, which is preferably made of glass and is partly broken away in Fig. 30$^b$, so as to enable the parts lying behind it to be shown in full lines. The conveyer 29 passes up along one edge of the channel 48 between the rollers 52 and 53, which are set at an angle, as shown in Fig. 30$^b$, so as to deflect the upper end of each separator into the channel as it passes between the rolls to facilitate the ejection of the separators from the pocket and to incline the separator toward its required position. The ejection of the separator from the pocket is made more certain by the employment of a tongue 54, which projects into the pocket, forming a continuation on that side of the edge wall 50 of the channel. In entering the channel 48 the separator passes over the roll 53, the rotation of which facilitates this movement of the separator, so that the latter is carried to the position occupied by the horizontal separator in Fig. 30$^b$, resting upon the shoulder 55. The roll 53 is disposed as shown in Fig. 30, so that the rearward or following extensions 23 of the separators lie behind the roll, while the forwardly-projecting extensions of the separators enter the slot 56, which is deep enough to receive the longest extension 21 of the line-separators. The shoulder 55 is inclined rearwardly toward the channels 44 and 45, which converge at that shoulder, so that the separators after falling upon the inclined shoulder 55 roll into one or the other of these channels. The word-separators 22 roll directly into the channel 45; but the line-separators are prevented from rolling therein by the greater length of their extensions, those extensions being supported by the end walls of the mouth of the channels 45 as the line-separators cross that mouth, and thus pass into their appropriate channel 44. In order to maintain these separators at right angles with their respective channels, so as to prevent them from falling with one end foremost, the channels at their upper ends are of a stepped or zigzag outline, as shown in Fig.

30ª, the number of the steps being sufficient to insure the correct position of the separator for its final roll toward the lower end of the channel.

The separator-case 60, containing the channels 44 and 45, is supported in any convenient way upon the composing-machine in suitable operative relation to the composing mechanism. In the type of composing-machine herein shown I mount the separator-case 60 upon a plate 61, adjacent to the raceway 62 of the machine, over which the lower ends of the separator-channels 44 and 45 project. The separators are released one at a time, as required, by means of any suitable mechanism connected with the keyboard of the machine. As herein illustrated, Figs. 29 and 30ª, the columns of separators are supported in their respective channels by means of the ledges or shoulders 63, the lowermost separator of each channel lying in engaging relation to the ejectors 65, which are pivoted at 66 upon the separator-case. These ejectors are in the form of elbow-levers which are connected, by means of the wires 67, with their respective keys in the keyboard of the machine in such a way that when the keys are depressed the wires 67 are pulled far enough to move the lower ends of the ejectors to the left from their resting position (shown in Fig. 30ª) so as to carry the lowermost separator clear of the ledge 63, thereby permitting them to drop into the raceway 62, along which they are advanced by the type-driving device, which in this form of machine is the traveling bottom 68 of the raceway. When the keys are released after thus ejecting a separator, the ejectors 65 are drawn back to their resting position of Fig. 30ª by means of springs 69 appurtenant to the separator-case. The raceway 62 conducts the type and the separators in proper order to the commencement of the typeway 200, into which they are carried and pushed forward in any convenient way, as by the rotating packer 70, Fig. 29.

The spacer-circulating mechanism is best shown in Figs. 24, 24ª and 29 to 29ᶜ. Fig. 29 represents a rear elevation of a well-known type of composing-machine in which the distributing-cylinder 2220 is mounted to rotate intermittently above a stationary composing-cylinder 2221, these cylinders being provided with similar series of vertical channels which coincide during the intermissions in the rotation of the upper or distributing cylinder. The upper ends of the channels of the lower or composing cylinder are provided with selecting-wards arranged in differing combinations, which permit only those type to drop through which have arrived at their appropriate channel of the composing-cylinder. In order to adapt this type of machine to the circulation of the justifying-spacers, four of the channels of the composing-cylinder are provided with selecting-wards 2223, arranged in accordance with the nicks 2224 of their respective spacers, and each of those channels is provided with chute-blocks 2225, which are inserted in the channels below the selecting-wards, as shown in Figs. 29, 29ᶜ, and 29ᵇ. These blocks are provided with an inclined surface 2226, upon which the spacers fall after passing the selecting-wards and slide down through the adjacent chutes 2227 to the left-hand end of the spacer-channels 2110, into which they are pushed by any convenient means, similar, for example, to the packer 70, for advancing the composed line of type along the typeway, these packers being geared together as indicated in Fig. 29ª and driven by means of a belt 2229 from any convenient rotating shaft of the machine. In this particular embodiment of my invention it is desirable to turn the spacers quarter-way around in delivering them from the distributing-channels to the chutes 2227. To this end a shoulder 2230 is provided at one side of the chute-block 2225, according to the direction in which it is desired to turn the spacers. The opposite edge of the spacer being unsupported falls first, and thus the spacer is turned one-fourth way, as illustrated in Figs. 29ᵇ and 29ᶜ.

The four spacers herein employed being thus distributed from the dead matter in the ordinary course of distribution and conveyed to their respective channels 2110 are pushed along toward the right or discharging ends of those channels, as above described. On account of the necessity for keeping the right-hand or discharging end of these channels constantly supplied with the separators and because of more or less variation and intermission in the supply from the distributing-channels means are provided for maintaining a constant supply. The mechanism for this purpose is best shown in Figs. 24 and 24ª, the former of which represents a front elevation of the respective mechanisms of the four channels, while the latter is a plan view, in enlarged scale, of one of those mechanisms operating upon the channel for the A or basic spacers. Since all four of these mechanisms are alike in their operation, a description of this mechanism for the A spacer-channel will suffice for all.

The follower-slide 2250 is fitted to slide upon suitable guiding-ways 2251 and upon the guide-rod 2254. A pawl 2252 is pivotally mounted upon the follower-slide and projects into the spacer-channel 2110 of the space-case 2109. The follower is yieldingly drawn to the right, as viewed in Fig. 24ª, so as to advance the spacers along the typeway against the end of the channel by means of a weight, (not shown,) which is attached to the follower-slide by means of a cord 2255 passing around the idler-pulleys 2257. The returning-slide 2285 is fitted to slide upon the guide-rod 2254 and is connected by means of a link 2286 with a lever 2280, pivotally supported at 2281, which pivotally supports all four levers for the four channels. These levers are also connected, by means of a pitman 2283, with a crank-pin 2288 on the crank 2274, which turns upon the stud 2261, adjacent to the toothed clutch-wheel 2262, which also turns upon that stud and is fixed to a gear 2260, the gears for the four spacer-channels intermeshing, as shown in Fig. 24, being driven by means of a gear 2291 on the shaft 2292, which is journaled in suitable brackets 2290 and is provided with a pulley 2293 for receiving a belt 2294, driven by the pulley 2295, carried by the shaft 160 or the sleeve 140, according as it may be found desirable to drive the space-replenishing mechanism intermittently or constantly.

The cranks 2274 rest in their forward position (shown in Fig. 24) during the intervals in their operation, thereby holding their return-slides 2285 at the forward or right-hand limit of their movement. Each of these cranks is provided with a clutch-pawl 2270, which is pivotally mounted at 2271 upon the rearward side of the crank 2274 in the plane of the clutch-wheel 2262. These pawls are elbow-shaped, having hooked ends for engaging with the teeth 2263 of their respective clutch-wheels, the pawls being carried into engaging relation with those teeth by means of the springs 2272 when the pawl is released. The hooked ends of the elbow-pawls 2270 stand in opposite directions upon the adjacent cranks to suit the direction of rotation of their respective clutch-wheels. During the intervals in the operation of these follower-returning devices the pawls 2270 are held out of engagement with their respective clutch-wheels by means of triggers 2275, which are pivotally mounted at 2277 upon the brackets 2276.

One end of the trigger extends into the plane of rotation of the clutch-pawl 2270, while the opposite inclined or cam-shaped end 2278 projects into the path of movement of the follower-slide 2250, so that the latter when drawn forward by its weight into contact with its end of the trigger operates to withdraw the opposite end of the trigger from the clutch-pawl 2270, thereby enabling the latter to engage with its clutch 2262 and be carried by the latter through a complete revolution, at the completion of which the outer end of the clutch-pawl collides with the trigger and is withdrawn from the clutch-wheel. This single rotation of the crank 2274 operates through its connected lever 2280 and the returning-slide 2285 to push the follower-slide backwardly along the guide-rod 2254, where the pawl 2252 engages behind a new supply of the spacers and carries them forward toward the delivery end of the channel, and thus maintains a constant supply of spacers at that end. The operations of this mechanism are timed so as to push back the follower-slide 2250 during the intervals between the operations of the spacer selecting and ejecting mechanism, so as to be certain not to have the forward pressure of the follower-slides 2250 removed while the spacers are being ejected from the discharging end of the spacer-channels. For this reason it is preferable to have the driving-pulley 2295 fixed upon the line-shaft 160, since the latter operates only during the intermissions in the operation of the spacer-selecting mechanism.

Having thus described in detail the construction and mode of operation of the respective mechanisms, a more general description will now be given of the operations of the machine as a whole, as nearly as possible in the consecutive order of operation of the respective mechanisms.

A continuous line is composed in the typeway 200, the character-type and the word and line separators being played into the rearward end of the typeway through the raceway 62, Fig. 29, and pushed forward through the typeway by the packer 70. The word-separators 22 pass by the trigger 606 without operating it; but the longer projecting ends of the line-separator 20 behind the foremost line collide with that trigger and turn it from the position of Fig. 7 to that of Fig. 6, thereby releasing the detent 602 of the first starting-lever 612 of the line mechanism. The second starting-lever 639 of that mechanism is released either before or after the release of the first lever upon the completion of the justification of the preceding line by the trigger-pin 255 of the word-grab tripping the detent 622, the starting of the line mechanism being thus subject to the dual control of devices at the two ends of the typeway, thereby insuring, first, the approximate completion of the preceding line, so as to leave the measuring zone clear for the succeeding line, and, second, the presence of that complete succeeding line in the line-forming zone, the fulfilment of these two conditions being indicated by the withdrawal of the respective starting-levers 612 and 639 from the clutch-pawl 650. That pawl is thereby allowed to engage with the continuously-rotating clutch-wheel 142 of the line-shaft 160, which turns the line-driving mechanism one complete rotation. The first portion of the rotation operates through the slotted lever 238 to carry the line-grab 230 forward from the position of Fig. 6, the pawls 231 engaging with the line-separator and carrying it with its preceding word-type into the line-measuring zone of the typeway in front of the measuring-pawl 706. At the forward position of the line-grab it is coupled to the word-grab by means of the latch 281 and upon its return movement carries the word-grab back with it to the position shown in Fig. 7, at which position it is detached, as shown by comparison of Figs. 7 and 7ª, where it rests until the completion of the measuring operation, which takes place as soon as the new line is moved to the measuring-zone.

The first portion of the rotation of the line-shaft also operates through the cam 1062, the lever 1057, and the link 1325, Fig. 8, to unlock the selector mechanism from the stationary clutch 1312 and then through the medium of the sector-slide 1050 to return the sector 1201 and its associated selecting mechanism from the position at which they were set for the preceding line to their resting position. (Shown in Fig. 32.) This first portion of the rotation of the line-shaft also operates to unlock the registering-slide 1001 and through the cam 1012 and the lever 1008 to move that slide back to its resting position, thereby carrying the dividing-bar clear of the stop-cylinder 901 to permit the latter to be set to its new position.

As the new line is carried forward into the measuring-zone it operates to set the stop-jaw 801 and the stop-cylinder of the measuring mechanism to the position appropriate for the number of spaces in the line by means of the projecting ends of the separators, as shown in Figs. 10 to 10ᵇ. Assuming for the present illustration that the line now under consideration contains eleven words and ten spaces, these ten spaces are occupied by ten word-separators 22, the projecting ends of which operate upon the escapement device and allow the stop-cylinder to be turned by the frictional driving devices appurtenant to the clutch-lever 416, Fig. 1, operating through the rack 932. The stop-cylinder is thus advanced one step for each of the eleven separators in the line, including the line-separator, the effect of the latter being eliminated from the result by the circumstance that the stop-cylinder and the stop-jaw both rest at a position which is one step behind the theoretical starting position for those parts. The stop-jaw rack 812 being geared with the cylinder is moved forward therewith, so that when the line has passed into the measuring zone it has set the stop-jaw 801 to the position shown in Fig. 7ª and has turned the stop-cylinder to the position shown in Figs. 25 and 25ª, bringing the tenth stop-pin 911 into operative relation to the dividing-bar. This advancing of the line and the setting of these parts takes place at the first part of rotation of the line-shaft, following which the measuring-cam 721 allows the measuring-slides to move forward under the operation of the weight 733, which latter carries the measuring-pawl 796 forward against the back of the line-separator, thus carrying the line against the stop-jaw, the latter having first been carried across the typeway into engagement with its appropriate tooth of the rack 804 by the withdrawal of the second measuring-slide 730 from the beveled shoulder 822 of the bar 820. The line is then further compacted by the action of the locking-pawl 755 and the wedge 757, which also operate to lock the second measuring-slide 730 to place in its line-compacting position, so as to afford a firm base or pivot for the subsequent action of the dividing-bar, which is suspended therefrom. That dividing-bar is then let back from its forward resting position by the operation of the spring 1004 against the retreating movement of the cam 1012 and its cam-lever 1008 until the dividing-bar rests against the stop-pin 911, which determines the position of the lower end of the bar and its attached registering-slide 1001, which is clamped in that position to the stationary clamp member 1101 by the action of the clamping-cam 1117, Fig. 9. The movement of this registering-slide from its theoretical starting-point is in multiplied relation to the size of spacer required for each of the spaces in the line.

Having thus measured the line shortage and divided it into the number of spaces in the line and registered the proportional shortage of a single space by the position of the registering-slide 1001, the cam 1062 on the line-shaft operates through the lever 1057 to unclutch the selector devices from the stationary clutch 1312 and to let back the rack-slide 1050 and its connected sector 1201 and selector 1307 to the position determined by the registering-slide, the parts being moved by the torsional spring 1065 at the top of the selector-shaft 1301 until their movement is stopped by the contact of the contact-screw 1055 with the stop 1014 of the registering-slide, Figs. 6ª and 8, in which position the selector parts are locked again to the stationary clutch 1312. Assuming, for example, that the ten-space line now under consideration has a total shortage of five hundred and forty-six units, or fifty-four units for each of the ten spaces, requiring the combination of an A and a B spacer, the mechanism would be set as shown in Figs. 28 and 28ª, the sector 1201 being let back far enough to bring the portion A+B, Fig. 32, into engagement with the roll 1631 of the cam-lever 1630, so that the basic selecting-pawl 1703 will engage only with the first basic ejector 1831, thus producing the single basic or A spacer required for the combination. The B spacer thereof is produced by the setting of the selector, the wing B1308 of which is set to the position 0 of Fig. 16ª, so as to deflect the selector-finger B1505, and thus operate the selector-arm B1804 at each forward movement, as shown in Fig. 28.

Having thus set the spacer-selecting mechanisms in accordance with the divided line measurement, the line-shaft completes its rotation and stops, coincidently starting the word mechanism by its connection through the arm 639 and the link 636 with the word-shaft-starting lever 634, withdrawing the latter from beneath the clutch-pawl 645, so that the latter engages with its coöperating clutch-wheel 153 of the word-shaft 165. This movement of the lever 634 operates through the link 632 and the arms 630 and 627 to push the second starting-slide 620 forward to its latching position, with the trigger-arm 625 projecting across the typeway. At the same time the trigger-arm 605 of the first starting-lever 612 is pushed into engagement with the trigger 606 by the operation of the cam-surface 617. Thus the completion of the rotation of the line-shaft coincidently resets both starting-levers and starts the word mechanism in operation. It also operates through the cam 721 and the levers 717 and 710 to move back the measuring-pawl to its resting position of Fig. 7ª, while the right-hand end of the second measuring-slide 730 abuts against the beveled shoulder 822, and thus withdraws the stop-jaw from the typeway, as also shown in Fig. 7ª.

Upon the starting of the word mechanism the first downward stroke of the lever 1716 operates through the stud 936, the cranked arm 934, and the rack 932 to turn back the stop-cylinder 901 to its initial resting position, the cylinder having been released from its detent 925 by the previous backward movement of the line-grab 230, Fig. 6ª. The starting of the word mechanism operates through the drum 260 to allow the weight 256 to take effect upon the word-grab 250, thus moving the line forward from the measuring zone and carrying its foremost word into the zone of the word-slide 300, the foremost word-separator stopping against the stops 304 of that slide, so that upon the first forward movement of the slide the ends of the separators are caught by the cams 314 and separated from the succeeding word, the continued movement of the word-slide carrying the word-type into the galley behind the shoulder 220 and releasing the word-separator through the port 313, Figs. 22, 22ᶠ. Coincidently with this and each movement of the word-slide the selecting-slide 1501 operates through the selecting-finger B1505 to eject a B spacer into the fractional raceway 1823 and the ejecting-lever 1716 operates through the plunger 2001 to push that spacer through the fractional portal 316 up into the typeway, the same upward movement of the lever operating through the selecting-pawl 1703 to carry up the first basic ejector of that pawl, as shown in Fig. 28, so that the required combination, consisting of a single basic and a single B spacer, are carried upward together into the typeway through the portals 315 and 316, respectively, while the word-slide is in the position shown in Fig. 22ᵉ. The word-slide is then pushed forward slightly to the position of Fig. 22ᵈ, so as to carry the portals 315 and 316 slightly out of coincidence with the spacer-raceways, thus supporting the spacers that have been ejected therefrom into the typeway. The word-slide then makes its second forward movement, thereby advancing the second word and its separator along the typeway and carrying the first combination of injected spacers forward into the galley. These movements are repeated once for each word in the line until the last word-separator has thus been carried forward and the spacer combination substituted, whereupon the trigger-pin 255 of the word-slide trips the detent 622, allowing the spring 637 to move the clutch mechanism to the position shown in Fig. 5, thereby turning the stop-shaft 629 and its cam 661 to the position of Fig. 14, so as to interrupt the operation of the spacer-selecting mechanism, the latter having completed its work for that line; but in order to enable the word-slide to move the last word forward into the galley the parts are so timed that the trigger-pin 255 does not operate upon the detent 622 until the word-shaft has started upon its final rotation, which thus completes the line. This stopping of the word mechanism upon the completion of the justification of a line operates to withdraw the second starting-lever 639 again from beneath the clutch-pawl 650, thus indicating that the measuring zone is clear for the succeeding line, the line-separator of which in passing into the line-forming zone of the typeway again trips the trigger 606, and thus allows the first starting-lever 612 to be withdrawn from the clutch-pawl, thereby starting the line mechanism in operation upon that succeeding line. This operation of the line mechanism is also utilized to operate the galley mechanism upon the preceding line, the justification of which has just been described. As the slotted lever 238 is swung forward by the crank 234 to carry the succeeding line into the measuring zone the extension 416 of that lever operates, through the link 412, to draw the cam-arm 407 rearwardly, thus operating, through the cam 408, to move the galley-plunger 400 forward from its position of Fig. 23, thereby raising the rule 420 lying between the line last justified and those which precede it and moving that line backwardly against the forming-column, also advancing that column to make room for a new line, after which the rule 420 drops in front of the column, leaving a clear space in line with the typeway for receiving the succeeding line.

If the matter is to be single-leaded, the link 412 is coupled to the stud 464 and moves the leading-cam 455 though one-half of its stroke, as represented in Fig. 31ª, thereby moving the galley-plunger 450 up and down once for each stroke of the galley-plunger 400, that stroke taking place during the rearward movement of the galley-plunger, so as to carry the lead up beneath the rule 420 into the space shown beneath that rule in Fig. 23.

Where the matter is to be double-leaded, the link 412 is coupled to the upper stud 465 of the cam-arm 407, thus swinging the leading-cam 455 to the full extent of its stroke, as represented in Fig. 31$^b$, bringing both lobes of its cam-groove into action and raising and lowering the leading-plunger 450 twice at each actuation of the galley-plunger. That first stroke takes place as just described for single-leading, while the second stroke takes place after the galley-plunger has moved the last line and the column backward, the plunger being meanwhile let forward by the operation of its cam 408 to provide a space for the added lead, as shown in Fig. 23$^a$, after which the plunger again moves back and carries that lead and the column another step backward, so as to allow the rule 420 to drop down in front of the lead.

The respective mechanisms herein shown may be adapted for use as separate mechanisms independently of each other or in combination with other devices for performing the associated functions of a type-justifying machine, and the various parts may be modified as to position, direction, and extent of movement and means of connection or articulation with associated devices. The terms "up," "down," "right," "forward," "backward," &c., are herein employed in their relative sense merely for convenience of explanation, and these positions and directions of movement may be transposed or modified in many ways to conform to the general plan or environment with which they may be employed or associated. Various well-known mechanical equivalents may obviously be substituted for many of the devices herein shown and described. Many of the features of this invention may be used in machines in which the final justifying-spacers are provided otherwise than by the use of ready-made spacers, other methods of providing such spacers in justifying-machines being by casting such spacers in accordance with the measurement and division of the line shortage or cutting spacers of the required thickness from suitable space timber. Some of the features claimed also are applicable in other classes of machines than justifying-machines, and such use in other machines is within the invention.

The terms "space," "separator," "spacer," are herein used advisedly in order to avoid the confusion of terms and of ideas which is liable to occur under the present common and indiscriminate use of the term "space." As herein used the word "space" refers to the actual space occurring between adjacent words regardless of the object which occupies the space or whether it is occupied at all. The term "separator" is herein applied to the pieces 20 and 22, which in the composition of the continuous line are placed between the words and the lines, respectively, in order to temporarily maintain a separation between them, and the term "spacer" is applied to the final type-body, which is inserted to fill each of the spaces of a line.

The spacers herein shown are of the usual type-space form, excepting that they are made as to setwise thickness in conformity with the unit system herein described. These spacers are, like the character-type with which they are employed, provided with distinctive combinations of nicks, so that each size will be distributed into its proper channel in the type-distributing machine. On account of the fact that the character-type and the spacer-type possess the same general characteristics and the fact that many of the devices herein shown and described are adapted to handle either character-type-or spacer-type, both of them are to be understood as being included in the generic term "type" as herein employed.

While the machine shown as embodying the invention is adapted for handling ordinary type, and I have aimed especially at the production of a machine capable of justifying such type at high speed with accuracy and a minimum of wear on the type, it will be understood that the invention is not limited to machines for justifying such ordinary type, but may be applied also in justifying type, matrices, or the like of any suitable material, and the word "type" is used in this specification and the claims in this broad sense. Certain broad features of the invention also are applicable not only in machines for justifying composed lines of type or matrices, but in line-justifying mechanism of other classes.

I claim as my invention—

1. In a justifying-machine, the combination of word and line mechanisms, devices for stopping one of said mechanisms when the other is started, and devices controlled by each line for starting the line mechanism in operation upon the succeeding line.

2. In a justifying-machine, the combination of word and line mechanisms, devices for stopping one of said mechanisms when the other is started, and devices controlled by each line and brought into action at a predetermined point in the justification of the line to start the line mechanism in operation upon the succeeding line.

3. In a justifying-machine, the combination of word and line mechanisms, interlocking clutch devices for stopping one of said mechanisms when the other is started, and devices controlled by each line during its justification, for starting the line mechanism in operation upon the succeeding line.

4. In a justifying-machine, the combination of word and line mechanisms, interlocking clutch devices for stopping one of said mechanisms when the other is started, and devices controlled by each line at a predetermined point in its justification for starting the line mechanism in operation upon the succeeding line.

5. In a justifying-machine, the combination of word and line mechanisms, interlocking clutch devices for stopping either of said mechanisms when the other is started, and means operable by each line upon the approximate completion of its justification, to start the line mechanism in operation upon the succeeding line.

6. In a type-justifying machine, the combination with word and line mechanisms, of devices for coincidently stopping one mechanism and starting the other, provided with a trigger extending into the pathway of the type, to be operated by each line at the approximate completion of its justification.

7. In a type-justifying machine, the combination of word and line mechanisms, devices for coincidently stopping one and starting the other of said mechanisms, provided with a trigger adjacent to the typeway for holding the line mechanism in operation, and means for releasing the trigger to stop the word mechanism and restart the line mechanism at the approximate completion of the justification of each line.

8. In a justifying-machine, the combination of word and line mechanisms, clutch devices for coincidently starting either one and stopping the other of said mechanisms, means for maintaining the clutch devices in position for driving the word mechanism, and means for reversing the clutch devices at a predetermined point in the justification of each line.

9. In a justifying-machine, in combination with the line mechanism thereof, a dual controlling device therefor, operable by the conjoint action of different lines.

10. In a justifying-machine, in combination with the line mechanism thereof, a dual controlling device therefor, operable by the conjoint action of succeeding lines.

11. In a type-justifying machine, in combination with the line mechanism thereof, a dual controlling device therefor, operable by the conjoint action of different lines of type, at predetermined periods in their progress through the machine.

12. In a type-justifying machine, in combination with the line mechanism thereof, a clutch device, and a dual controlling device therefor, operable by the conjoint action of different lines of type at predetermined periods in their progress through the machine.

13. In a type-justifying machine, in combination with the line mechanism thereof, a clutch device, and a dual controlling device therefor, operable by the conjoint action of one line at the approximate completion of its justification, and of the succeeding line when it is ready to be operated upon.

14. In a type-justifying machine, in combination with the line mechanism thereof, a dual controlling device therefor, comprising tripping devices, one of which is operable at the approximate completion of a justified line, the other tripping device being operable by the succeeding line at a predetermined point in its progress.

15. In a type-justifying machine, in combination with the line mechanism thereof, a typeway, means for advancing the type along the typeway, a device for driving the type-advancing mechanism, and a dual controlling device therefor operable by two succeeding lines of type at predetermined periods in their progress along the typeway.

16. In a type-justifying machine, a typeway, means for advancing the lines of type therein, a device for driving the type-advancing mechanism, and a dual controlling device therefor, comprising two starting-triggers located at different portions of the typeway, and operable, one upon the approximate completion of the justification of a line, and the other by the passage of the succeeding line.

17. In a type-justifying machine, the combination of a clutch-pawl 650, starting-levers 612 and 639 and the detents 602 and 622.

18. In a type-justifying machine, the combination of the clutch-pawls 645 and 650, starting-levers 634 and 639 and the link 636.

19. In a type-justifying machine, the combination of the clutch-pawls 645 and 650, the starting-levers 634 and 639, the link 636 and the cam 643.

20. In combination with a typeway, a type-supporting bar at the side of the typeway, and at a slight inclination thereto.

21. In combination with a typeway, a yielding type-supporting bar at the side of the typeway, and at a slight inclination thereto, with means for resiliently pressing the bar against the type.

22. In combination with a typeway, a yielding type-supporting bar mounted upon parallel swinging arms at the side of the typeway and at a slight inclination thereto.

23. In combination with a typeway, a type-retaining presser-bar therefor mounted upon parallel swinging arms at the side of the typeway, and at a slight inclination thereto, with means for resiliently pressing the bar against the type.

24. The combination with a typeway, of two type-engaging grabs, mounted to reciprocate adjacent to the typeway, means for reciprocating one of the grabs and means for connecting and disconnecting the two grabs during a portion of their movement.

25. The combination with a typeway, of two type-engaging grabs mounted to reciprocate adjacent to the typeway, and to advance the type therein, means for reciprocating one of the grabs and means, as a latch, for connecting and disconnecting the two grabs at predetermined periods.

26. The combination with a typeway, of two type-engaging grabs mounted to reciprocate adjacent to the typeway, and to advance the type therein, means for reciprocating one of the grabs, and means, as a latch, carried by one of the grabs and engaging with the other grab to couple them during their backward movement.

27. The combination with a typeway, of two type-engaging grabs mounted to reciprocate adjacent to the typeway, and provided with pawls for advancing the type along the typeway, means for moving one of the grabs in both directions, and means, as a latch, carried by that grab and engaging with the type-pawl of the other grab to hold that pawl away from the type and to couple the two grabs together during their backward movement.

28. The combination with a typeway, of two grabs mounted to reciprocate adjacent to the typeway, and provided with pawls for advancing the type therein, means for moving the first grab forward and back, means for yieldingly moving the second grab forward, and a latch carried by the first grab and engaging with the pawl of the second grab at the end of their forward movements, to retract the said pawl from the line, and move it backwardly with the first grab.

29. The combination with a typeway, of two type-engaging grabs mounted to reciprocate adjacent to the typeway for advancing the type therein, means for reciprocating one of the grabs, a latch carried by said grab for engaging with the other grab to connect the two during a portion of their movement, and means for disengaging the latch at a predetermined position.

30. In a type-justifying machine, the combination with a typeway, of a word-grab for advancing a line of type intermittently while the spacer combinations are being inserted, means for yieldingly advancing the said grab, a line-grab for advancing the succeeding line of type along the typeway, means for operating said grab, and clutch mechanism actuated by the word-grab at the approximate completion of its movement, for inaugurating the succeeding operation of the line-grab.

31. In a machine for justifying lines of type composed with temporary separators, the combination of a typeway, a word-slide mounted to reciprocate transversely of the typeway, provided with means for engaging the foremost separator, and advancing it with its preceding word-type along the typeway, and for releasing the temporary separator from the typeway.

32. In a machine for justifying lines of type composed with temporary separators, a word-slide provided with means for engaging the foremost separator and advancing it with its preceding word-type along the typeway, and provided with a port for releasing the separator from the typeway at the approximate completion of the word-advancing movement.

33. In a machine for justifying lines of type, composed with temporary separators, having projecting ends, a typeway, a word-slide provided with members extending above and below the line of type in the pathway of the separator extensions, the members being provided with inclined cams for receiving the extensions of the foremost separator, and advancing it with its preceding word-type along the typeway, one of the members being provided with a port, which is brought into coincidence with the typeway for releasing the separator from the typeway.

34. In a machine for justifying lines of type composed with temporary separators having projecting ends, a typeway, a word-slide having a member extending below the typeway, in the path of the separator ends, and a slot in the said member terminating in a port for releasing the separator.

35. In a machine for justifying lines of type composed with temporary separators having projecting ends, a typeway, a word-slide having a member extending below the typeway in the path of the separator ends, an inclined cam-slot for receiving the end of the foremost separator to advance it along the typeway, and a port communicating with the cam-slot for releasing the separator.

36. In a machine for justifying lines of type composed with temporary separators, having ends projecting above and below the type, a typeway, a word-slide having members extending above and below the typeway in the path of the separator ends, provided with inclined cam-slots for receiving the ends of the foremost separator and advancing it along the typeway; and a port communicating with the cam-slot in the lower member, for releasing the separator at the approximate completion of its advancing movement.

37. In a machine for justifying lines of type composed with temporary separators having ends projecting beyond the type, a typeway, a word-slide mounted to move transversely to the typeway, having projecting members provided with inclined cam-slots extending above and below the line in the pathway of the projecting ends of the separators, for advancing the separators along the typeway, a cam-slot in the lower member terminating in a port, and a discharge-chute beneath the typeway, communicating with the port, for releasing the separator therefrom at the approximate completion of its advancing movement.

38. In a machine for justifying lines of type composed with temporary separators having ends projecting beyond the type, a typeway, a word-slide mounted to move transversely to the typeway, and having members projecting above and below the typeway into the pathway of the projecting ends of the separators, and serving as stops therefor at one position of the word-slide, the said members being provided with cam-paths opening through their side walls toward the foremost separator, to receive that separator and advance it along the typeway, and a gate attached to the word-slide for stopping the succeeding word-type to hold it back during the operation of the word-slide.

39. In a type-justifying machine, in combination with a typeway, and a spacer-channel, a word-slide provided with a portal for direct communication between the spacer-channel and the typeway.

40. In a type-justifying machine, the combination of a spacer-channel, a movable word-slide located between the word-slide and the channel, and provided with a portal which registers with the spacer-channel and the typeway at one position of the word-slide.

41. In a type-justifying machine, the combination of a typeway, a spacer-channel located in a plane coincident with that of the typeway; and a movable word-slide located between the channel and the typeway and provided with a portal for opening direct communication from the spacer-channel to the typeway at one position of the word-slide.

42. In a type-justifying machine, the combination of a typeway, spacer-channels located in the plane of the typeway, and a word-slide located between the typeway and the spacer-channels, and provided with portals, which communicate between the channels and the typeway at one position of the word-slide, to allow the passage of spacers directly from the channels into the typeway.

43. In a type-justifying machine, in combination with a typeway, a word-slide for separating the words and advancing them along the typeway, portals located in the word-slide to coincide with spacer-injecting channels beneath the typeway, when the slide is drawn back, portions of the front wall of the typeway being extended across the slide to retain the injected spacers in line with the typeway when the word-slide is pushed forward.

44. In a type-justifying machine, the combination of a galley, a typeway leading into the galley, a word-slide movable transversely to the typeway at the side of the galley, and provided with means for separating the words of a type-line and advancing them into the galley, a spacer-channel located adjacent to the typeway, and a portal in the word-slide coinciding with the spacer-channel at one position of the slide, means for injecting spacers through the portal into the typeway, and means for moving the word-slide portal slightly out of coincidence with the channel to support the injected spacers.

45. In a type-justifying machine, the combination of a typeway, a word-slide movable transversely to the typeway, provided with means for separating the words, and provided with a portal for connecting the typeway with the spacer-channel.

46. In a type-justifying machine, the combination of a typeway, a spacer-channel adjacent thereto, a word-slide movable transversely to the typeway, provided with means for separating the words, and provided with a portal connecting the spacer-channel with the typeway at one position of the slide, means for moving the word-slide, and means for injecting spacers from the channel through the portal into the typeway.

47. The combination of the word-slide 300, the cam-groove 308, and the port 313.

48. The combination of the typeway 200, the word-slide 300, the inclined grooves 305 and 308 and the port 313.

49. The combination of the typeway 200, the word-slide 300, the spacer-channel $A^{2110}$, and the portal 315.

50. The combination of the word-slide 300, the raceway 1823, and the portal 316.

51. In a type-justifying machine, the combination of a typeway, a grab for advancing the type therein, devices for yieldingly moving the grab forwardly, and means for controlling the effect of the grab-moving devices to intermittently arrest the forward impulse.

52. In a type-justifying machine, the combination of a typeway, a grab for advancing the type therein, a device for yieldingly advancing the grab including a drum the rotation of which controls the speed of the grab and means for controlling the rotations of the drum to prevent the grab from exceeding a predetermined speed.

53. In a type-justifying machine, the combination of a typeway, a grab for advancing the type therein, yielding means having a flexible connection with the grab for moving it forward, a drum around which the flexible connection is wound, and means for controlling the rotations of the drum to prevent the grab from exceeding a predetermined rate of movement, and to intermittently arrest that movement.

54. In a type-justifying machine, the combination of a typeway, a word-slide, a grab for advancing a line of type along the typeway, a weight for moving the grab forward to advance the line against the word-slide, and means for sustaining the weight to relieve the word-slide of pressure during its forward movement.

55. In a type-justifying machine, the combination of a typeway, a grab for advancing the type therein, a weight attached by a flexible connection to the grab, a rotatable drum for the flexible connection, and means for controlling the rotations of the drum to vary the effect of the weight and prevent the grab from exceeding a predetermined speed.

56. In a type-justifying machine, the combination of a typeway, a grab for advancing the type therein, a weight and flexible connection attached to the grab, a word-slide movable transversely to the line, against which the type are pushed by the grab, a drum around which the flexible connection of the weight is wound, means for controlling the drum to advance the line at the proper intervals, and means for intermittently reversing the movement of the drum to sustain the weight and relieve the word-slide from the pull thereof, during its operation.

57. In a type-justifying machine, in combination with devices for measuring an unjustified line composed with temporary separators, a stop-jaw, constituting when set an abutment for one end of the line and movable longitudinally of the line to eliminate a predetermined position of the measurement of the spacers, a rack provided with teeth for locating and supporting the stop-jaw at its required longitudinal positions, and means operable by the separators for automatically setting the stop-jaw.

58. In a type-justifying machine, in combination with devices for measuring a line of type composed with temporary separators, a stop-jaw for one end of the line and movable longitudinally thereof, a rack provided with teeth for locating and supporting the jaw at the longitudinal position required for each line, and means controlled by the separators for automatically moving the jaw longitudinally in approximate relation to the required teeth.

59. In a type-justifying machine, in combination with devices for measuring lines of type composed with temporary separators, a stop-jaw located at one side of the typeway, a rack on the other side of the typeway provided with teeth for locating and supporting the stop-jaw at the longitudinal positions required for the respective lines, means for moving the stop-jaw longitudinally in accordance with the number of separators in the line, and means for moving the stop-jaw across the typeway into engagement with its appropriate supporting-tooth of the rack.

60. In a type-justifying machine, in combination with means for measuring a line of type composed with temporary separators, a stop-jaw located at one side of the typeway and movable longitudinally thereof, means operable by the separators to move the stop-jaw longitudinally in accordance with the number of those separators, a rack on the other side of the typeway provided with teeth spaced in accordance with the required elimination of each separator, means for projecting the stop-jaw across the typeway into engagement with its tooth of the rack before the measuring operation and for withdrawing it after the measuring operation.

61. In a type-justifying machine, in combination with devices for measuring a line composed with temporary separators, a stop-jaw for eliminating a predetermined portion of the measurement of the separators, a guide-block movable longitudinally of the typeway and having the stop-jaw mounted thereon to move transversely of the typeway, means for moving the guide-block longitudinally, and means for moving the stop-jaw transversely in the guide-block.

62. In a machine for measuring and justifying lines of type composed with temporary separators, means for eliminating a predetermined amount of the measurement of the separators comprising a stop-jaw for one end of the line, a guide-block for supporting the stop-jaw, and means operable with the separators in each line for moving the guide-block and its stop-jaw longitudinally of the typeway in accordance with the number of those separators.

63. In a machine for measuring and justifying lines of type composed with temporary separators, the combination of devices for varying the operations of the machine in accordance with the number of spaces in the line, and means for setting the said devices in accordance with the number of those spaces, comprising a yielding actuator and an escapement device controlled by the separators.

64. In a machine for measuring and justifying lines of type composed with temporary separators, the combination of adjustable devices for varying the operations of the machine in accordance with the number of spaces in the respective lines, and means for adjusting the said devices in accordance with the number of those spaces, comprising a yielding actuator, and an escapement, operable with the separators, for controlling the extent of adjustment.

65. In a machine for measuring and justifying lines of type composed with temporary separators, the combination of adjustable devices for varying the operations of the machine in accordance with the number of spaces in the respective lines, a yielding actuator for adjusting the devices, and an escapement, operable by the separators in the line, for controlling the adjusting movement in intermittent steps.

66. In a machine for measuring and justifying lines of type composed with temporary separators, means for eliminating a predetermined portion of the separator measurements, comprising a stop-jaw, a guide-block for moving the stop-jaw longitudinally of the line, means for yieldingly moving the guide-block and stop-jaw longitudinally, and an escapement device operable by the separators for controlling that longitudinal movement in accordance with the number of separators.

67. In a machine for measuring and justifying lines of type composed with temporary separators, a stop-jaw for one end of the line, constituting an eliminating device for the separator measurements, a guide-block in which the stop-jaw is mounted to move transversely to the line, means for moving the guide-block longitudinally in accordance with the number of separators in the line, a guide-bar engaging with the stop-jaw throughout its longitudinal movement, and means operable by the line mechanism for moving the stop-jaw across the front of the line before the measuring operation and for withdrawing it therefrom after the measuring operation.

68. In a machine for measuring and justifying lines of type composed with temporary separators, a stop-jaw for one end of the line, constituting an eliminating device for the separator measurements, a guide-block in which the stop-jaw is mounted to move transversely to the line, means for moving the guide-block longitudinally in accordance with the number of separators in the line, a guide-bar engaging with the stop-jaw throughout its longitudinal movement, a pair of swinging arms on which the guide-bar is mounted, and means operable with the measuring devices for swinging the guide-bar toward and from the line to operate the stop-jaw in suitable relation to the measuring operation.

69. In a type-justifying machine, devices for measuring an unjustified line, comprising a slide for engaging with and compacting the line, a second slide connected with the first by a multiplying device, and a dividing-bar pivotally attached to the second slide.

70. In a type-justifying machine, devices for measuring an unjustified line comprising two slides connected by gearing to move simultaneously, one of the slides being provided with a pawl for engaging with the line of type to be measured, and the other slide being connected with measurement-dividing means.

71. In a type-justifying machine, line-measuring devices comprising two slides mounted and movable longitudinally, and connected to move simultaneously, one of the said slides being provided with means for engaging with the line to be measured and the other slide being connected with measurement-dividing mechanism, and means for locking the slides in their line-engaging position.

72. In a type-justifying machine, the combination of measuring devices comprising two slides connected with multiplying-gearing for moving the slides simultaneously, and provided with line-engaging means, as a pawl, yielding means, as a weight, for effecting the measuring movement of the slides, and positive driving means for returning the slides to their backward or resting positions.

73. In a type-justifying machine, in combination with the movable member of a line-measuring device, locking devices therefor, including means for forcing the movable member against the line to compact it, and locking it in its line-compacting position, and means for engaging and disengaging the locking devices from the measuring member at suitable intervals in the measuring operation.

74. In a type-justifying machine, in combination with line-measuring devices thereof, a line compacting and locking device comprising a member for engaging with an end of the line, a pawl for engaging with the line-compacting device, a pawl-slide, a wedge for operating the pawl-slide, a cam, and means operable with the measuring mechanism for connecting the locking device with the measuring member and forcing it against the line.

75. In a type-justifying machine, a computing device for measuring an unjustified line and resolving the ascertained shortage into a multiplied representation of the proportionate shortage of each space in the line, comprising two racks connected by multiplying gearing and provided with means for engaging with the line to be measured, a dividing-bar pivotally attached to the second or increased movement slide, a registering slide connected with the other end of the dividing-bar for receiving the resultant or net movement, and a series of stops for engaging with the bar at intervals in its length in accordance with the required division of the shortage, means for moving the approximate stop in engaging relation to the bar, and means for moving the measuring-slide against the line, and for moving the bar against the stop.

76. In a type-justifying machine, in combination with the measuring and space-dividing mechanism, and the spacer-selecting mechanism thereof, a registering device for receiving the net result of the divided space measurement, a locking device for locking the registering device against movement, after adjustment, and means for adjusting the spacer-selecting device to the locked position of the registering device.

77. In a type-justifying machine, in combination with the measuring and space-dividing mechanism thereof, a registering member for receiving the net result of the divided space measurement, and a locking device therefor, comprising a stationary member, a cam, and intermediate mechanism for clamping the two members together at the desired positions.

78. In a type-justifying machine, in combination with the measuring and space-dividing mechanism thereof, a registering device for receiving the net result of the measuring and space-dividing movement, and a locking device therefor comprising a stationary member interleaved with the registering-slide, a cam, and intermediate mechanism for clamping the interleaved members together at the required locking positions of the registering-slide.

79. In a type-justifying machine, in combination with the measuring and space-dividing mechanism thereof, a registering device for receiving the net result of measurement and division, devices for locking the measuring mechanism against and compacting the line, and means for locking the registering device in its adjusted position.

80. In a type-justifying machine, the combination of a device for measuring composed lines of type, dividing mechanism for dividing the measurement into the number of spaces in the line, a registering device for receiving the net result of the measuring and dividing operations, and means for independently locking the measuring and registering devices in their respective positions, as determined for each line.

81. In a type-justifying machine, the combination of means for composing the line of type, dividing mechanism for dividing the shortage measurement into the number of spaces in the line, a registering device for receiving the net result of the measuring and dividing operations, means for moving the measuring and dividing devices to their respective positions determined by each line, and means for locking them in those positions.

82. In a type-justifying machine, the combination of devices for measuring composed lines of type to ascertain their shortage, a dividing mechanism for dividing the shortage into the appropriate word shortage, comprising a dividing-bar operably connected with the measuring devices, a series of stops arranged in dividing relation to the bar in accordance with the proper numbers of spaces in the line, a registering device for receiving the net result of the measuring and dividing operations, means for moving the appropriate stop to its bar-engaging position, means for operating the measuring devices and for moving the dividing-bar against its stop, and means for locking the measuring and registering devices in the respective positions determined by each line.

83. In a machine for measuring and justifying lines of type composed with temporary separators, a dividing mechanism for dividing the line shortage into word shortage, comprising a dividing-bar and a series of stops therefor arranged in dividing relation to the bar in accordance with the possible number of spaces in the lines, and means for setting the stops in engaging relation to the bar, including an escapement device operable by the temporary separators for controlling the setting movement of the stops in accordance with the number of separators.

84. In a machine for measuring and justifying lines of type composed with temporary separators, dividing mechanism for dividing line shortage into word shortage, comprising a bar operably connected with the measuring devices, a stop-carrier provided with a series of stops arranged thereon in dividing relation to the bar in accordance with the possible number of spaces in the lines, means for yieldingly moving the carrier to bring the stops in consecutive order into engaging relation to the bar, and an escapement device operable by the separators for controlling the movement of the stop-carrier in accordance with the number of separators.

85. In a machine for justifying lines of type composed with temporary separators, in combination with the devices thereof which require adjustment for the differing number of spaces in the respective lines, means for moving the said devices, and an escapement device operable by the separators for controlling the movement in accordance with the number of separators.

86. In a machine for justifying lines of type composed with temporary separators having extensions, an escapement device projecting into the pathway of the separator extensions, and means for moving the lines past the escapement device, whereby it is operated by each separator in the line.

87. In a machine for justifying lines of type composed with temporary separators having extensions, an escapement device comprising an escapement-wheel, an escapement-pawl engaging therewith, and projecting into the pathway of the separator extensions, and means for moving the type past the pawl, whereby the escapement device is operated by each separator in the line.

88. In a machine for justifying lines of type composed with temporary separators having extensions projecting from the line, a typeway for the lines, an escapement device comprising an escapement-wheel, means for rotating the escapement-wheel, and an escapement-pawl engaging with the wheel, and projecting into the path of the separator extensions, whereby the escapement device is released by each separator in the line.

89. In a machine for justifying lines of type composed with temporary separators having ends projecting above and below the type, a typeway for the lines, and an escapement device comprising a rotatable shaft journaled adjacent to the typeway and provided with ratchet-teeth extending into the pathway of the ends of the separators, an escapement-wheel fixed upon the shaft, an escapement-pawl engaging therewith and projecting into the pathway of the separators, means for moving a line of type along the typeway, and means for rotating the escapement-shaft, whereby it is operated one step for each passing separator.

90. In a type-justifying machine, the combination with the space-dividing mechanism thereof, of a rotatable stop-carrier, means for setting the carrier in accordance with the number of spaces in the line to be justified, a detent-pawl to sustain the carrier in its set position, means for detaching the ratchet and pawl after the dividing operation, and means operable by the word mechanism for returning the carrier to its zero or resting position.

91. In a type-justifying machine, the combination in the space-dividing mechanism thereof, of a rotatable carrier provided with a series of stops, means for setting the carrier in accordance with the number of spaces in the line to be justified, a detent-ratchet and a pawl for sustaining the carrier in its set position during the dividing operation, means operable with the type-handling grabs for detaching the detent of the pawl after the dividing operation, and means operable with the first subsequent stroke of the word mechanism for returning the carrier to its zero or resting position.

92. In a type-justifying machine the combination in the space-dividing mechanism thereof, of a rotatable stop-cylinder, means for setting the stop-cylinder in accordance with the number of spaces in the line to be justified, a detent-ratchet connected with the cylinder, a detent-pawl adjacent thereto to prevent the backward movement of the cylinder during the dividing operation, means operable with the line-grab for withdrawing the pawl, and means operable with the word mechanism for returning the cylinder to its zero position after the dividing operation upon each line.

93. In a machine for justifying type with a series of spacers of different sizes, a rotatable selector for the spacers, provided with selecting means arranged in a cyclic order upon the selector.

94. In a machine for justifying type with a series of spacers of different sizes, a rotatable selector for the spacers, provided with selecting means arranged in a cyclic order upon the selector, and means for repeating the cyclic order of selection by the continued rotations of the selector.

95. In a machine for justifying type with spacers of different sizes, a rotatable selector for the spacers, provided with selecting means brought into operation by the rotation of the selector.

96. In a machine for justifying type with spacers of different sizes, a rotatable selector provided with circumferentially-arranged selecting means for the different spacers.

97. In a machine for justifying type with spacers of different sizes, a rotatable selector provided with selecting means for the different spacers, arranged circumferentially in the order of the sizes of the spacers.

98. In a machine for justifying type with spacers of different sizes, a rotatable selector provided with spacer-selecting means arranged circumferentially of the selector in the order of the sizes of the spacers, and means for repeating the selection by the continued rotation of the selector.

99. In a machine for justifying type with a series of spacers of different sizes, a rotatable selector provided with means for selecting spacer combinations of increasing size, by the rotation of the selector.

100. In a machine for justifying type with a series of spacers of different sizes, a rotatable selector provided with means for selecting spacer combinations, increasing in size by an added increment at the successive rotative positions of the selector.

101. In a machine for justifying type with a series of spacers of different sizes, a rotatable selector provided with means for selecting spacer combinations, increasing in size by a uniform increment at the successive rotative positions of the selector.

102. In a machine for justifying type with a series of spacers of progressively-increasing size, a rotatable selector provided with a corresponding series of selecting means arranged in the order of the size of the spacers.

103. In a machine for justifying type with a series of spacers of progressively-increasing size, a rotatable selector provided with a corresponding series of selecting means; and means for repeating the selection of the series with an added increment by the successive rotations of the selector.

104. In a machine for justifying type with a series of spacers of progressively-increasing size, a rotatable selector provided with selecting-wings for the respective spacers, arranged in the order of the sizes of the spacers.

105. In a machine for justifying type with a series of spacers of progressively-increasing size, a rotatable selector provided with a corresponding series of selecting-wings arranged in the order of the increasing size of the spacers, and means for rotating the selector to bring the required wing into selecting position.

106. In a machine for justifying type with a series of spacers of progressively-increasing size, a rotatable selector provided with a corresponding series of selecting-wings arranged in a cycle in the order of the increasing size of the spacers, and means for rotating the selector through the required number of cycles of its movement, to locate the required wing in its selecting position.

107. In a machine for justifying type with a series of spacers of progressively-increasing size, a rotatable selector provided with a corresponding series of wings for the respective spacers, and means for selecting an additional basic spacer at each rotation of the selector.

108. In a machine for justifying type with a series of spacers of progressively-increasing size, a rotatable selector provided with a corresponding series of selecting-wings arranged in the order of the progressive sizes of the spacers, whereby the entire series of wings is passed once into selecting position at a single rotation of the selector, and repeats the same cycle at each succeeding rotation thereof, means for rotating the selector to the required cycle, and means for selecting an additional basic spacer for each succeeding higher cycle.

109. In a type-justifying machine, in combination with spacer-selecting mechanism, a selecting-finger, and a rotatable selector coöperating with the selecting-finger to select its spacer.

110. In a type-justifying machine, in combination with spacer-selecting mechanism, a selecting-finger, and a rotatable selector coöperating with the selecting-finger through an arc of its rotative position to select the associated spacer.

111. In a type-justifying machine, in combination with spacer-selecting mechanism, a reciprocating selecting-finger, and a rotatable selector for coöperating with the finger to select its associated spacer.

112. In a type-justifying machine, a series of selecting-fingers for the justifying-spacers, and a rotatable selector for acting upon the selecting-fingers to select the desired spacers.

113. In a type-justifying machine, a series of selecting-fingers for the justifying-spacers, and a rotatable selector provided with means for acting upon each selecting-finger throughout an arc of movement of the selector.

114. In a type-justifying machine, a series of selecting-fingers for the justifying-spacers and a rotatable selector for operating the fingers in succession throughout successive arcs of movement of the selector.

115. In a type-justifying machine, a series of selecting-fingers for the justifying-spacers, and a rotatable selector for operating upon the fingers one at a time, the different fingers being operated upon while the selector is in successive arcs of its movement.

116. In a type-justifying machine, a series of selecting-fingers for the justifying-spacers, and a rotatable selector for operating each of the fingers in succession at each rotation of the selector and throughout an arc of the selector movement proportionate to the number of fingers.

117. In a type-justifying machine, a series of selecting-fingers for the justifying-spacers, a rotatable selector for operating the fingers in succession at each rotation of the selector and throughout an arc of the rotative movement of the selector proportionate to the number of fingers, and means for setting the selector in accordance with the space measurement of the line of type.

118. In a type-justifying machine, in combination with a rotatable selector for the justifying-spacers, a cumulator coöperating with the selector.

119. In a type-justifying machine, the combination of a rotatable selector for justifying-spacers, and a cumulator operatively connected therewith for building up the spacer combinations in accordance with the rotative positions of the selector.

120. In a type-justifying machine, the combination of a rotatable selector for the justifying-spacers, a cumulator operable therewith, provided with means for adding an increment to the spacer combination at each rotation of the selector.

121. In a machine for justifying type with a series of spacers of different sizes, a rotatable selector for selecting a series of spacers, and a cumulator coöperating with the selector to add an increment to the spacer combinations, according to the position of the selector.

122. In a machine for justifying type with a series of spacers of different sizes, a selector for the spacers, and a cumulator coöperating with the selector to change the spacer combinations by desired increments in accordance with the rotative positions of the selector.

123. In a machine for justifying type with a series of spacers of different sizes, a rotatable selector for selecting a series of spacers by its rotative positions, and a cumulator coöperating with the selector to change the spacer combination by an increment at each rotation of the selector.

124. In a machine for justifying type with a series of spacers of progressively-increasing size, a rotatable selector provided with selecting means for the spacers, arranged in the order of their increasing size, and a cumulator coöperating with the selector for controlling the selecting devices, to change the size of the selected combination by an increment at each repeated rotation of the selector.

125. In a type-justifying machine, in combination with a spacer-channel, a plunger for removing spacers from the channel, a reciprocating pawl, and spacer-selecting devices for guiding the pawl into or out of engagement with the plunger.

126. In a type-justifying machine, the combination of a spacer-channel, a series of plungers for ejecting a corresponding number of spacers from the same channel, spacer-selecting devices, and means operable by the spacer-selecting devices for operating one or more of the plungers.

127. In a type-justifying machine, the combination of a spacer-channel, a series of warded plungers for ejecting a corresponding number of spacers from the same channel, a reciprocating pawl, and spacer-selecting devices for guiding the pawl in engaging relation with the desired number of plungers.

128. In a type-justifying machine, the combination, with a spacer-channel, of a reciprocating pawl for ejecting spacers from the channel, spacer-selecting devices, and a guide operable by the spacer-selecting devices for controlling the position of the pawl to vary the number of spacers ejected by it from the channel.

129. In a type-justifying machine, the combination of a type-channel, a series of plungers for ejecting type from the channel, spacer-selecting devices, and means controlled by the spacer-selecting devices for operating one or more of the plungers.

130. In a type-justifying machine, the combination of a type-channel, a series of plungers for ejecting type from the channel, each of a thickness substantially equaling that of the type, selecting devices, and means controlled by the selecting devices for operating one or more of the plungers.

131. In a type-justifying machine, the combination of a spacer-channel, a series of plungers for ejecting one or more spacers, spacer-selecting devices, and a dual controlling device operable by the spacer-selecting devices for selecting the required number of plungers.

132. In a type-justifying machine, the combination of spacer-selecting devices, comprising a selector and a cumulator, a spacer-channel, and means operable under the dual control of the selector and the cumulator for ejecting one or more spacers from the spacer-channel.

133. In a type-justifying machine, the combination of spacer-selecting devices, comprising a selector and a cumulator, a spacer-channel, and means controlled both separately and jointly by the selector and the cumulator for ejecting one or more spacers from the channel.

134. In a type-justifying machine, the combination of spacer-selecting devices, comprising a selector and a cumulator, a spacer-channel, and spacer-ejecting means operable under the independent control of the selector and cumulator, and also operable under their joint control for ejecting one or more spacers from the channel.

135. In a type-justifying machine, the combination of spacer-selecting devices, comprising a selector and a cumulator, a series of spacer-channels, means operable only under the control of the selector for ejecting spacers from some of the channels, and means operable either by the independent or the joint control of the selector and the cumulator for ejecting one or more type from other of the channels.

136. In a machine for justifying type with a series of spacers of different sizes, spacer-selecting devices comprising a selector and a cumulator, a series of channels for the respective spacers, means operable only under the control of the selector for ejecting a single spacer from some channels of the series, and means operable under both the separate and the joint control of the selector and cumulator for selecting one or more spacers from another of the channels.

137. In a machine for justifying lines of type with a series of spacers of progressively-increasing size, spacer-selecting devices comprising a selector and a cumulator, a series of channels for the spacers, and means operable under the control of the selector for ejecting a single fractional spacer from one of the channels, and means operable both independently and jointly by the selector and the cumulator for ejecting one or more basic spacers from another of the channels.

138. In a type-justifying machine, the combination of a spacer-channel, a series of plungers for ejecting one or more spacers, spacer-selecting devices comprising a selector and a cumulator, and means operable by the selector and by the cumulator for selecting the required number of plungers.

139. In a machine for justifying type with a series of spacers of progressively-increasing size, a rotatable selector provided with selecting means arranged in the order of the increasing sizes of the spacers, whereby each is brought into selecting position during a single rotation of the selector, and repeats this cycle of selective movement for each rotation thereof, means for rotating the selector to its position for selecting the required spacers, and means operable by the rotation of the selector for selecting an additional basic spacer at each further rotation of the selector.

140. In a machine for justifying type with spacers of progressively-increasing sizes, a rotatable selector provided with selecting means arranged in the order of the increasing size of the spacers, and a basic spacer-adding device operably connected with the selector for selecting an additional basic spacer at the commencement of each succeeding cycle of movement of the selector.

141. In a machine for justifying type with a series of spacers of progressively-increasing sizes, a rotatable selector provided with a corresponding series of selecting-wings arranged in the order of increasing size of the spacers, means for rotating the selector through the required cycles of its movement to locate the required wing in its selecting position, and an auxiliary basic-spacer-adding device for selecting an additional basic spacer at the beginning of each succeeding cycle of rotation of the selector.

142. In a type-justifying machine in combination with the measuring and spacer-ejecting devices thereof, a rotary selector provided with a series of wings for the respective spacers; means for rotating the selector to the position determined by the measuring operation, and means for locking it in that position.

143. In a type-justifying machine in combination with measuring devices and with means for forming justifying combinations from a series of spacers of progressively-increasing size, a rotary selector provided with a corresponding series of selecting-wings arranged in the order of the increasing size of the spacers, means for rotating the selector through the required number of cycles of its selecting movement to locate it in the position indicated by the measuring devices, and a cumulator device operably connected with the selector for selecting an additional basic spacer at the commencement of each succeeding higher cycle of movement of the selector 144. In a machine for justifying lines of type with a series of spacers of progressively-increasing size, the combination of measuring devices, a rotary selector provided with a corresponding series of wings for the respective spacers, a cumulator device operably connected with the selector, means for ejecting one or more of the basic spacers, and means operable by the selector and the cumulator device for selecting the required number of basic spacers.

145. The combination of type-raceway, means for advancing one or more type side by side along the raceway, and a gate adjustable to permit one or more type to pass along the raceway.

146. The combination of a type-raceway, a gate adjustable to permit one or more type to pass along the raceway, and means for advancing one or more type along the raceway in accordance with the adjustments of the gate.

147. The combination of a type-raceway, a gate adjustable to permit one or more type to pass along the raceway, and means adjustable with the gate for advancing along the raceway the number of type suited to the opening of the gate.

148. The combination of a type-raceway, means for advancing one or more type along the raceway, and a gate adjustable with the type-advancing means for permitting the required number of type to pass along the raceway.

149. In a type-justifying machine the combination of spacer-selecting devices, a raceway, a spacer-channel arranged transversely to and opening into the raceway, a series of plungers in the raceway each of a thickness approximating that of the spacers, the plungers being provided with a series of selecting-wards, and means operable with the spacer-selecting devices of the machine for engaging with the wards of one or more of the plungers, and moving them longitudinally to eject a corresponding number of spacers.

150. In a type-justifying machine the combination with a typeway, a spacer-channel, a raceway crossing the spacer-channel, and extending into the typeway, a series of plungers in the raceway, each of a thickness approximately equaling that of the spacers, and means for selecting one or more of the plungers to inject the corresponding number of spacers from the spacer-channel into the typeway.

151. In a type-justifying machine the combination of a typeway, a spacer-channel, a raceway crossing the end of the spacer-channel and extending into the typeway, a series of plungers in the raceway, each of a thickness approximately equaling that of the spacers, a gate for closing the raceway, means for selecting one or more of the plungers to inject the corresponding number of spacers from the spacer-channel into the raceway, and means for opening the gate to permit the said number of spacers to pass.

152. In a type-justifying machine the combination with spacer-selecting devices, of a typeway, a spacer-channel, a raceway crossing the spacer-channel, and extending into the typeway, a series of plungers in the raceway at one side of the spacer-channel, each of a thickness approximately equaling that of the spacers, and provided with distinguishing selecting-wards, a reciprocating selector-pawl arranged in engaging relation to the selecting-wards of the plungers, and means operable by the spacer-selecting devices for guiding the selector-pawl in or out of engaging relation to one or more of the plungers.

153. In a type-justifying machine the combination with spacer-selecting devices, of a spacer-channel, a raceway crossing the channel, a series of plungers in the raceway at one side of the spacer-channel, each of a thickness approximately equaling that of the spacers, and provided with projecting wards decreasing in length from the first through the succeeding plungers, a selecting-pawl mounted to reciprocate in engaging relation to the wards, and means operable by the spacer-selecting devices for guiding the selecting-pawl in its required relation to the wards.

154. In a type-justifying machine the combination with spacer-selecting devices, of a spacer-channel, a raceway crossing the channel, a series of plungers in the raceway at one side of the channel, each of a thickness approximately equaling that of the spacers, provided with selecting-wards which project to a decreasing extent from the first plunger onward through the series, a selecting-pawl mounted to reciprocate in engaging relation to the wards, a guide-plate for the pawl, and means operable from the spacer-selecting devices for controlling the position of the guide-plate and thereby controlling the number of spacers to be ejected from the channel.

155. In a type-justifying machine in combination with a spacer-channel, a plunger approximately equaling the thickness of the spacers in the channel, and movable transversely thereto, a reciprocating pawl adjacent to the plunger, spacer-selecting devices, and means operable by the spacer-selecting devices for moving the pawl into and out of engagement with the plunger.

156. In a type-justifying machine the combination of a raceway, a spacer-channel arranged transversely to and opening into the raceway, a plunger located in the raceway to reciprocate past the channel and eject the spacers therefrom, a reciprocating pawl in engaging relation to the plunger, spacer-selecting devices, and means operable by the spacer-selecting devices for guiding the pawl either in or out of engaging relation to the plunger.

157. In a type-justifying machine the combination of a raceway, a type-channel arranged transversely to and opening into the raceway, a series of plungers for ejecting type from the channel, arranged side by side in the raceway and each of a thickness equaling that of the type, spacer-selecting devices, and means controlled by the spacer-selecting devices for operating one or more of the plungers.

158. In a type-justifying machine the combination of a raceway, a spacer-channel arranged transversely to and opening into the raceway, a series of plungers in the raceway at one side of the space-channel, each of a thickness approximately equaling that of the spacers, a gate adjacent to the spacers for closing the raceway on the opposite side of the channel from the plungers, spacer-selecting devices, and means operable by the spacer-selecting devices for moving one or more of the plungers and opening the gate for the passage of the corresponding number of spacers.

159. In a type-justifying machine, the combination of a rotatable selector for determining the sizes of the justifying-spacers, and a correcting device for advancing the selector in accordance with the required correction.

160. In a type-justifying machine, the combination of a rotatable selector for determining the sizes of justifying-spacers, and means for advancing the selector to augment the size of the spacer or spacer combination in accordance with the required correction.

161. In a machine for justifying type with a series of spacers of different sizes, a rotatable selector for the spacers, provided with selecting means arranged in a cyclic order, and a correcting device for moving the selector to advance the cyclic order of selection.

162. In a machine for justifying type with a series of spacers of different sizes, a rotatable selector for the spacers, provided with selecting means arranged in a cyclic order upon the selector, and a correcting device for advancing the selector to bring the succeeding selecting means into operation.

163. In a machine for justifying type with a series of spacers of progressively-increasing size, a rotatable selector for the spacers, provided with selecting means arranged in the order of the sizes of the spacers, and a correcting device for advancing the selector to bring into selecting position the selecting means for the next larger spacer.

164. In a machine for justifying type with a series of spacers of progressively-increasing size, a rotary selector provided with a corresponding series of selecting-wings arranged in the order of the increasing size of the spacers, and a correcting device for advancing the selector to bring a different wing into its selecting position.

165. In a machine for justifying lines of type with a series of spacers of progressively-increasing size, a rotary selector provided with a corresponding series of selecting-wings arranged in the order of the increasing size of the spacers, means for rotating the selector through the required number of cycles of its movement to locate the required wing in its selecting position, and a correcting device for advancing the selector to bring a different wing into selecting position for a larger size of spacer.

166. In a machine for justifying lines of type with a series of spacers of progressively-increasing size, a rotary selector provided with a corresponding series of selector-wings arranged in the order of the increasing size of the spacers, means for rotating the selector through the required number of cycles of its movement to locate the required wing in its selecting position, and a correcting device operable when the required size of spacer is between the size thus selected and the next largest size, to advance the selector and move the succeeding wing into selecting position.

167. In a machine for justifying lines of type with a series of spacers progressing in size by a uniform increment, a rotary selector provided with a corresponding series of selector-wings arranged in the order of the increasing size of the spacers, means for rotating the selector to locate the required wing in its selecting position, and operating when the required size of spacer is between two of the regular sizes, to set in its selecting position the wing for the next smaller size, and a correcting device for advancing the selector to bring the succeeding wing into selecting position when the deficiency amounts to the increment between the sizes of spacers.

168. In a type-justifying machine, in combination with a rotatable selector for determining the sizes of the justifying-spacers, a correcting mechanism comprising means for advancing the selector, and a guard-disk for controlling the application of the advancing means in accordance with the extent of the required correction.

169. In a type-justifying machine, in combination with a rotatable selector for the justifying-spacers, a correcting mechanism comprising means for advancing the selector, a guard-disk for controlling the application of the selector-advancing means, and means for setting the disk in accordance with the required correction.

170. In a type-justifying machine, in combination with a rotatable selector for the justifying-spacers, a correcting mechanism comprising means for initially setting the selector in accordance with the space measurement or shortage of a line of type, means for advancing the selector from its initial position to select a larger spacer or spacer combination, and means for modifying the rate of advancement of the selector in accordance with the required selection.

171. In a type-justifying machine, in combination with a rotatable selector for the justifying-spacers, correcting mechanism, comprising means for initially setting the selector in accordance with the space measurement or shortage of a line of type, means for advancing the selector to select a larger spacer or spacer combination, and a guard-disk for controlling the application of the advancing means in accordance with the amount of the required correction.

172. In a type-justifying machine, in combination with a rotatable selector for the justifying-spacers, correcting mechanism comprising means for initially setting the selector in accordance with the space measurement or shortage of a line of type, means for advancing the selector to select a larger spacer or spacer combination, and means for returning the selector to its initial position.

173. In a type-justifying machine, in combination with a rotatable selector for the justifying-spacers, correcting mechanism comprising means for initially setting the selector in accordance with the space measurement or shortage of a line of type, means for advancing the selector to select a larger spacer or spacer combination, and an oscillating guard-disk provided with means for controlling the application of the selector-advancing means in accordance with the required correction.

174. In a type-justifying machine, in combination with a rotatable selector for the justifying-spacers, correcting mechanism comprising means for initially setting the selector in accordance with the space measurement or shortage of a line of type, a ratchet and a series of pawls for advancing the selector from its initial position, and an oscillating guard-disk for controlling the application of the pawls to the ratchet to regulate the advancing movement of the selector in accordance with the required correction.

175. In a type-justifying machine, the combination with a rotatable selector for the justifying-spacers, correcting mechanism, comprising means for initially setting the selector in accordance with the space measurement or shortage of a line of type, a ratchet and a series of pawls for advancing the selector, and a fender for holding some of the pawls out of operation during a portion of their stroke.

176. In a type-justifying machine, in combination with a rotatable selector for the justifying-spacers, correcting mechanism comprising means for initially setting the selector in accordance with the space measurement or shortage of a line of type, a ratchet and a series of pawls for advancing the selector from its initial position to select a larger spacer or spacer combination, an oscillating guard-disk, and a fender for controlling the application of the pawls to the ratchet in accordance with the required amount of correction.

177. In a type-justifying machine, in combination with a rotatable selector for the justifying-spacers, correcting mechanism comprising means for initially setting the selector in accordance with the space measurement or shortage of a line of type, means for advancing the selector in accordance with the required correction, to select a larger spacer or spacer combination, a ratchet-sector and detent for detaining the selector in the succeeding steps of its advancing movement, and a switch-pawl for releasing the selector to permit it to return to its initial position.

178. In a type composing and justifying machine, in combination with the composing-channels for the character-type, temporary separators for the composed words and lines, a channel for holding the separators in operative relation to the composing devices, and means for ejecting the separators from the lines, during justification, and for returning them to their composing-channel.

179. In a type composing and justifying machine, in combination with temporary word and line separators, channels for the separators located in operative relation to the composing-machine, and provided with separator-ejecting devices operable from the keyboard, means for eliminating the separators from the lines during justification, and means for returning them to their composing-channels.

180. In a type composing and justifying machine, the combination of separators for the composed words and lines, separate channels for the separators arranged in coöperative relation to the composing device, means operable from the keyboard of the composing-machine, for inserting the separators during the composition, means for ejecting the separators from the line during justification, and means for returning them to their composing-channels.

181. In a type composing and justifying machine, the combination of word and line separators and channels therefor, located in operative relation to the composing devices, means for eliminating the separators from the line, and means for returning the separators to and distributing them in their respective composing-channels.

182. In a type composing and justifyin machine, the combination of word and line separators of differing length, composing-channels therefor located in operative relation to the composing devices of the machine, means for ejecting the separators from the lines during justification, means for returning the separators, and means coöperating with the differing lengths of the separators for distributing them in their respective composing-channels.

183. In a type composing and justifying machine, the combination of word and line separators of differing length, composing-channels therefor located in coöperative relation to the composing devices, means for inserting the separators in the line during the composition, means for ejecting the separators from the lines during justification, a conveyer for returning the separators, and means for supporting the ends of the longer separators to guide them across the channel for the shorter separators to their own channel.

184. In combination with type-handling mechanism, a flexible conveyer, provided with a pocket for receiving substantially the full thickness of the type.

185. In combination with type-handling mechanism, an endless flexible conveyer, provided with a pocket for receiving substantially the full thickness of the type.

186. In combination with type-handling mechanism, an endless flexible conveyer, provided with a longitudinal pocket.

187. In combination with type-handling mechanism, an endless flexible conveyer provided with a longitudinal pocket of a width and depth substantially equaling the width and depth of the type.

188. In combination with type-handling mechanism, an endless flexible conveyer provided with a longitudinally-extending pocket of a width substantially equaling the width of pieces to be fed, means, as pulleys, for driving and guiding the conveyer, means for feeding pieces into the pocket, and means for ejecting the pieces therefrom.

189. In combination with type-handling mechanism, an endless flexible conveyer provided with a longitudinally-extending pocket of a width and depth substantially equaling the width and depth of pieces to be fed, means, as a system of pulleys, for driving and guiding the conveyer, means for feeding and pressing pieces into the conveyer, and means for ejecting the pieces from the pocket at their destination.

190. In combination with type-handling mechanism, an endless flexible conveyer, provided with a longitudinally-extending pocket of substantially the width and depth of pieces to be fed, means, as a system of pulleys, for driving and guiding the conveyer in its desired path, means for feeding the succeeding pieces tightly into the pocket, and means for ejecting the pieces from the pocket at their destination.

191. In a type composing and justifying machine, employing temporary separators, in combination with the composing and justifying devices thereof, an endless flexible conveyer for returning the separators from the justifying devices to the composing devices, provided with a longitudinal pocket of a width and depth suitable for holding the separators tightly, means for feeding the separators into the conveyer-pocket, and means for ejecting them therefrom.

192. In a type composing and justifying machine employing temporary separators, an endless flexible conveyer for returning the separators from the justifying devices to the composing devices, provided with a longitudinal pocket for holding the separators tightly, means for transfering the separators from the lines to the conveyer during justification and means for ejecting the separators from the conveyer at the composing devices.

193. In a type-justifying machine, a channel for cylindrical separators, having a stepped contour for guiding the separators in an approximately parallel relation along the channel.

194. In a type - justifying machine, a gravity-channel for cylindrical separators having a stepped, zigzag contour for guiding the separators in an approximately level position along the channel.

195. In a type-composing machine, the combination with the distributing and justifying mechanism thereof, of means for automatically conveying the justifying-spacers from the distributing mechanism to the justifying mechanism.

196. In a type-composing machine, the combination with the distributing and justifying mechanisms thereof, of means for discharging the justifying-spacers from their respective channels of the distributing mechanism and means for conveying them to their respective channels in the justifying mechanism.

197. In a type-composing machine, the combination of spacer-channels appurtenant to the justifying mechanism, and of spacer-distributing channels appurtenant to the distributing mechanism, means for automatically discharging and conveying the spacers from their distributing to their justifying channels, and means for advancing the spacers along their respective justifying-channels.

198. In a type-composing machine, the combination of spacer-channels appurtenant to the justifying mechanism, and of spacer-channels appurtenant to the distributing mechanism, a series of chutes connecting the corresponding channels of the mechanisms, and means for advancing the spacers along the justifying-channels from the connecting ends of the chutes.

199. In a type-justifying machine, the combination of a spacer-channel, a follower for yieldingly advancing the spacers along the channel, means for replenishing the supply of spacers behind the follower, and means operable at a predetermined point in the forward movement of the follower, to move the follower back to engage with an additional supply of spacers.

200. In a type-justifying machine, the combination of a spacer-channel, a follower for yieldingly advancing the spacers along the channel, means for replenishing the supply of spacers behind the follower, mechanism for moving the follower back to engage with an additional supply of the spacers, and a trigger device for holding the said mechanism out of operation, and arranged to be tripped to release the said mechanism at a predetermined point in the forward movement of the follower.

201. In a type-justifying machine, the combination of a spacer-channel, a follower for yieldingly advancing the spacers along the channel, means for replenishing the supply of spacers behind the channel, single-revolution mechanism for moving the follower back to engage with an additional supply of spacers, and a trigger device for inaugurating the revolutions of the said mechanism, arranged to be tripped by the follower at a predetermined portion of its forward movement.

202. In combination with a type-justifying machine, a leading mechanism, comprising a plunger for inserting the leads between the justified lines, and a plunger for advancing the column of lines and leads, means operable by the justifying mechanism for actuating the plungers, and means for varying the amplitude of movement of the plunger-actuating means to effect single or multiple leading.

203. In combination with a type-justifying machine, a leading mechanism, comprising a plunger for inserting leads between the justified lines, and a plunger for advancing the column of lines and leads, a pivotally-mounted member for actuating the said plungers, and means for operating the said member from the justifying-machine, adapted to be attached at different radial distances from the pivotal support of the actuated member to vary the amplitude of its movements.

204. In combination with a type-justifying machine, a leading mechanism comprising a plunger for inserting the leads between the justified lines, a pivotally-mounted cam for the plunger having a contour suited for imparting a double reciprocation to the plunger, and means connected with the type-justifying machine for imparting to the cam a varying amplitude of movement in accordance with the number of leads to be inserted.

205. In combination with a type-justifying machine, a leading mechanism, comprising a plunger for inserting the leads between the justified lines, a pivotally-mounted cam for operating the plunger, having a contour suited to impart one or more reciprocations to the plunger according to the number of leads required, and means operable from the type-justifying machine for imparting to the cam a variable amplitude of movement to effect single or multiple leading.

206. In combination with a type-justifying machine, a leading mechanism comprising a plunger for inserting leads between the justified lines, and a plunger for advancing the column of lines and leads, pivotally-mounted cams for operating the respective plungers, having contours adapted to impart one or more reciprocations to the plungers, according to the amplitude of movement of the cams, and means operable from the type-justifying machine for imparting a variable amplitude of movement to the cams for single or multiple leading.

207. In combination with a type-justifying machine, a leading mechanism comprising a plunger for inserting leads between the justified lines, a plunger for advancing the column of lines and leads, cams for operating the respective plungers, and means for coupling and uncoupling the cams to and from each other.

208. In a type-justifying machine, a word-slide provided with means for separating the line at the successive word-spaces and clamping the separate portions of the line.

209. In a type-justifying machine, a word-slide provided with means for separating the line at the successive word-spaces and clamping the separate portions of the line and for releasing temporary spacers from the line, in combination with means for inserting the justifying-spacers, said word-slide being constructed to retain the justifying-spacers during the advance of the word to the galley.

210. In a type-justifying machine, a word-slide provided with means for separating the line at the successive word-spaces and releasing temporary spacers from the line in combination with means for inserting the justifying-spacers, said word-slide being constructed to retain the justifying-spacers during the advance of the word to the galley.

211. In a type-justifying machine, a word-slide provided with means for separating the line at the successive word-spaces and clamping the separate portions of the line and for releasing temporary spacers from the line in combination with means for inserting the jusifying-spacers, said word-slide being constructed to retain the justifying-spacers and acting to advance the word to the galley.

212. In a type-justifying machine, selecting mechanism including a selector for selecting the same spacer in two or more of its positions, and means for determining by the position in which the selector is set, its correcting movement for selecting a different spacer.

213. In a type-justifying machine, selecting mechanism including a movable selector by which the same spacer is selected throughout a certain range of its movement, in combination with correcting mechanism controlled by the position in which the selector is set within such range of movement.

214. In a type-justifying machine, selecting mechanism including a selector adapted to move step by step from the position in which it selects one spacer to the position in which it selects the next larger spacer and to select the smaller spacer in the intermediate positions, in combination with correcting mechanism whereby the correction is determined by the one of the intermediate positions in which the selector is initially set.

215. In a type-handling machine, a series of ejecting-plungers provided with projecting wards of different lengths in combination with means for engaging said wards to actuate one or more of the plungers.

216. In a type-justifying machine, the combination with a raceway and spacers therein, of a series of plungers adapted to eject one or more of said spacers in accordance with the number of plungers operated and provided with projecting wards of different lengths, and means for engaging said wards to actuate one or more of the plungers.

217. In a machine for justifying lines of type set with temporary word and line separators, the combination with space-inserting mechanism for inserting justifying-spacers between the words, of means for rendering the space-inserting mechanism inoperative at the end of a line.

218. In a machine for justifying lines of type set with temporary word and line separators, the combination with space-inserting mechanism for inserting justifying-spacers in place of separators between the words, of means for rendering the space-inserting mechanism inoperative to prevent justifying-spacers being inserted in place of the line-separators.

219. A locking device consisting of a number of interlacing leaves on the two members to be locked together, and a clamping device for the leaves.

220. In a type-justifying machine, in combination with the measuring and spacer-selecting devices, a swinging segmental cumulator operable by the measuring devices for controlling the spacer-selecting devices.

221. In a type-justifying machine, in combination with the measuring and spacer-selecting devices, a swinging segmental cumulator controlled by the measuring devices and provided with steps for modifying the action of the spacer-selecting devices.

In testimony whereof I have hereunto set my hand in the presence of two subscribing witnesses.

WALTER JAY ENNISSON.

Witnesses:
S. WINTHAL,
C. J. SAWYER.